US008492995B2

(12) United States Patent  
Maxik et al.

(10) Patent No.: US 8,492,995 B2  
(45) Date of Patent: Jul. 23, 2013

(54) WAVELENGTH SENSING LIGHTING SYSTEM AND ASSOCIATED METHODS

(75) Inventors: Fredric S. Maxik, Indialantic, FL (US); Eric Bretschneider, Satellite Beach, FL (US); Pedro Medelius, Merritt Island, FL (US); David E. Bartine, Cocoa, FL (US); Robert R. Soler, Cocoa Beach, FL (US); Gregory Flickinger, Indialantic, FL (US)

(73) Assignee: Environmental Light Technologies Corp., Satellite Beach, FL (US)

( * ) Notice: Subject to any disclaimer, the term of this patent is extended or adjusted under 35 U.S.C. 154(b) by 0 days.

(21) Appl. No.: 13/269,222

(22) Filed: Oct. 7, 2011

(65) Prior Publication Data

US 2013/0088155 A1  Apr. 11, 2013

(51) Int. Cl.  
  *H05B 37/02* (2006.01)
(52) U.S. Cl.  
  USPC .......................................... 315/291; 315/307
(58) Field of Classification Search  
  USPC ............. 315/291, 294, 307–308, 312, 185 R, 315/185 S, 224  
  See application file for complete search history.

(56) References Cited

U.S. PATENT DOCUMENTS

| 5,319,301 | A | 6/1994 | Callahan et al. |
| 5,523,878 | A | 6/1996 | Wallace et al. |
| 5,563,422 | A | 10/1996 | Nakamura et al. |
| 5,704,701 | A | 1/1998 | Kavanagh et al. |
| 5,936,599 | A | 8/1999 | Reymond |
| 5,997,150 | A | 12/1999 | Anderson |
| 6,140,646 | A | 10/2000 | Busta et al. |
| 6,341,876 | B1 | 1/2002 | Moss et al. |
| 6,356,700 | B1 | 3/2002 | Strobl |
| 6,561,656 | B1 | 5/2003 | Kojima et al. |
| 6,594,090 | B2 | 7/2003 | Kruschwitz et al. |
| 6,608,453 | B2 | 8/2003 | Morgan et al. |
| 6,733,135 | B2 | 5/2004 | Dho |
| 6,767,111 | B1 | 7/2004 | Lai |
| 6,817,735 | B2 | 11/2004 | Shimizu et al. |

(Continued)

FOREIGN PATENT DOCUMENTS

| WO | 2010/027459 A2 | 3/2010 |
| WO | 2010/098811 A2 | 9/2010 |
| WO | 2011/008251 A2 | 1/2011 |
| WO | 2011/016860 A1 | 2/2011 |

OTHER PUBLICATIONS

Tannith Cattermole, "Smart Energy Glass controls light on demand", Gizmag.com, Apr. 18, 2010, accessed Nov. 1, 2011.

*Primary Examiner* — Minh D A  
(74) *Attorney, Agent, or Firm* — Mark R. Malek; Daniel C. Pierron; Zies Widerman & Malek

(57) ABSTRACT

A wavelength sensing lighting system may include a light source, a sensor and a controller. One or more light sources and sensors may be included in an array. The light source may emit an illuminating light and the sensor may sense an environmental light. The illuminating light may include data light. The lighting system may include a plurality of nodes connected in a network. The nodes may communicate by emitting and receiving the data light, which may be analyzed by the controller. The light source and the sensor may be provided by a light emitting semiconductor device that is capable of emitting illuminating light and receiving environmental light. A conversion material may convert the wavelength of a source light into a converted sight.

169 Claims, 21 Drawing Sheets

U.S. PATENT DOCUMENTS

| | | |
|---|---|---|
| 6,853,150 B2 | 2/2005 | Clauberg et al. |
| 6,870,523 B1 | 3/2005 | Ben-David et al. |
| 6,871,982 B2 | 3/2005 | Holman et al. |
| 6,876,007 B2 | 4/2005 | Yamazaki et al. |
| 6,967,761 B2 | 11/2005 | Starkweather et al. |
| 6,974,713 B2 | 12/2005 | Patel et al. |
| 7,042,623 B1 | 5/2006 | Huibers et al. |
| 7,066,628 B2 | 6/2006 | Allen |
| 7,070,281 B2 | 7/2006 | Kato |
| 7,072,096 B2 | 7/2006 | Holman et al. |
| 7,075,707 B1 | 7/2006 | Rapaport et al. |
| 7,083,304 B2 | 8/2006 | Rhoads |
| 7,138,770 B2 | 11/2006 | Uang et al. |
| 7,178,941 B2 | 2/2007 | Roberge et al. |
| 7,184,201 B2 | 2/2007 | Duncan |
| 7,242,156 B2 * | 7/2007 | Chikugawa .................. 315/308 |
| 7,246,923 B2 | 7/2007 | Conner |
| 7,255,469 B2 | 8/2007 | Wheatley et al. |
| 7,261,453 B2 | 8/2007 | Morejon et al. |
| 7,289,090 B2 | 10/2007 | Morgan |
| 7,300,177 B2 | 11/2007 | Conner |
| 7,303,291 B2 | 12/2007 | Ikeda et al. |
| 7,325,956 B2 | 2/2008 | Morejon et al. |
| 7,342,658 B2 | 3/2008 | Kowarz et al. |
| 7,344,279 B2 | 3/2008 | Mueller et al. |
| 7,349,095 B2 | 3/2008 | Kurosaki |
| 7,400,439 B2 | 7/2008 | Holman |
| 7,427,146 B2 | 9/2008 | Conner |
| 7,429,983 B2 | 9/2008 | Islam |
| 7,434,946 B2 | 10/2008 | Huibers |
| 7,438,443 B2 | 10/2008 | Tatsuno et al. |
| 7,476,016 B2 | 1/2009 | Kurihara |
| 7,489,086 B2 | 2/2009 | Miskin et al. |
| 7,520,642 B2 | 4/2009 | Holman et al. |
| 7,525,254 B2 * | 4/2009 | Lys et al. .................. 315/77 |
| 7,530,708 B2 | 5/2009 | Park |
| 7,537,347 B2 | 5/2009 | Dewald |
| 7,540,616 B2 | 6/2009 | Conner |
| 7,567,040 B2 | 7/2009 | Pong et al. |
| 7,598,682 B2 | 10/2009 | Grajcar |
| 7,598,686 B2 | 10/2009 | Lys et al. |
| 7,605,971 B2 | 10/2009 | Ishii et al. |
| 7,626,755 B2 | 12/2009 | Furuya et al. |
| 7,677,736 B2 | 3/2010 | Kazasumi et al. |
| 7,684,007 B2 | 3/2010 | Hull et al. |
| 7,703,943 B2 | 4/2010 | Li et al. |
| 7,703,961 B2 * | 4/2010 | Yatsuda et al. .................. 362/545 |
| 7,705,810 B2 | 4/2010 | Choi et al. |
| 7,709,811 B2 | 5/2010 | Conner |
| 7,719,766 B2 | 5/2010 | Grasser et al. |
| 7,728,846 B2 | 6/2010 | Higgins et al. |
| 7,732,825 B2 | 6/2010 | Kim et al. |
| 7,766,490 B2 | 8/2010 | Harbers et al. |
| 7,819,556 B2 | 10/2010 | Heffington et al. |
| 7,828,453 B2 | 11/2010 | Tran et al. |
| 7,828,465 B2 | 11/2010 | Roberge et al. |
| 7,832,878 B2 | 11/2010 | Brukilacchio et al. |
| 7,834,867 B2 | 11/2010 | Sprague et al. |
| 7,835,056 B2 | 11/2010 | Doucet et al. |
| 7,841,714 B2 | 11/2010 | Gruber |
| 7,845,823 B2 * | 12/2010 | Mueller et al. .................. 362/231 |
| 7,852,017 B1 | 12/2010 | Melanson |
| 7,871,839 B2 | 1/2011 | Lee et al. |
| 7,880,400 B2 | 2/2011 | Zhou et al. |
| 7,889,430 B2 | 2/2011 | El-Ghoroury et al. |
| 7,906,789 B2 | 3/2011 | Jung et al. |
| 7,922,355 B1 * | 4/2011 | Morejon et al. .................. 362/247 |
| 7,972,030 B2 | 7/2011 | Li |
| 7,976,205 B2 | 7/2011 | Grotsch et al. |
| 8,016,443 B2 | 9/2011 | Falicoff et al. |
| 8,040,070 B2 | 10/2011 | Myers et al. |
| 8,047,660 B2 | 11/2011 | Penn et al. |
| 8,049,763 B2 | 11/2011 | Kwak et al. |
| 8,061,857 B2 | 11/2011 | Liu et al. |
| 8,070,302 B2 | 12/2011 | Hatanaka et al. |
| 8,076,680 B2 | 12/2011 | Lee et al. |
| 8,242,476 B2 * | 8/2012 | Mimeault et al. .......... 250/559.29 |
| 8,301,027 B2 | 10/2012 | Shaw et al. |
| 2003/0039036 A1 | 2/2003 | Kruschwitz et al. |
| 2004/0052076 A1 | 3/2004 | Mueller et al. |
| 2004/0218390 A1 | 11/2004 | Holman et al. |
| 2005/0174768 A1 | 8/2005 | Conner |
| 2005/0190430 A1 | 9/2005 | Patel et al. |
| 2006/0002101 A1 | 1/2006 | Wheatley et al. |
| 2006/0002108 A1 | 1/2006 | Ouderkirk et al. |
| 2006/0002110 A1 | 1/2006 | Dowling et al. |
| 2006/0138971 A1 | 6/2006 | Uang et al. |
| 2006/0164005 A1 | 7/2006 | Sun |
| 2006/0164607 A1 | 7/2006 | Morejon et al. |
| 2006/0232992 A1 | 10/2006 | Bertram et al. |
| 2006/0285078 A1 | 12/2006 | Kasazumi et al. |
| 2006/0285193 A1 | 12/2006 | Kimura et al. |
| 2006/0291269 A1 | 12/2006 | Doucet et al. |
| 2007/0013871 A1 * | 1/2007 | Marshall et al. .................. 353/20 |
| 2007/0146639 A1 | 6/2007 | Conner |
| 2007/0159492 A1 | 7/2007 | Lo et al. |
| 2007/0188847 A1 | 8/2007 | McDonald et al. |
| 2007/0211449 A1 | 9/2007 | Holman et al. |
| 2007/0241340 A1 | 10/2007 | Pan |
| 2007/0263298 A1 | 11/2007 | El-Ghoroury et al. |
| 2007/0273794 A1 | 11/2007 | Sprague et al. |
| 2008/0143970 A1 | 6/2008 | Harbers et al. |
| 2008/0143973 A1 | 6/2008 | Wu |
| 2008/0195355 A1 * | 8/2008 | Brandt et al. .................. 702/188 |
| 2008/0198572 A1 | 8/2008 | Medendorp |
| 2008/0211421 A1 | 9/2008 | Lee et al. |
| 2008/0218992 A1 | 9/2008 | Li |
| 2008/0232084 A1 | 9/2008 | Kon |
| 2008/0258643 A1 | 10/2008 | Cheng et al. |
| 2008/0285271 A1 | 11/2008 | Roberge et al. |
| 2009/0009102 A1 | 1/2009 | Kahlman et al. |
| 2009/0021955 A1 * | 1/2009 | Kuang et al. .................. 362/479 |
| 2009/0046307 A1 | 2/2009 | Kwak et al. |
| 2009/0059099 A1 | 3/2009 | Linkov et al. |
| 2009/0059585 A1 | 3/2009 | Chen et al. |
| 2009/0079355 A1 | 3/2009 | Zhou et al. |
| 2009/0128781 A1 | 5/2009 | Li |
| 2009/0129079 A1 | 5/2009 | Grotsch et al. |
| 2009/0160370 A1 | 6/2009 | Tai et al. |
| 2009/0184662 A1 | 7/2009 | Given et al. |
| 2009/0184666 A1 | 7/2009 | Myers et al. |
| 2009/0257114 A1 * | 10/2009 | Fujiwara et al. .................. 359/326 |
| 2009/0261748 A1 | 10/2009 | McKinney et al. |
| 2009/0262516 A1 | 10/2009 | Li |
| 2009/0267085 A1 | 10/2009 | Lee et al. |
| 2009/0273918 A1 | 11/2009 | Falicoff et al. |
| 2009/0297166 A1 | 12/2009 | Nakagawa Masao et al. |
| 2010/0006762 A1 | 1/2010 | Yoshida et al. |
| 2010/0025700 A1 | 2/2010 | Jung et al. |
| 2010/0046234 A1 | 2/2010 | Abu-Ageel |
| 2010/0051976 A1 | 3/2010 | Rooymans |
| 2010/0060181 A1 | 3/2010 | Choi et al. |
| 2010/0061068 A1 | 3/2010 | Geissler et al. |
| 2010/0061078 A1 | 3/2010 | Kim |
| 2010/0072494 A1 | 3/2010 | Lee et al. |
| 2010/0103389 A1 | 4/2010 | McVea et al. |
| 2010/0109031 A1 | 5/2010 | Lee et al. |
| 2010/0110516 A1 | 5/2010 | Penn et al. |
| 2010/0117101 A1 | 5/2010 | Kim et al. |
| 2010/0128233 A1 | 5/2010 | Liu et al. |
| 2010/0165599 A1 | 7/2010 | Allen |
| 2010/0202129 A1 | 8/2010 | Abu-Ageel |
| 2010/0213859 A1 | 8/2010 | Shteynberg et al. |
| 2010/0231136 A1 | 9/2010 | Reisenauer et al. |
| 2010/0231863 A1 | 9/2010 | Hikmet et al. |
| 2010/0232134 A1 | 9/2010 | Tran |
| 2010/0244700 A1 | 9/2010 | Chong et al. |
| 2010/0244724 A1 | 9/2010 | Jacobs et al. |
| 2010/0270942 A1 | 10/2010 | Hui et al. |
| 2010/0277084 A1 | 11/2010 | Lee et al. |
| 2010/0302464 A1 | 12/2010 | Raring et al. |
| 2010/0308738 A1 | 12/2010 | Shteynberg et al. |
| 2010/0308739 A1 | 12/2010 | Shteynberg et al. |
| 2010/0315320 A1 | 12/2010 | Yoshida |
| 2010/0320927 A1 | 12/2010 | Gray et al. |

| | | | | | |
|---|---|---|---|---|---|
| 2010/0320928 A1 | 12/2010 | Kaihotsu et al. | 2011/0012137 A1 | 1/2011 | Lin et al. |
| 2010/0321641 A1 | 12/2010 | Van Der Lubbe | 2012/0001567 A1 | 1/2012 | Knapp et al. |
| 2010/0321933 A1 | 12/2010 | Hatanaka et al. | | | |
| 2010/0328328 A1* | 12/2010 | Choi et al. .................. 345/530 | * cited by examiner | | |

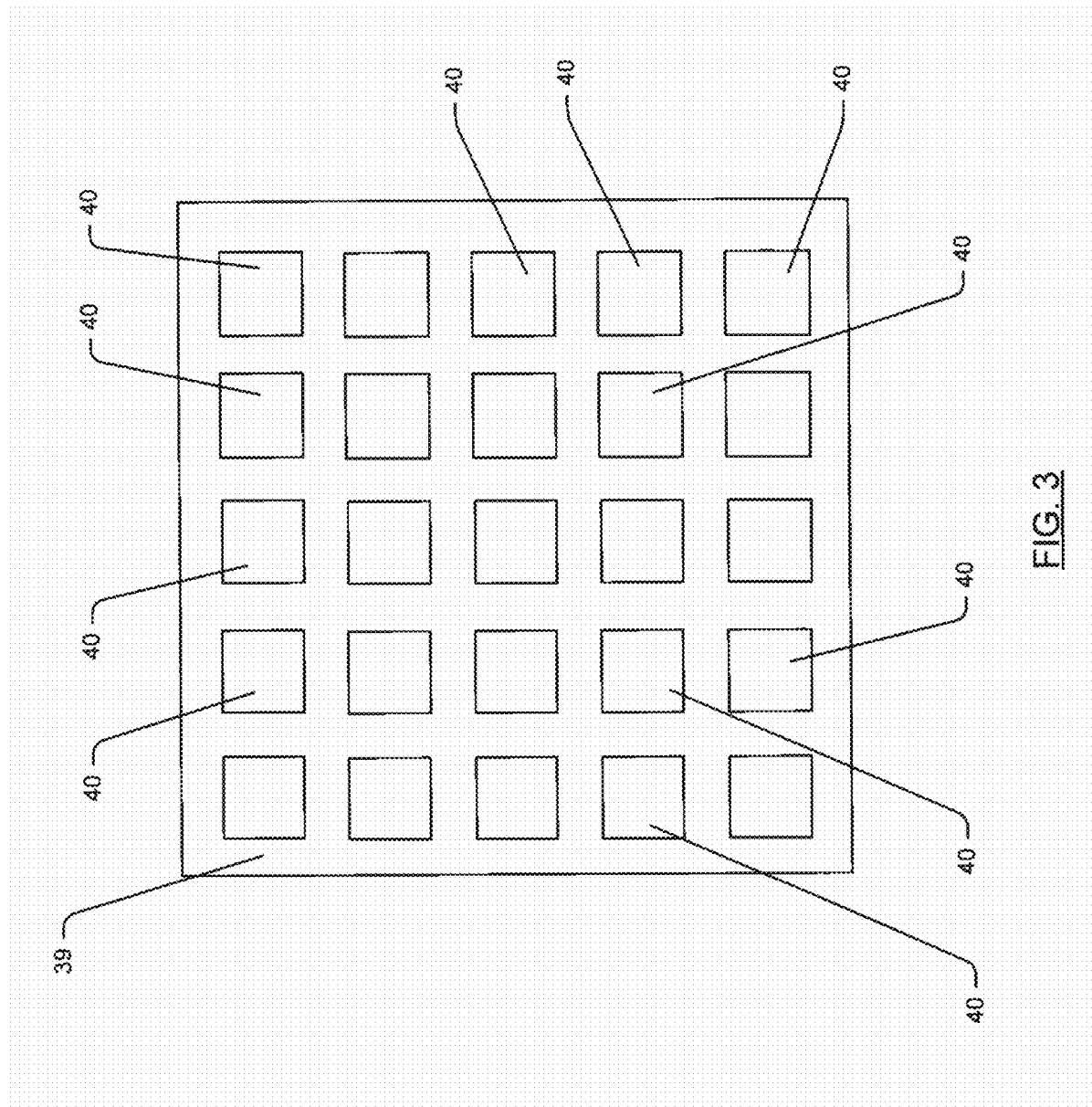

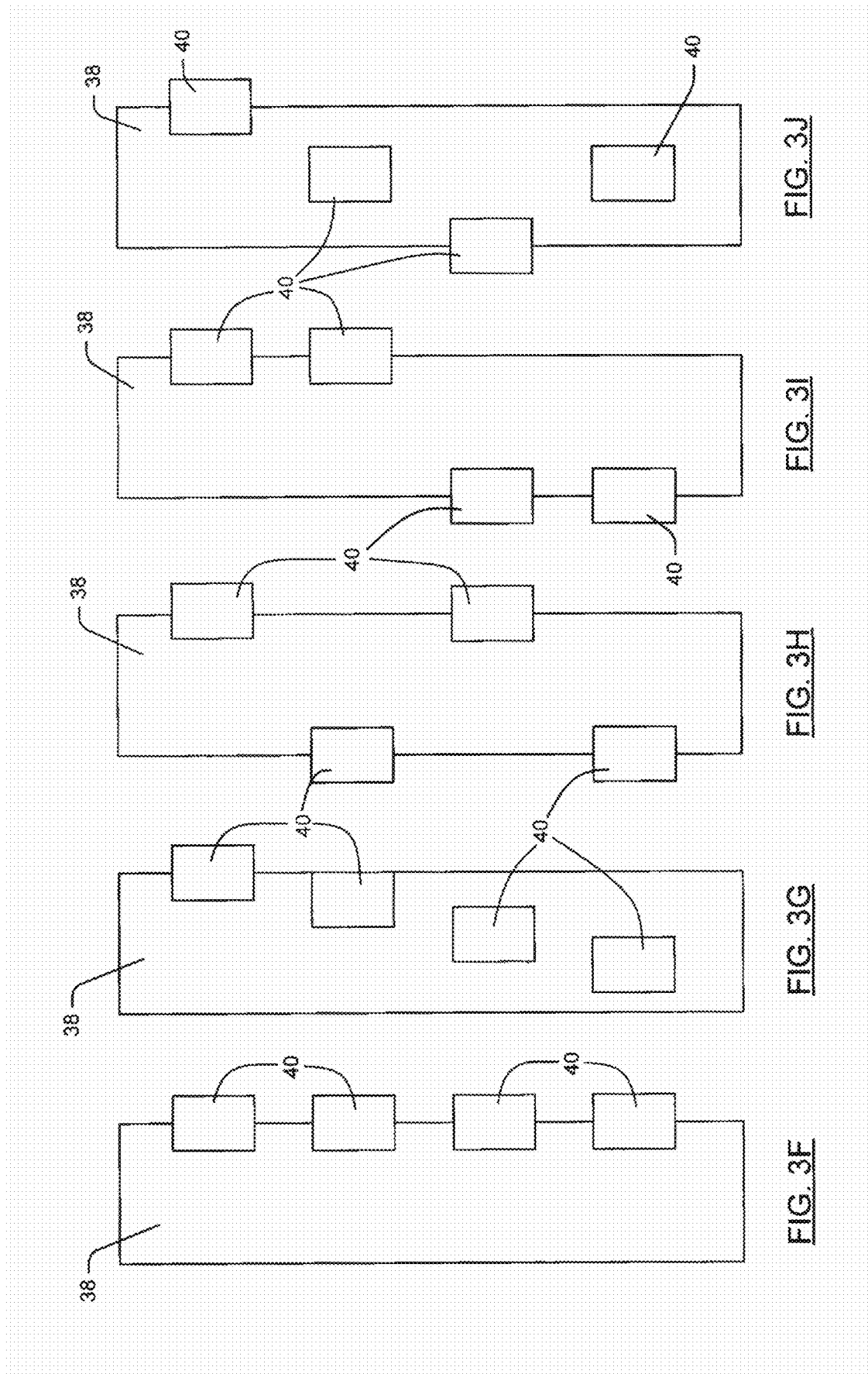

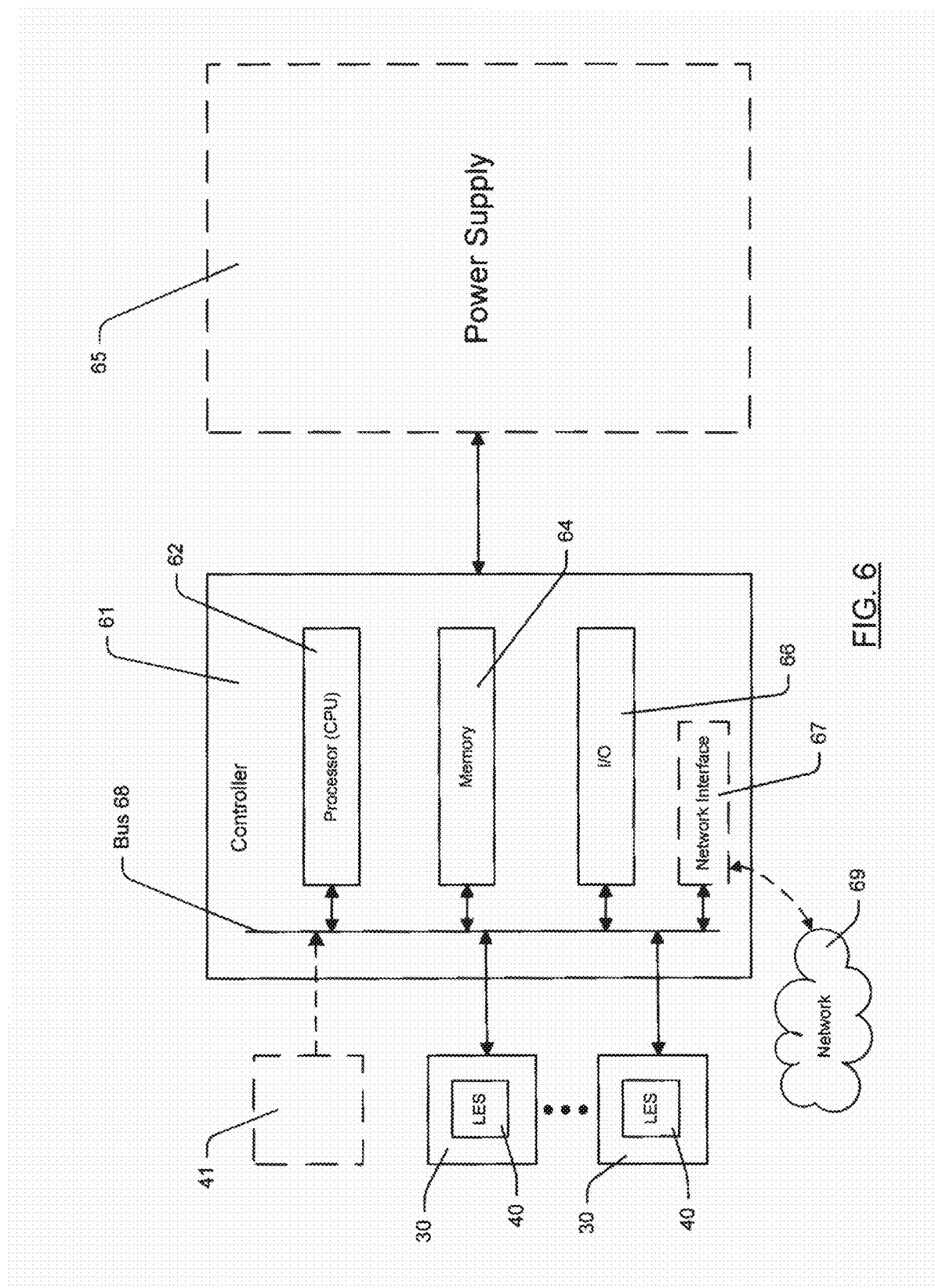

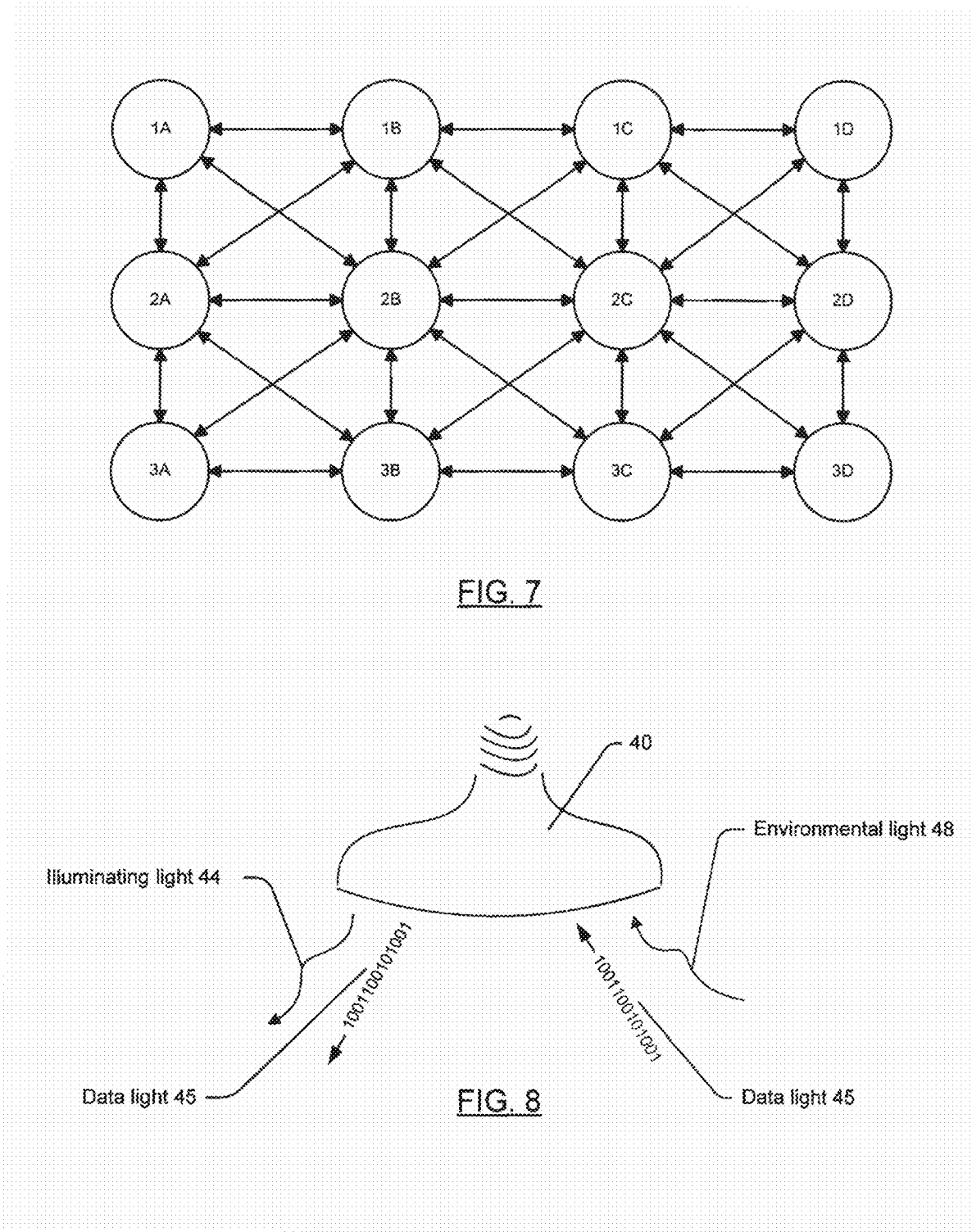

| E | E | S | E |
|---|---|---|---|
| E | S | E | E |
| S | E | E | S |
| E | E | S | E |

FIG. 21

| S | E | E | S |
|---|---|---|---|
| E | E | S | E |
| E | S | E | E |
| S | E | E | S |

FIG. 22

| E | S | E | E |
|---|---|---|---|
| S | E | E | S |
| E | E | S | E |
| E | E | S | E |

FIG. 23

| E | S | E | S |
|---|---|---|---|
| S | E | S | E |
| E | S | E | S |
| S | E | S | E |

FIG. 24

| E | E | E | E |
|---|---|---|---|
| E | E | E | E |
| E | E | E | S |
| E | E | E | E |

FIG. 25

| S | E | E | E |
|---|---|---|---|
| E | E | S | E |
| E | E | E | E |
| E | E | E | S |

FIG. 26

| E | E | E | E |
|---|---|---|---|
| E | E | E | E |
| E | E | E | E |
| E | E | E | E |

FIG. 27

| S | S | S | S |
|---|---|---|---|
| S | S | S | S |
| S | S | S | S |
| S | S | S | S |

FIG. 28

WAVELENGTH SENSING LIGHTING SYSTEM AND ASSOCIATED METHODS

FIELD OF THE INVENTION

The present invention relates to the field of lighting systems and, more specifically, to lighting systems that can emit and sense light within a wavelength range, and associated methods.

BACKGROUND OF THE INVENTION

Lighting systems have been used to illuminate spaces since the invention of fire. Over the years, technology has brought us the incandescent light, which produces light by heating a metal filament, causing it to radiate heat. Although the incandescent light is capable of illuminating an area, it does so with little efficiency.

The fluorescent lamp was introduced to provide comparable light while using less energy. The fluorescent lamp excites a gas, such as mercury vapor, within a confined volume. The atoms of the excited gas typically produce ultraviolet light as it moves between energy levels. The ultraviolet light is then absorbed by a conversion material, such as a phosphor. The phosphor may shift the wavelength range of the absorbed light, emitting a light with longer wavelength ranges. This shift may be known to skilled artisans as a Stokes shift. This phosphor-emitted or converted light may be within the visible spectrum, which may be used to illuminate a space.

Seeking additional efficiency, the continuing advancements in technology have brought the light emitting semiconductor device, and more specifically, the light emitting diode. Light emitting diodes may emit light when biased in a forward direction. Like fluorescent lights, conversion materials may be applied to a light emitting semiconductor device to alter the wavelength range of the light used to illuminate a space.

Lighting systems that include a conversion material may conveniently allow the conversion of a source light emitted from a light source into light of a different wavelength range. Often, such a conversion may be performed by using a luminescent, fluorescent, or phosphorescent material. The wavelength conversion materials may sometimes be included in the bulk of another material, applied to a lens or optic, or otherwise located in line with the light emitted from light source. In some instances the conversion material may be applied to the light source itself. A number of disclosed inventions exist that describe lighting devices that utilize a conversion material applied to an LED to convert light with a source wavelength range into light with a converted wavelength range.

Additional strategies to reduce power consumption involve controlling a lighting system to illuminate a space only when the illumination is required. Traditionally, switches have been included in lighting circuits to allow a user to directly control the operational state of the light. Additionally, timers maybe be included in the light circuit to turn a light on and off according to a predetermined or dynamic timing schedule. However, switches and timers offer little flexibility unless directly engaged by a user.

Sensors may additionally be included in lighting systems to control operation upon the sensed compliance with a desired event. As an example, sensors may determine the level of light in a space, which may, in turn, cause a lighting system to be turned on upon sensing a value falls below a threshold value. As an additional example, sensors may detect the presence of movement in a space to control illumination. However, including sensors may increase the number of parts and complexity required to build the lighting system, thereby increasing its manufacturing cost.

Additionally, each lighting device may operate independent of other lighting devices, requiring sensors included in each lighting device, further increasing production costs. Some proposed solutions have included wireless radio transmitters in the lighting systems, to allow communication between the devices included therein. However, the inclusion of wireless radios further increase the complexity and number of components included in the lighting system.

One proposed solution is described in by international patent application publications WO 2001/016860, WO 2011/008251, WO 2010/098811, and WO 2010027459, each by Knapp, and that each involve using the light emitting semiconductor device to perform the operations of a photodiode during portions of the duty cycle when the light emitting semiconductor device is not emitting light. The aforementioned Knapp applications additionally recite using the light emitting semiconductor devices to transmit and receive bi-directional communication between devices included in the light system. However, the Knapp applications employ data transmission methods that may result in redundant data transmission, decreasing the effective throughput of the system. Additionally, the Knapp applications lack advanced wavelength sensing functionality, limiting the effectiveness of the system disclosed therein.

There exists a need for a wavelength lighting system that can emit an illuminating light and sense an environmental light by altering its operational state between various portions of the duty cycle. There further exists a need for a lighting system that can analyze the sensed environmental light to alter the characteristics of the nodes included in the lighting system. Additionally, there exists a need for a lighting system wherein the nodes intercommunicate to increase the effectiveness of the system.

SUMMARY OF THE INVENTION

With the foregoing in mind, embodiments of the present invention are related to a wavelength sensing lighting system that can emit illuminating light and sense environmental light during portions of the duty cycle. Additionally, according to an embodiment of the present invention, the lighting system may advantageously analyze the sensed environmental light to alter the characteristics of nodes included in the lighting system. The lighting system may include nodes that may advantageously intercommunicate with one another to increase the effectiveness of the system.

With the foregoing in mind, the present invention provides a lighting system which, in one embodiment, may include a light source to emit illuminating light and sense environmental light from an environment and a wavelength conversion material between the light source and the environment to absorb at least part of a source light and emit a converted light. The source light may be received and absorbed by the wavelength conversion material, and the converted light may be emitted by the wavelength conversion material.

The lighting system according to an embodiment of the present invention may include a controller that is operatively connected to the light source. The light source may be a light emitting semiconductor device. The controller may analyze the environmental light that is sensed and may control emitting the illuminating light. The controller may analyze the environmental light to detect or generate data relating to a condition of the environment. The data may be transmittable in data light. The controller may receive the data included in the data light using the light source, and may analyze the data included in the data light. The controller may also control transmitting the data light from the light source.

The light source may be included in an array to be selectively enabled and disabled by the controller. The array may include a plurality of light sources. Each light source may be sensitive a wavelength respective to the each light source. More specifically, a plurality of light sources may be included within an array, each of which light source being sensitive to a wavelength respective to each light source, thus providing the array sensitivity to one or more wavelength. The plurality of light sources may be selectively operable substantially simultaneously, as well as individually. The plurality of light sources may selectively emit the illuminating light in a plurality of directions and may selectively receive the environmental light from the plurality of directions.

Each of the plurality of light sources in the array may be selectively operable between a sensing operation and an emitting operation. The sensing operation may be defined by the light source sensing the environmental light, and the emitting operation being defined by the light source emitting the illuminating light. The controller may selectively operate the light source between the sensing operation and the emitting operation.

The lighting system according to an embodiment of the present invention may further comprise a switching circuit to alternate the light source between the sensing operation and the emitting operation. The light source may emit the illuminating light and may receive the environmental light substantially simultaneously. The controller may analyze the environmental light by measuring a drive voltage of the light source, determining a difference between a measured voltage across the light source and the drive voltage, and performing time-domain matching of the measured voltage and the environmental light using cross-correlation. The light source may include a light emitting diode to emit the illuminating light and a photodiode to sense the environmental light. At least a portion of the plurality of light sources included in the array may be sequentially enabled.

In an embodiment of the lighting system according to the present invention, at least a portion of the plurality of light sources included in the array may be defined as monochromatic light emitting diodes (LED). In another embodiment of the lighting system according to the present invention, at least a portion of the plurality of light sources included in the array may be defined as white light emitting diodes (LED). In yet another embodiment of the lighting system according to the present invention, at least a portion of the plurality of light sources included in the array are defined as infrared (IR) light emitting diodes (LED).

In yet another embodiment, at least a portion of the plurality of light sources included in the array are defined as blue light emitting diodes (LED), such as, for example, GaN based LEDs. A wavelength conversion material may be applied to at least one LED in the array to convert a source light into a converted light, for example, an infrared light into a blue light that may be sensed by a blue LED.

The lighting system according to an embodiment of the present invention may further comprise a network comprised of nodes. Each node may include the light source and the controller. The nodes may intercommunicate by transmitting and receiving the data light. The data light may include one or more addressing bit to address the nodes intended to receive the data. The nodes may be proximately aware of the additional nodes. The controller of a node included in the network of the nodes may receive feedback regarding an analysis performed by the controller to be stored in memory. The controller of the node may transmit the feedback from the analysis to the additional nodes, and the controller included in the nodes of the network may collectively use machine learning to analyze the feedback.

As the controller 61 may analyze information, it may generate a number of analysis results. Through the use of machine learning, the controller 61 may determine whether the result of the analysis is accurate in regard to the actual condition in the environment. If the result of a previous analysis was a success, the controller 61 may tend to make similar predictions during subsequent analysis. Conversely, if the result of a previous analysis was a failure, the controller 61 may tend to make dissimilar predictions during subsequent analysis. The modification of subsequent analysis predictions may advantageously increase the accuracy of the subsequent analysis predictions, thus more precisely matching the predictions with the actual condition of the environment.

The controller may receive feedback regarding an analysis performed by the controller to be stored in memory, and may use machine learning to analyze the feedback from the analysis. The data included in the data light may include one or more error detection bit. The wavelength conversion material may be a fluorescent material, a luminescent material, or a phosphorescent material, and the converted wavelength range of the converted light may vary depending on the condition in the environment.

The illuminating light may be received by the wavelength conversion material as the source light. The wavelength conversion material may convert the source light to the converted light, and the converted light may be emitted by the wavelength conversion material within the converted wavelength range. Similarly, the environmental light may be received by the wavelength conversion material as the source light. The wavelength conversion material may convert the source light to the converted light, and the converted light may be received by the light source within the converted wavelength range.

The converted wavelength range may include shorter wavelengths than the source wavelength range. The wavelength conversion material may convert the source light to the converted light by performing an anti-Stokes shift. Alternatively, in another embodiment of the lighting system according to the present invention, the converted wavelength range may include longer wavelengths than the source wavelength range, and the wavelength conversion material may convert the source light to the converted light by performing a Stokes shift.

The controller may be operatively connected to a voltage sensor to sense an open circuit voltage across the light emitting diode sensing the environmental light. The data light may transmit the data using pulse width modulation (PWM), pulse amplitude modulation (PAM), intensity modulation, color sequencing, and/or a duty cycle variation. In an additional embodiment, a combination of the aforementioned operations of transmitting data light may be used, which may provide an increased bandwidth of data transmission. An example combination may include multiplexing one or more of the above data transmission operations, using multiple wavelengths as data carriers to communicate the data light. A sample rate at which data is transmitted in the data light may be dynamically adjustable by the controller. Further, the data may be included in the data light digitally, and may also be encrypted. The lighting system according to an embodiment of the present invention may further include a power supply to drive the light source.

The light source of the lighting system according to an embodiment of the present invention may be operable in a pulsed mode. The controller may process the environmental light to remove noise. The controller may also characterize the luminosity of the environmental light, as well as a dominant wavelength included in the environmental light. The light source may be included on a piezoelectric substrate.

A method aspect of an embodiment of the present invention is for using a lighting system. The method may include analyzing the environmental light to detect or generate data relating to a condition of the environment, the data being transmittable in data light. The method may also include receiving the data included in the data light and analyzing the data included in the data light. The method may further include controlling transmitting the data light. The light source may be included in an array to be selectively enabled and disabled by the controller. The array may include a plurality of light sources, and each light source may be sensitive to at least one wavelength respective to the each light source. The method may further include selectively operating the plurality of light sources. According to an embodiment of the present invention, the plurality of light sources may be selectively operated substantially simultaneously, or individually.

The method may still further include selectively emitting the illuminating light in a plurality of directions and selectively receiving the environmental light from the plurality of directions. The method according to an embodiment of the present invention may also include selectively operating each of the plurality of light sources in the array between a sensing operation and an emitting operation. The sensing operation may be defined by the light source sensing the environmental light, and the emitting operation may be defined by the light source emitting the illuminating light.

BRIEF DESCRIPTION OF THE DRAWINGS

FIG. 3 is schematic diagram of an array of light emitting semiconductor devices in a lighting system according to an embodiment of the present invention.

FIGS. 3F-3J are schematic diagrams depicting an array of light emitting semiconductor devices on a substrate in a lighting system according to an embodiment of the present invention.

FIG. 6 is a schematic diagram of the lighting system according to an embodiment of the present invention showing a power supply.

FIG. 7 is a schematic diagram illustrating an embodiment of a network of nodes in a lighting system according to an embodiment of the present invention.

FIG. 8 is a perspective schematic diagram of a lighting device that may be included in the lighting system according to an embodiment of the present invention.

FIGS. 21-28 are schematic diagrams of an array of light emitting semiconductor devices of the lighting system according to an embodiment of the present invention wherein some of the light emitting semiconductor devices are in an emitting operation and some of the light emitting semiconductor devices are in a sensing operation.

DETAILED DESCRIPTION OF THE PREFERRED EMBODIMENT

Figure 1:
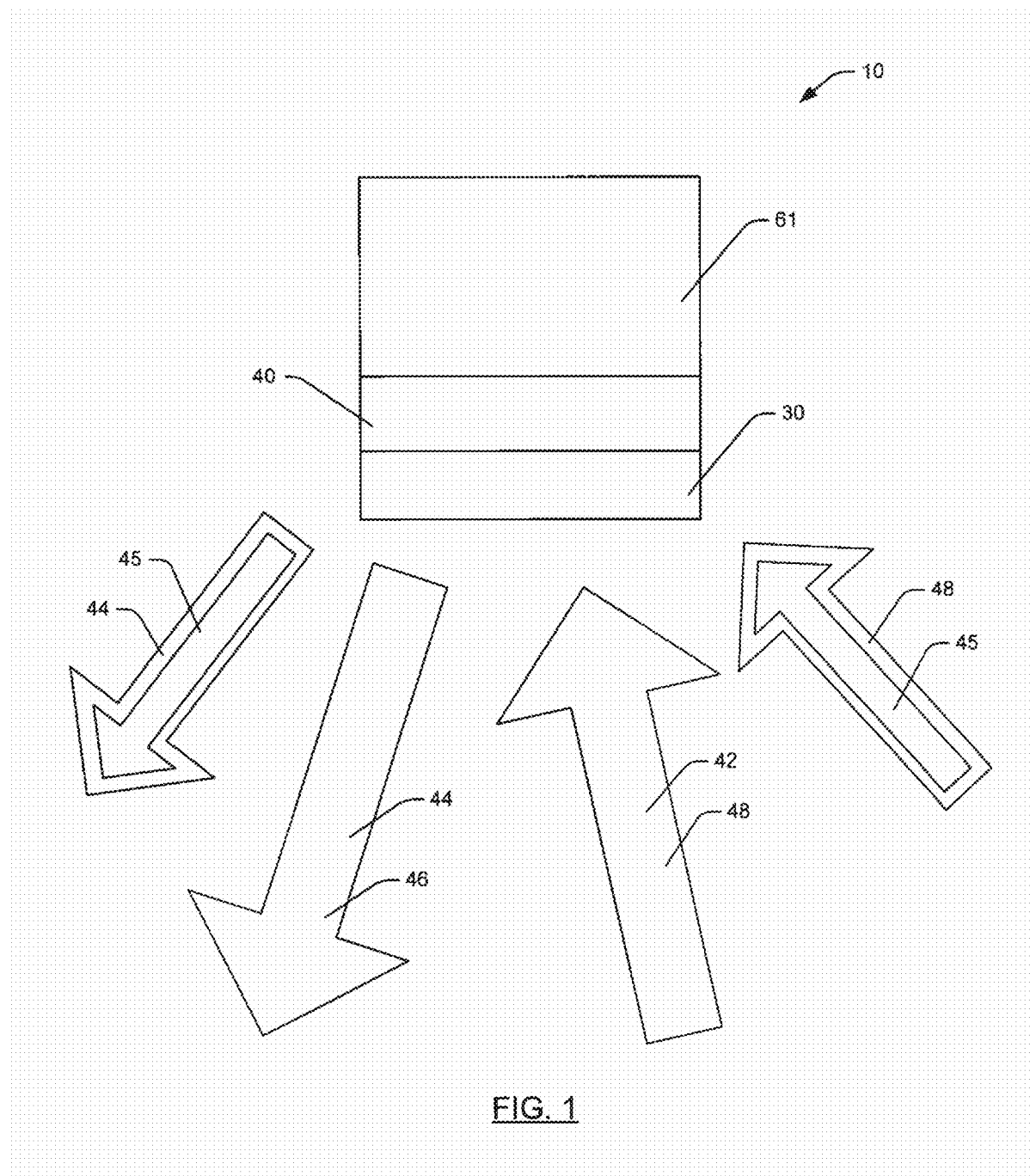
FIG. 1 is a schematic diagram of a lighting system according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of embodiments of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the embodiments of the present invention.

Referring now to FIGS. 1-30, a wavelength sensing lighting system 10, according to an embodiment of the present invention, is now described in greater detail. Throughout this disclosure, the wavelength sensing lighting system 10 may also be referred to as a lighting system, system, device, embodiment, or the invention. Alternate references to the wavelength sensing lighting system 10 in this disclosure are not meant to be limiting in any way. A person of skill in the art, after having the benefit of this disclosure, will appreciate that the present invention may include embodiments that perform total, partial, and minimal conversion of a source light 42 into a converted light 46. Additionally, skilled artisans will appreciate that, in embodiments with partial wavelength conversions, the remaining, unconverted source light 42 may be combined with the converted light 46 to be directed in the desired output direction, for example, to illuminate a space or to sense a condition in the environment.

Additionally, in the following disclosure, a light source is disclosed as a component of the lighting system 10, according to an embodiment of the present invention. The light source may be a light emitting semiconductor device 40, which may be referenced throughout the following disclosures. Additionally, a sensor may be discussed to sense environmental light 48. The sensor may be a light source, such as light emitting semiconductor device 40. In embodiments of the present invention, the operation of the sensor may be performed by a light source, such as a light emitting semiconductor device 40. As a result, the light emitting semiconductor device 40 should be assumed to collectively include the light source and the sensor in at least one embodiment of the present invention.

Furthermore, in the following disclosure, a controller 61 may be discussed to analyze the environmental light 48 sensed by the sensor and control the emission of illuminating light 44 by the light source. The sensor and the light source may be a light emitting semiconductor device 40. The controller 61 may collectively include an analysis processor to analyze sensed environmental light 48 and a lighting controller to control emitting illuminating light 44.

The controller 61 may be a computerized device capable of sending, receiving, and analyzing data and electronic signals. The controller 61 may control one or more light source, which may be included in an array 39. However, the functionality of the controller 61 should not be limited to light source controlling operations. The controller 61 may additionally accept and analyze data or electronic signals received from one or more sensor. The controller 61 may perform the operations of both the analysis processor and the lighting controller, among numerous other operations that would be apparent to those skilled in the art. Skilled artisans will additionally appreciate that the controller 61 may be described broadly herein as a computerized device to perform computational operations, including processing data.

Skilled artisans will appreciate additional embodiments of a light source, for example, and without limitation, electroluminescent, laser, incandescent, and fluorescent light sources. Although the light source may be discussed in regard to a specific embodiment of a light emitting semiconductor device 40, a person of skill in the art will appreciate that additional light sources may be included with the operation of the various embodiments of the present invention, are intended to be included within the scope of the same. As a result, skilled artisans should not view the use of a light emitting semiconductor device 40 through this disclosure as limiting the scope of the light source.

As perhaps best illustrated in FIG. 1, according to an embodiment of the present invention, the lighting system 10 may include one or more light emitting semiconductor devices 40 capable of emitting an illuminating light 44. The light emitting semiconductor device 40 may be operatively connected to a controller, which may control the operation of the light emitting semiconductor devices. The lighting system 10 may optionally include a sensor, which may be a photodiode 41 or charge-coupled device (FIG. 6). The light emitting semiconductor device 40 may additionally sense and receive an environmental light 48. Skilled artisans will appreciate environmental light 48 to include ambient light sensed from an environment and light reflected from the environment, which may have initiated as illuminating light 44. Environmental light 48 may also include illuminating light 44 emitted by an adjacent light source, such as a light emitting semiconductor device 40. In embodiments wherein the sensor is a light emitting semiconductor device 40, the environmental light 48 may additionally include any light that is not being emitted by the light emitting semiconductor device 40 that is presently sensing environmental light 48. Data light 45 may be included in the illuminating light 44 and/or the environmental light 48.

In an embodiment of the present invention, the illuminating light 44 may be at least partially absorbed by a wavelength conversion material 30 as a source light to be subsequently emitted as a converted light 46. The wavelength conversion material 30 may additionally be referred to as a conversion material 30, without limitation. Similarly, the environmental light 48 may be at least partially absorbed by a conversion material 30, a source light 42 to be subsequently emitted as a converted light 46. A person of skill in the art will appreciate that a plurality of light emitting semiconductor devices may be configured in an array 39, which may be operatively connected to the controller 61.

The light emitting semiconductor device 40 may, for example, include light emitting diodes (LEDs) capable of emitting illuminating light 44 in a wavelength range determined by the characteristics of the LED. Other embodiments of the present invention may include illumining light 44 that is generated by a laser based light emitting semiconductor device 40. Those ski/led in the art will appreciate that the illuminating light 44 may be provided by any number of lighting devices, which may include, but should not be limited to, additional light emitting devices.

An LED may emit light when an electrical current is passed through the diode in the forward bias. The LED may be driven when biased in the forward direction. Skilled artisans will understand the operation by which an LED may produce light, such as through the recombination of electron-hole pairs. The color of the emitted light may be determined by the materials used in the construction of the light emitting semiconductor device 40. A laser diode is another type of a light emitting semiconductor device that may emit an illuminating light 44. A laser diode may be comprised of a semiconductor doped to include a p-n junction, and may emit light as an electrical current is applied across the junction.

In an embodiment of the present invention, the source wavelength range may include an illuminating light 44 emitted in blue or ultraviolet wavelength ranges. However, a person of skill in the art, after having the benefit of this disclosure, will appreciate that LEDs capable of emitting light in any number of wavelength ranges may be included in the definition of the light emitting semiconductor device 40, such as, for example, infrared light. A skilled artisan will also appreciate, after having the benefit of this disclosure, additional light generating devices that may be used as the light emitting semiconductor device 40 which are capable of creating an illumination.

As previously discussed, embodiments of the present invention may include a light emitting semiconductor device 40 that generates illuminating light with a wavelength range in the blue spectrum. The blue spectrum may include light with a wavelength range between about 400 and 500 nanometers. An illuminating light 44 in the blue spectrum may be generated by a light emitting semiconductor device 40 that is comprised of materials that emit a light in the blue spectrum. Examples of such light emitting semiconductor device materials may include, but are not intended to be limited to, zinc selenide (ZnSe) or indium gallium nitride (InGaN). These semiconductor materials may be grown or formed on substrates, which may be comprised of materials such as sapphire, silicon carbide (SiC), or silicon (Si). Additionally, an embodiment of the light emitting semiconductor device 40 may be removed from the substrate 38. In this embodiment, the light emitting semiconductor device 40 may optionally be bonded to another surface or material. A person of skill in the art will appreciate that, although the preceding semiconductor materials have been disclosed herein, any semiconductor device capable of emitting a light in the blue spectrum is intended to be included within the scope of the described embodiments of the present invention.

Additionally, as previously discussed, embodiments of the present invention may include a light emitting semiconductor device 40 that generates illuminating light 44 with a wavelength range in the ultraviolet spectrum. The ultraviolet spectrum may include light with a wavelength range between about 200 and 400 nanometers. An illuminating light 44 in the ultraviolet spectrum may be generated by a light emitting semiconductor device 40 that is comprised of materials that emit a light in the ultraviolet spectrum. Examples of such light emitting semiconductor device materials may include, but are not intended to be limited to, diamond (C), boron nitride (BN), aluminum nitride (AlN), aluminum gallium nitride (AlGaN), or aluminum gallium indium nitride (AlGaInN). These semiconductor materials may be grown or formed on substrates, which may be comprised of materials such as sapphire, silicon carbide (SiC), or Silicon (Si). Additionally, an embodiment of the light emitting semiconductor device 40 may be removed from the substrate 38. In this embodiment, the light emitting semiconductor device 40 may optionally be bonded to another surface or material. A person of skill in the art will appreciate that, although the preceding semiconductor materials have been disclosed herein, any semiconductor device capable of emitting a light in the ultraviolet spectrum is intended to be included within the scope of the described embodiments of the present invention.

Furthermore, as previously discussed, embodiments of the present invention may include a light emitting semiconductor device 40 that generates illuminating light 44 with a wavelength range in the infrared spectrum. The infrared spectrum may include light with a wavelength range between about 700 and 1400 nanometer, which would be appreciated by skilled artisans to be included in the IR-A specification, as determined by the International Commission on Illumination (CIE). Skilled artisans will additionally appreciate that infrared light emitting semiconductor devices 40, as included herein, may additionally emit and light within a wavelength range between about 1400 nanometers and 1 millimeter, which includes the wavelength ranges of the IR-B and IR-C specifications, as defined by the CIE.

An illuminating light 44 in the infrared spectrum may be generated by a light emitting semiconductor device 40 that is comprised of materials that emit light in the infrared spectrum. Examples of such light emitting semiconductor device materials may include, but are not intended to be limited to, gallium arsenide (GaAs), gallium antimonide (GaSb), iridium phosphide (InP), or silicon germanium (SiGe). These semiconductor materials may be grown or formed on substrates, which may be comprised of materials that would be appreciated by skilled artisans. Additionally, an embodiment of the light emitting semiconductor device 40 may be removed from the substrate 38. In this embodiment, the light emitting semiconductor device 40 may optionally be bonded to another surface or material. A person of skill in the art will appreciate that, although the preceding semiconductor materials have been disclosed herein, any semiconductor device capable of emitting a light in the infrared spectrum is intended to be included within the scope of the described embodiments of the present invention.

According to an embodiment of the present invention, the lighting system 10 may include various native light emitting semiconductor devices which, when combined, may create virtually any color within the visible spectrum. A native light emitting semiconductor device 40 may be defined as a semiconductor device that is not located adjacent to a wavelength conversion material 30. For clarity, and without the intent to be limiting, the lighting system may include light emitting semiconductor devices that emit an illuminating light 44 in red, blue, and green colors. Those skilled in the art of chromaticity, and more specifically metamerism, will appreciate that red, green, and blue lights may be received by the human eye. By combining these primary colors, the human eye may perceive virtually all colors in the visible light spectrum.

Skilled artisans will appreciate that primary colors may or may not be metameric colors. Metamerism may include light sources that have substantially the same chromaticity coordinates as the primary colors, but differ with respect to the wavelength ranges of the included light. In an embodiment of the present invention, a metameric pair of light sources may include two light sources with different spectral power distributions, or more generally wavelength distributions, which appear substantially indistinguishable to the human eye. As a result, the specific wavelengths of light emitted and received by lighting system 10 may be modified, while a substantially constant chromaticity is maintained, resulting in substantially the same color light being perceived by human observers.

In an embodiment of the lighting system 10 of the present invention, wherein the light emitting semiconductor devices are configured with regard to metamerism, lighting emitting semiconductors relating to each metameric color may be controlled separately and/or independently from one another.

As the intensity of a color may increase, the quantity of light that may include the three aforementioned metameric colors may also increase. To provide higher efficacy light emission, a white light emitting semiconductor device may be included in the lighting system 10 to emit light that otherwise would require a plurality of color-specific light emitting semiconductor devices. The inclusion of a white light emitting semiconductor device 40 within a metameric system, such as a system including red, blue, and green light emitting semiconductor devices, has been discussed in greater detail in U.S. patent application Ser. No. 13/107,928 to Maxik, et al., the entire contents of which is incorporated herein by reference.

The lighting system 10 may additionally control the light emitted by the light emitting semiconductor device 40 by including a MEMS device. The MEMS device may be further described in U.S. patent application Ser. No. 13/073,805 to Maxik, et al., the entire contents of which is incorporated herein by reference. In an embodiment of the present invention, the MEMS device may be included and located adjacent to the light emitting semiconductor device 40 and/or the conversion material 30. Such a MEMS device may selectively transmit illuminating light 44 in a desired output direction. The MEMS device may additionally direct environmental light to a sensor, such as a photodiode 41 or a light emitting semiconductor device 40 currently sensing environmental light 48. The MEMS device may be communicatively connected to a controller 61, which may be used to selectively and dynamically enable or disable the micromirrors included in the MEMS device.

The light emitting semiconductor device 40, according to an embodiment of the present invention, may include an organic light emitting diode (OLEO). An OLEO may be comprised of an organic material that may emit light when an electric current is applied. The organic material may be positioned between two electrodes. Typically, at least one of the electrodes may be transparent.

As will be understood by skilled artisans, illuminating light 44 may be emitted by a light emitting semiconductor device 40 in a plurality of directions. Additionally, by enabling selected light emitting semiconductor devices, the direction in which illuminating light 44 is emitted may be controlled. The selective enablement of illuminating light emission in a desired output direction may occur by controlling various light emitting semiconductor devices included in a package. Alternatively, the selective enablement of illuminating light emission in a desired output direction may occur by controlling various light emitting semiconductor devices included in an array 39. The light emitting semiconductor devices may be controlled by an operatively connected controller.

Color-mixing, luminosity, and duty cycle of the light emitting semiconductor device 40 may be controlled using pulse width modulation (PWM). PWM is a technique known within the art for controlling power to electrical devices, which operates by quickly switching power between an "on" state and "off" state during each period. The period is the time between each pulse, similar to a dock rate. The ratio of the pulse period occupying the "on" state versus the "off" state defines the duty cycle. As the PWM varies the duration that the switch is kept at the "on" state, the PWM is able to vary the average power to the load device. PWM switching can be beneficial from an efficiency perspective, since it has low power loss when switched in the "off" state.

For lighting devices, the frequency of pulses in the PWM circuit must be sufficiently fast enough that the human eye cannot perceive the strobe effect. To have an increasingly high pulse frequency, the period must become increasingly short. The intensity of each individual color may be controlled via variations in the duty cycle of each pulse period. With light sources that are slow to react, such as incandescent light bulbs, a relatively low pulse frequency may be required. Conversely, PWM circuits that may be used to control a perceived intensity of light from a light emitting semiconductor device 40 must be operable at considerably higher frequencies, or otherwise risk producing visual flicker.

To achieve color mixing, a controller 61 including a PWM circuit may control the duty cycle on all wavelengths intended to be mixed. Typically, as discussed above, virtually any color in the visible spectrum can be created through the use of a red, green, and blue color source. With a color mixing system based on PWM circuits, the system may adjust the duty cycle for each primary color by combining the adjusted primary colors to display the desired color. Additionally, according to an embodiment of the present invention, the PWM circuits in the controller 61 may control the light emitting semiconductor devices, included in the lighting system 10, dynamically. Furthermore, the controller 61 may control the light emitting semiconductor devices with PWM independently and/or collectively, as necessary.

Figure 2:
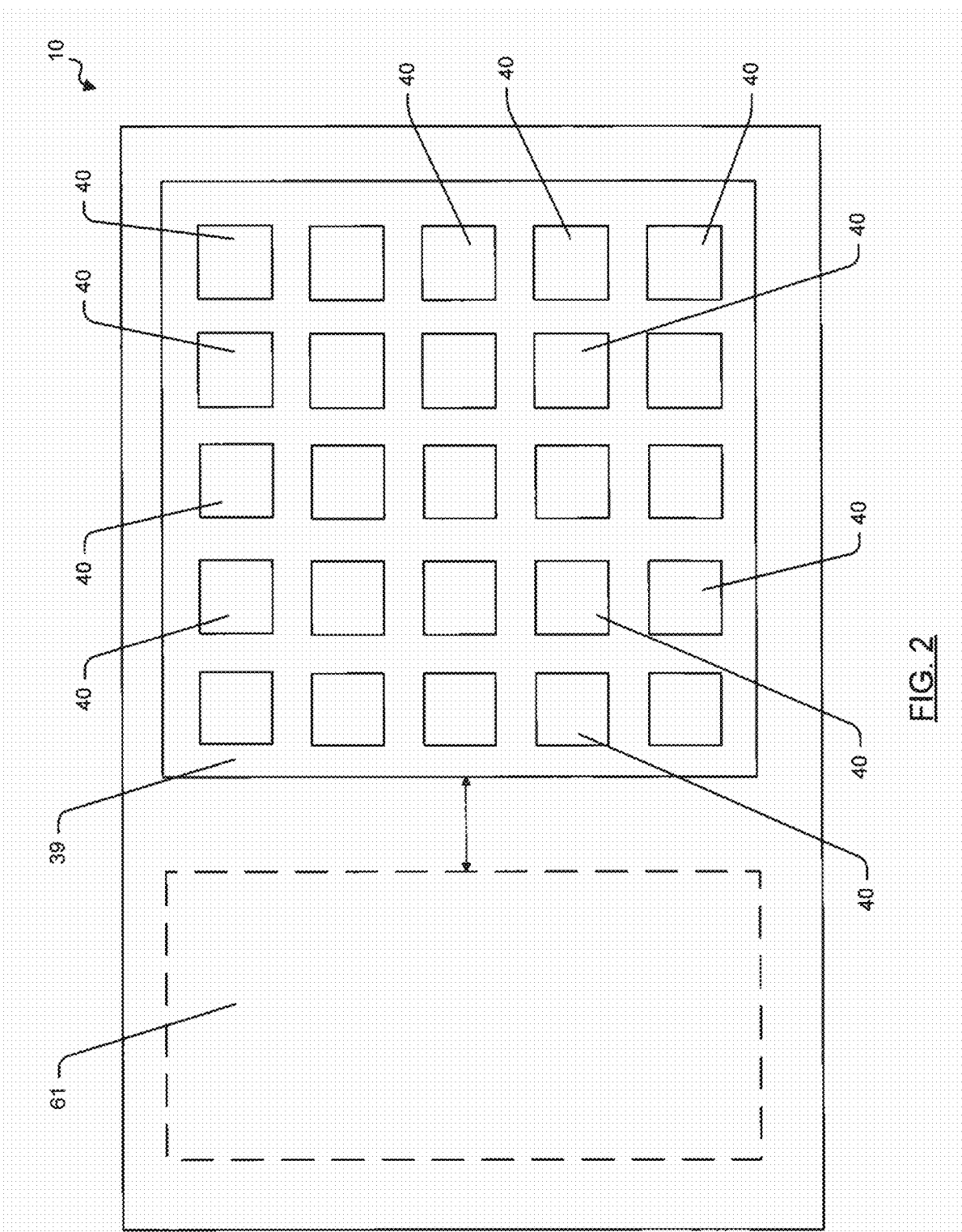
FIG. 2 is a schematic diagram of a lighting system according to an embodiment of the present invention showing a plurality of light emitting semiconductor devices arranged in an array.

Referring now to FIG. 2, the array of light emitting semiconductor devices will now be discussed greater detail. An array 39 may be uni-dimensional or multidimensional, e.g., one, two, or three dimensional. The array 39 may comprise a linear, rectangular, annular or other configuration comprising a plurality of light sources. In one embodiment, the light sources comprise light emitting semiconductor devices 40.

The light emitting semiconductor devices may be part of an array 39, or a collective system of light emitting semiconductor devices densely located in a small area. Several light emitting semiconductor devices may be operatively connected to a controller 61 to form the array 39. Additionally, a plurality of light emitting semiconductor devices may be packaged together, for example, on a single semiconductor. Packages of light emitting semiconductor devices may also be densely included adjacent to each other to form an array 39. A person of skill in the art will appreciate that some arrays of light emitting semiconductor devices, such as with larger arrays, may be packaged on multiple semiconductors, which may be interconnected and may intercommunicate as a collective lighting system.

The array of light emitting semiconductor devices may be operatively connected to a controller 61. The controller 61 may process the information received by one or more light emitting semiconductor devices included in the array 39 to determine control signals that may operate the additional light emitting semiconductor devices in the array 39. The control signals may be used to control the operation of a light emitting semiconductor device 40 between the emitting illuminating light 44 and sensing environmental light 48. Those skilled in the art will appreciate that the environmental light 48 may or may not be converted by the conversion material 30. Through the selective operation of the individual light emitting semiconductor devices included in the array, the lighting system 10, according to an embodiment of the present invention, may advantageously control the characteristics of the illuminating light 44 emitted by the array 39 into the environment.

Referring now additionally to FIG. 3, additional features of the array of light emitting semiconductor devices, as it may be included in the lighting system 10 will now be discussed. An array 39 may include at least one light emitting semiconductor device 40. The array 39 may be organized in a grid configuration, such as illustrated by FIG. 3. Various grid configurations may be used, which may include the non-limiting example of a square grid presented in FIG. 3. However, a person of skill in the art will appreciate that the array may be organized in any configuration to allow for the emission of illuminating light 44 to, and sensing of environmental light 48 from an environment. For clarity, the array of FIG. 3 is represented as a grid of five by five light emitting semiconductor devices. However, an array 39 may include any number of light emitting semiconductor devices, and not necessarily the number of light emitting semiconductor devices depicted in FIG. 3. A person of skill in the art will appreciate that, although the disclosure provided herein contemplates an array 39 with a plurality of light emitting semiconductor devices, embodiments of the present invention may include arrays with as little as one light emitting semiconductor device 40, and still be included within the scope and spirit of the present invention.

The inclusion of light emitting semiconductor devices configured in a phased array will now be discussed. As previously discussed, a plurality of light emitting semiconductor devices may be included in an array 39. In one embodiment, the array of light emitting semiconductor devices may be operated as a phased array. In one example, a phased array may be configured as a mosaic of independent transducer elements (e.g., photon emitters and photon receivers in this example) in which the timing, intensity, direction, and/or color can be independently controlled to produce effects, such as, for example, beam steering and targeting.

These effects may be employed for ranging, sensing, pattern detection, and communications among others. In the context of one embodiment, a phased array of light emitting semiconductor devices is an array 39 of substantially incoherent optical sources, which may be independently controlled with respect to one or more of the timing, duration, intensity, polarization of photon emission, and color. In additional embodiments, the phased array may also be individually controlled with respect to the physical orientation and motion of the optical emitter. Beam forming and targeting can be accomplished with specific pulsing, time delays, phase shifting and interrelationship (e.g., among pulses) and, in some cases, orientation changes and motion of the emitters. In one embodiment, optical heterodyning may be employed, as will be appreciated by those skilled in the art.

In one embodiment, sequential and temporally correlated PWM of individual light emitting semiconductor devices 40 of the array 39 in conjunction with temporally correlated sensing function and operation may be used to sense conditions in the environment. For example, in one embodiment, a single light emitting semiconductor device 40 may be powered, or operable in an emitting operation, and light emitting semiconductor devices included in the array may be used for detection, or operable in the sensing operation (e.g., during one or more duty cycles). In another embodiment, scanning along particular geometries of the array 39 can be used to resolve environmental signals, e.g., scanning along the vertical, horizontal, or diagonals of a rectangular array 39. A person of skill in the art will appreciate that the use of a rectangular array has been provided above in the interest of clarity, is not intended to be limiting.

Alternatively or additionally, multi-color scanning, including the use of metameric whites, may be used for greater resolution. Signal processing of the sensed data may be correlated with the illuminating light to characterize the environment. Mathematical analysis and signal processing techniques, including Fourier transforms, may be used to analyze the data.

Figure 3A:
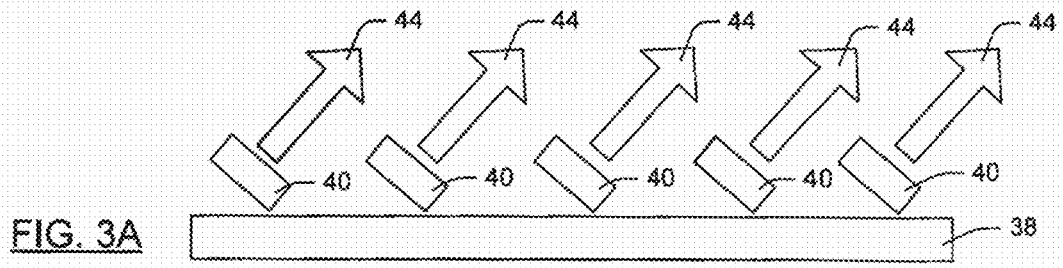
FIGS. 3A-3E are schematic diagrams depicting an array of light emitting semiconductor devices on a substrate and arranged to emit illuminating light in various directions (FIGS. 3A-3D) and receive environmental light from various directions (FIG. 3E).
Figure 3B:
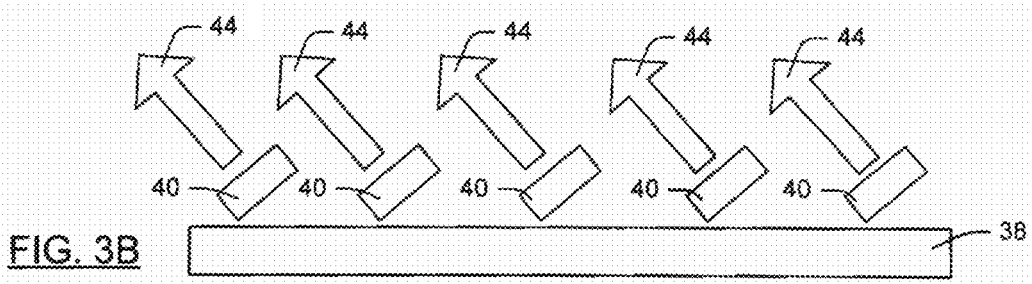
Figure 3C:
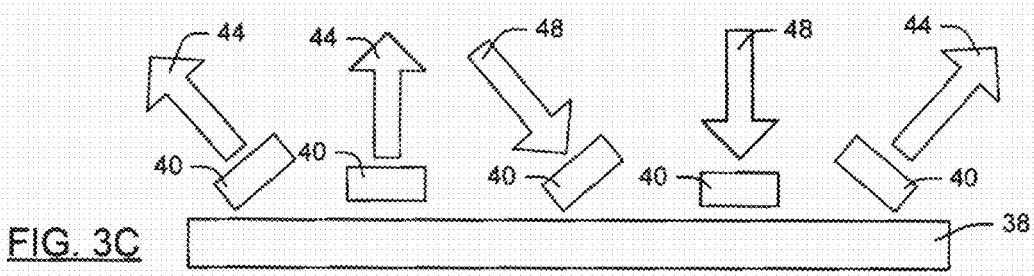
Figure 3D:
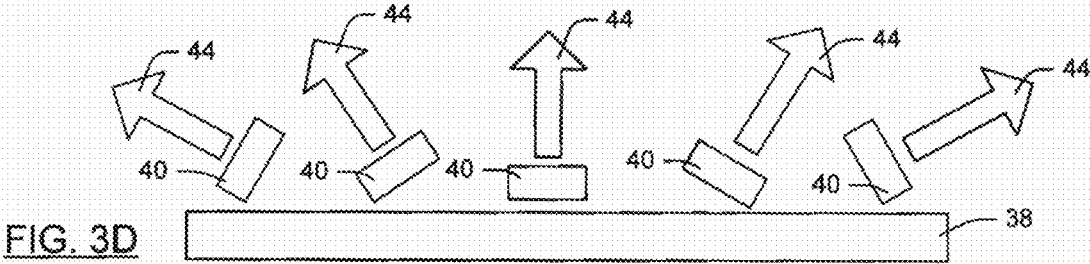
Figure 3E:
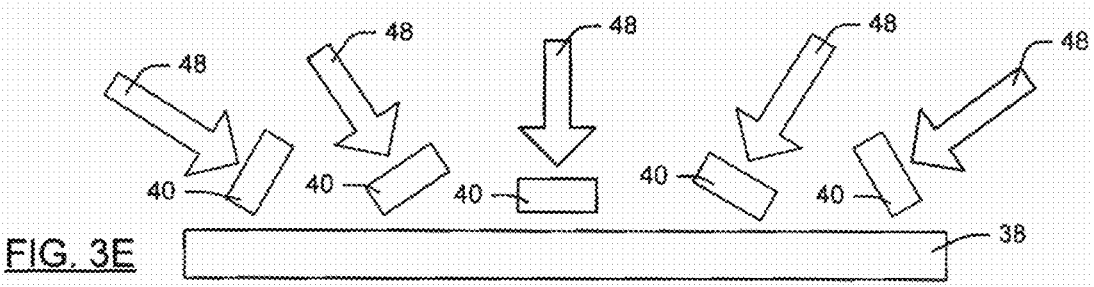

Referring now to FIGS. 3A-3E, the inclusion of a deformable substrate will now be discussed. More specifically, the deformable substrate used to create movable light emitting semiconductor devices, and resulting relative oscillations, will now be discussed. FIGS. 3A-3E illustrate various configurations of light emitting semiconductor devices included on a deformable substrate, which may be directed in a plurality of directions to emit illuminating light 44 or sense environmental light 48. As illustrated in FIGS. 3A-3B, the light emitting semiconductor devices may be repositioned substantially uniformly. Also, as illustrated in FIGS. 3C-3E, the light emitting semiconductor devices may be selectively repositioned independently. The light emitting semiconductor device 40 repositioned by the deformable substrate, which may be a piezoelectric substrate, may emit illuminating light 44 (FIGS. 3A-3D) and/or sense environmental light 48 (FIGS. 3C-3E) from a plurality of dynamically variable directions. Additionally, one or more stationary light emitting semiconductor devices may be included with the light emitting semiconductor devices that are repositionable by the deformable substrate in an array 39.

In one embodiment, the array 39 may include a deformable board of light emitting semiconductor device dies. Alternatively, an array of light emitting semiconductor devices may include an array of independently variable and repositionable light emitting semiconductor device dies, of which some or all of the light emitting semiconductor devices may be configured such that orientation of one or more individual light emitting semiconductor devices that may be varied. Variance of the configuration of the individual light emitting semiconductor devices may be accomplished for instance, by placing the light emitting semiconductor devices on a piezoelectric substrate.

A piezoelectric substrate may deform when electrically addressed, thereby changing the orientation of one or more light emitting semiconductor devices located adjacent to the piezoelectric substrate. A plurality of piezoelectric substrates may be included with respect to the array 39, allowing the light emitting semiconductor devices included in the array 39 to be collectively or independently movable. For example, a light emitting semiconductor device 40 located adjacent to a piezoelectric substrate may extend in front or behind the plane formed by the array 39, or may oscillate about a plane relative to the array 39.

Additionally, a light emitting semiconductor device 40 may be rotated or inclined with respect to its initial orientation such that the plane of an individual die is deflected such that the plane of light emitting semiconductor device 40 dies may no longer be parallel with the plane of the array 39. In another embodiment, this rotation or deflection may be oscillatory, periodic, consistent with another pattern, or may occur dynamically with no predetermined pattern.

As examples, a single substrate 38 of piezoelectric or other controllable deformable system may be used for the array 39. Additionally, one or more dies may be attached to, and be associated with, individually addressable deformable or movable elements that allow the light emitting semiconductor devices to move independently of one another. Because the position and orientation of one or more light emitting semiconductor devices can be independently controlled, light emitting semiconductor devices can be deflected, rotated, or inclined in or out of the plane of the array 39, parallel to the plane in the case of simple displacement or inclined with respect to the plane in deflection.

In some embodiments, the position and orientation of light emitting semiconductor devices may be changed in a periodic fashion such that individual light emitting semiconductor devices move, rotate, and/or deflect about a zeroth position in a cyclic oscillatory manner. Individual light emitting semiconductor devices may be positionally and orientationally driven in a phased relationship with other light emitting semiconductor devices (either part of the array or another array).

The light emitting semiconductor devices may be driven with pulse width modulation (PWM), pulse amplitude modulation (PAM), or additional data incorporation protocols that would be apparent to a skilled artisan after having the benefit of this disclosure. The driving modulation or protocol may generate varying intensities and durations of light output in coordination and conjunction with their actual position or orientation and/or with their periodic displacements of position and orientation.

In another embodiment, specific optics may be applied to one or more light emitting semiconductor devices 40, which may be included in portions of an array 39, to improve the resolution sensed by the light emitting semiconductor device 40. The resolution may be improved by allowing an individual light emitting semiconductor device 40, or portions of the light emitting semiconductor devices 40 included in an array 39, to detect different regions of an illuminated area. For example, light emitting semiconductor devices 40 may illuminate to, and/or sense light from, multiple directions substantially simultaneously. A person of skill in the art will appreciate that the light emitting semiconductor device 40 may additionally detect wavelengths in an area that has not been illuminated by a light emitting semiconductor device 40.

Referring additionally to FIGS. 3F-3J, the use of the aforementioned modulation or data incorporation protocols may afford the lighting system 10 the ability to position and orient individual light emitting semiconductor devices, or arrays thereof, and to control same in a real time dynamic manner.

More specifically, the light emitting semiconductor devices may be controlled using, for example, periodic oscillations, to drive the changes in orientations and position in a phased relationship amongst light emitting semiconductor devices. These configurations may include orientations wherein the light emitting semiconductor devices are in-phase (FIG. 3F), or various out-of-phase configurations (FIGS. 3G-3J).

In an additional embodiment, the positional control of the light emitting semiconductor devices may be coupled with the ability to alter the color, intensity, and light pulse duration of each light emitting semiconductor device 40 in a similar phased relationship. Beam targeting, communication protocols, detection, and ranging, among many other capabilities can be achieved, as would be appreciated by a person of skill in the art.

In additional embodiments, the polarization of the emitted light may also be dynamically controlled allowing an additional characteristic of the emitted light from each light emitting semiconductor device 40 to be modulated. Varying polarizations using optics, nematic crystals, and the like are well known in the art. Spatial light modulators are well known and may be additionally used to modulate amplitude and phase of the light emitted from light emitting semiconductor devices and arrays.

The conversion material 30, as it may be included in an embodiment of the present invention, will now be discussed in greater detail. The conversion material 30 may be located adjacent to the light emitting semiconductor device 40. The conversion material 30 may alter a source wavelength range of the source light 42 into a converted wavelength range of a converted light 46. As mentioned above, a source light 42 may include any light absorbed by the conversion material 30. Additionally, converted light 46 may include any light emitted by the conversion material 30 after shifting the wavelength range from the source wavelength range to the converted wavelength range.

In this disclosure, the conversion material 30 may be described as a structural element that may be located adjacent to a light emitting semiconductor device 40. Skilled artisans should appreciate an additional embodiment of the conversion material 30 to include the direct application of the conversion material 30 to the light emitting semiconductor device 40, effectively resulting in a conversion coated light emitting semiconductor device.

The conversion material 30 may preferably include a fluorescent, luminescent, or phosphorescent material capable of converting light with a source wavelength range into a light with one or more converted wavelength ranges. The material may be included in, or applied to, an additional component, such as the light emitting semiconductor device 40. However, it will be appreciated by skilled artisans that any wavelength conversion material capable of converting a light from one wavelength range to another wavelength range may be included in the definition of a conversion material 30, and is intended to be included within the scope and spirit of embodiments of the present invention.

A conversion material 30 may be included within the bulk material of another component, such as an enclosure or fixture that may be located in line between the light emitting semiconductor device 40 and the environment, according to an embodiment of the present invention. In this embodiment, the conversion material 30 may be suspended or incorporated in the bulk material that comprises the other component. The bulk material may include, but should not be limited to, glass or polymeric materials. Skilled artisans will understand polymeric materials to include, among other things, plastics, sol-gels, and spin-on glasses. In a non-limiting example, wherein the conversion material 30 is included in a polymeric bulk material, a solid optic may be formed or molded from a polymeric material in the liquid state. The conversion material 30 may be infused into the liquid polymeric material prior to the solidification into a solid optic. Alternatively, the conversion material 30 may be included in a bulk material prior to, or during, a polymerization process. A person of skill in the art will appreciate that, in the present non-limiting example, the conversion material 30 may be infused into liquid plastic homogeneously, methodologically, sporadically, or randomly.

An additional embodiment of the conversion material 30 may include a conversion coating comprising a fluorescent or luminescent material, which may further include a phosphor material, and may after the wavelength range of light that may be absorbed by, and emitted from, the coating. A source wavelength range may be converted into one or more converted wavelength ranges. A source light 42 may include a monochromatic, bichromatic, or polychromatic light emitted by one or more light sources. For the sake of clarity, references to a source light 42, and its corresponding source wavelength range, should be understood to include the light received from the one or more light sources, sensed from the environment, that is received by the lighting system 10. Correspondingly, a source wavelength range should be understood to be inclusive of the wavelength ranges included in monochromatic, bichromatic, and polychromatic source lights.

Additionally, a source light 42 with a source wavelength range may be converted by the conversion material 30, which may be located adjacent to another component, such as the light emitting semiconductor device 40, into a converted light 46 with one or more converted wavelength ranges. The use of multiple phosphor and/or quantum dot elements may produce a light that includes multiple discrete or overlapping wavelength ranges. These wavelength ranges may be combined to produce the converted light 46. For further clarity in the foregoing description, references to a converted light 46, and its corresponding converted wavelength ranges, should be understood to include all wavelength ranges that may be produced as the source light 42 may be received and converted by the conversion material 30.

Luminescence is the emission light without the requirement of being heated. This is contrary to incandescence, which requires the heating of a material, such as a filament through which a current may be passed, to result in illumination. Luminescence may be provided through multiple processes, including electroluminescence and photoluminescence. Electroluminescence may occur as a current is passed through an electronic substance, such as a light emitting diode or a laser diode. Photoluminescence may occur as light from a first wavelength range may be absorbed by a photoluminescent material to be emitted as light in a second wavelength range. Photoluminescent materials may include fluorescent materials and phosphorescent materials.

A fluorescent material may absorb light within a first wavelength range, the energy of which may be emitted as light within a second wavelength range. The absorption and emission operation will be described in greater detail below. A non-limiting example of a fluorescent material may include the coating on a fluorescent light bulb. Fluorescent materials may include, but should not be limited to, phosphors and quantum dots.

Phosphorescent material involves the absorption and emission of light, similar to that of a fluorescent material, however with differing energy state transitions. These differing energy state transitions may result in a delay between the absorption of light in the first wavelength range and the emission of light in the second wavelength range. A non-limiting example of a device with a phosphorescent material may include glow-in-the-dark buttons on a remote controller. Phosphorescent materials may include, but should not be limited to, phosphors.

A phosphor substance may be illuminated when it is energized. Energizing of the phosphor may occur upon exposure to light, such as the source light 42, for example. The wavelength of light emitted by a phosphor may be dependent on the materials of the phosphor. Typically, phosphors may convert a source light 42 into a converted light 46 within a wide converted wavelength range, as will be understood by skilled artisans.

A quantum dot substance may also be illuminated when it is energized. Energizing of the quantum dot may occur upon exposure to light, such as the source light 42. Similar to a phosphor, the wavelength of light emitted by a quantum dot may be dependent on the materials of the quantum dot. Typically, quantum dots may convert a source light 42 into a converted light 46 within a narrow converted wavelength range, as will be understood by skilled artisans.

The conversion of a source wavelength range into a converted wavelength range may include a shift of wavelength ranges, which may be known to those skilled in the art as a Stokes shift. During a Stokes shift, a portion of the source wavelength range may be absorbed by a conversion material 30. The absorbed portion of source light 42 may include light within a selective wavelength range, such as, for example, a biologically affective wavelength range. This absorption may result in a decreased intensity of light within the source wavelength range.

The portion of the source wavelength range absorbed by the conversion material 30 may include energy, causing the atoms or molecules of the conversion material 30 to enter an excited state. The excited atoms or molecules may release some of the energy caused by the excited state as light. The light emitted by the conversion material 30 may be defined by a lower energy state than the source light 42 that may have caused the excited state. The lower energy state may result in wavelength ranges of the converted light 46 to be defined by light with longer wavelengths.

A person of skill in the art will appreciate additional wavelength conversions that may emit a light with shorter wavelength ranges to be included within the scope of the present invention, as may be defined via the anti-Stokes shift. When performing an anti Stokes shift, a conversion material 30 typically combines two or more photons of a low energy source light 42, which may result in the emission of a single photon of high energy converted light 46.

As will be understood by a person of skill in the art, the energy of the light absorbed by the conversion material 30 may shift to an alternate energy of light emitted from the conversion material 30. Correspondingly, the wavelength range of the light absorbed by the conversion material 30 may be scattered to an alternate wavelength range of light emitted from the conversion material 30. If a light absorbed by the conversion material 30 undergoes significant scattering, the corresponding emitted light may be a low energy light within a wide wavelength range. Substantial scattering characteristics may be definitive of a wide production conversion coating. Conversely, if the light absorbed by the conversion material undergoes minimal scattering, the corresponding emitted light may be a low energy light within a narrow wavelength range. Minimal scattering characteristics may be definitive of a narrow production conversion material. A person of skill in the art will appreciate alternative energy conversions wherein an anti-Stokes shift may occur.

Due to the directional nature of the energy shift performed by a conversion material 30, the energy of the source light 42 may be converted in one direction to the converted light 46. In application, a light emitting semiconductor device 40 may emit illuminating light 44 to be converted by the conversion material 30 into a higher energy light via an anti-Stokes shift. However, as the conversion material 30 may receive environmental light 48, an additional anti-Stokes conversion may occur prior to being sensed by the light emitting semiconductor device 40. This difference may be detected and compensated by the controller 61.

In an embodiment of the lighting system 10 according to the present invention, a plurality of conversion materials may be located adjacent to the one or more light emitting semiconductor device 40 to generate a desired output color or chromaticity. For example, a plurality of phosphors and/or quantum dots may be used that are capable of generating green, blue, and/or red converted light 46. When these conversion materials are located adjacent to one or more light emitting semiconductor device 40, which may be included in an array 39, the materials produce a converted light 46 in the converted wavelength range of the corresponding conversion material 30.

A person of skill in the art will appreciate chromaticity to objectively relate to the color quality of a light, independent from the quantity of its luminance. Additionally, skilled artisans will appreciate that chromaticity may be determined by a plurality of factors, including hue and saturation. The chromaticity of a color may be further characterized by the purity of the color as taken together with its dominant and complimentary wavelength components.

In an additional embodiment of the lighting system 10 according to the present invention, one or more conversion material 30 may be located adjacent light emitting semiconductor devices to generate a desired output color or chromaticity. In an additional embodiment of the present invention, the desired chromaticity may define a non-saturated color.

For example, and without limitation, a plurality of phosphors and/or quantum dots may be used that are capable of converting a high energy source light 42, which may include a high concentration of light in the ultraviolet to blue wavelength ranges, into a lower energy converted light 46, which may include a high concentration of light in the yellow to red wavelength ranges. When the converted light 46 is combined with the unconverted source light 42, white light may be formed. This white light may then be directed in the desired output direction.

For clarity, the following non-limiting example is provided wherein a single light emitting semiconductor device 40 may be located adjacent to a yellow conversion material 30. A person of skill in the art will appreciate that any number of light emitting semiconductor devices may be included within the wavelength conversion device 10, according to embodiments of the present invention, and the present example is provided without limiting the wavelength conversion device 10 to a single light emitting semiconductor device 40. The yellow conversion material may include a yellow emitting silicate phosphor material. More specifically, as an example, the yellow emitting silicate phosphor may include an orthosilicate phosphor material, which may be doped with rare earth materials. The light emitting semiconductor device 40 may be a blue LED. The yellow emitting silicate conversion material may be evenly distributed on the surface of, or in the bulk material located adjacent to, the light emitting semiconductor device 40. A uniform distribution of the conversion material 30 may result in the uniform conversion of a blue source light 42 into yellow converted light 46, which may produce white light when combined with the unconverted source light 42.

The creation of white converted light may be accomplished by combining the converted light 46 with the source light 42. The converted light 46 may be within a converted wavelength range, including a high intensity of light defined within the visible spectrum by long wavelengths, such as red light. The source light 42 may be within a source wavelength range, including a high intensity of light defined within the visible spectrum by short wavelengths, such as blue light. By combining the light defined by short and long wavelength ranges within the visible spectrum, such as blue and red light, respectively, a substantially white light may be produced. A person of skill in the art will appreciate the non-uniform location of a conversion material 30 adjacent to the light emitting semiconductor device 40 to be included within the scope and spirit of embodiments of the present invention.

The preceding example, depicting a yellow emitting silicate conversion material is not intended to be limiting in any way. Instead, the description for the preceding example has been provided for illustrative purposes. A skilled artisan will appreciate that any wavelength range and, therefore, any corresponding color, may be produced by a conversion material 30 and remain within the scope of embodiments of the present invention. Thus, the lighting system 10 discussed herein, is not intended to be limited by the preceding example.

A non-limiting example of an anti-Stokes shift is now provided wherein a single infrared light emitting semiconductor device 40 may be located adjacent to an anti-Stokes conversion material 30, such as yttrium III oxide europium phosphor (Y2O3:Eu), for example. A person of skill in the art will appreciate that any number of light emitting semiconductor devices may be included within the wavelength conversion device 10, according to embodiments of the present invention, and the present example is provided without limiting the wavelength conversion device 10 to a single light emitting semiconductor device 40.

The light emitting semiconductor device 40 may be an infrared LED, which may emit photons of low energy light. The anti-Stokes conversion material may be evenly distributed on the surface of, or in the bulk material located adjacent to, the light emitting semiconductor device 40. A uniform distribution of the conversion material 30 may result in the uniform conversion of an infrared source light 42 into visible converted light 46. As discussed above, the anti-Stokes conversion material may combine two or more photons absorbed from the infrared source light to create and emit the visible converted light 46. A person of skill in the art will appreciate the non-uniform location of a conversion material 30 adjacent to the light emitting semiconductor device 40 to be included within the scope and spirit of embodiments of the present invention.

The preceding examples are not intended to be limiting in any way. Instead, the descriptions for the preceding examples have been provided for illustrative purposes. A skilled artisan will appreciate that any wavelength range and, therefore, any corresponding color, may be produced by a conversion material 30 applied located adjacent to a color conversion optic and remain within the scope of embodiments of the present invention. Thus, the lighting system 10 discussed herein, is not intended to be limited by the preceding example. A person of skill in the art will additionally appreciate that the wavelength conversion operation discussed above may be performed in applications wherein the source light 42 is an environmental light 48, and wherein the converted light 46 is sensed by sensor, such as a photodiode or light emitting semiconductor device 40.

In an embodiment of the present invention, wherein the array of light emitting semiconductor devices may include a plurality of light emitting semiconductor devices, one or more light emitting semiconductor devices may emit or sense light of varying wavelength ranges. More specifically, various light emitting semiconductor devices included in the array may have differing light sensitivity properties, allowing the emission or sensing of various wavelengths of light. The varying sensitivities may be accomplished by including light emitting semiconductor devices with different semiconductor structures. A non-limiting example of an array 39 including a plurality of light emitting semiconductor devices may include ultraviolet, blue, green, red, infrared, and/or white LEDs, along with any combination of the aforementioned LEDs with an adjacently located conversion material 30 to further modify or expand the range of sensitivity to one or more wavelengths of light.

According to an embodiment of the present invention, the light emitting semiconductor devices may acquire and process data from an actively driven semiconductor, such as an LED, to determine certain characteristics of environmental light 48 received by the light emitting semiconductor device 40. The environmental light 48 may include natural (solar) light, light emitted by any type of light sources (LED, incandescent, fluorescent, etc.), and/or light reflection from some environmental object within the field of view of the LED.

Although light emitting semiconductor devices, for example, LEDs, are designed to operate as light emitters, they are capable of detecting incident light and producing an output voltage dependant on the intensity and the wavelength of such incident light. The efficiency of an light emitting semiconductor device as a light detector may not be as good as that achieved by a dedicated sensor, such as a photodiode or a phototransistor, however, light emitting semiconductor devices can provide enough sensitivity to allow them to be used as photodetectors for a plurality of applications consistent with the scope of the present invention.

Figure 3X:
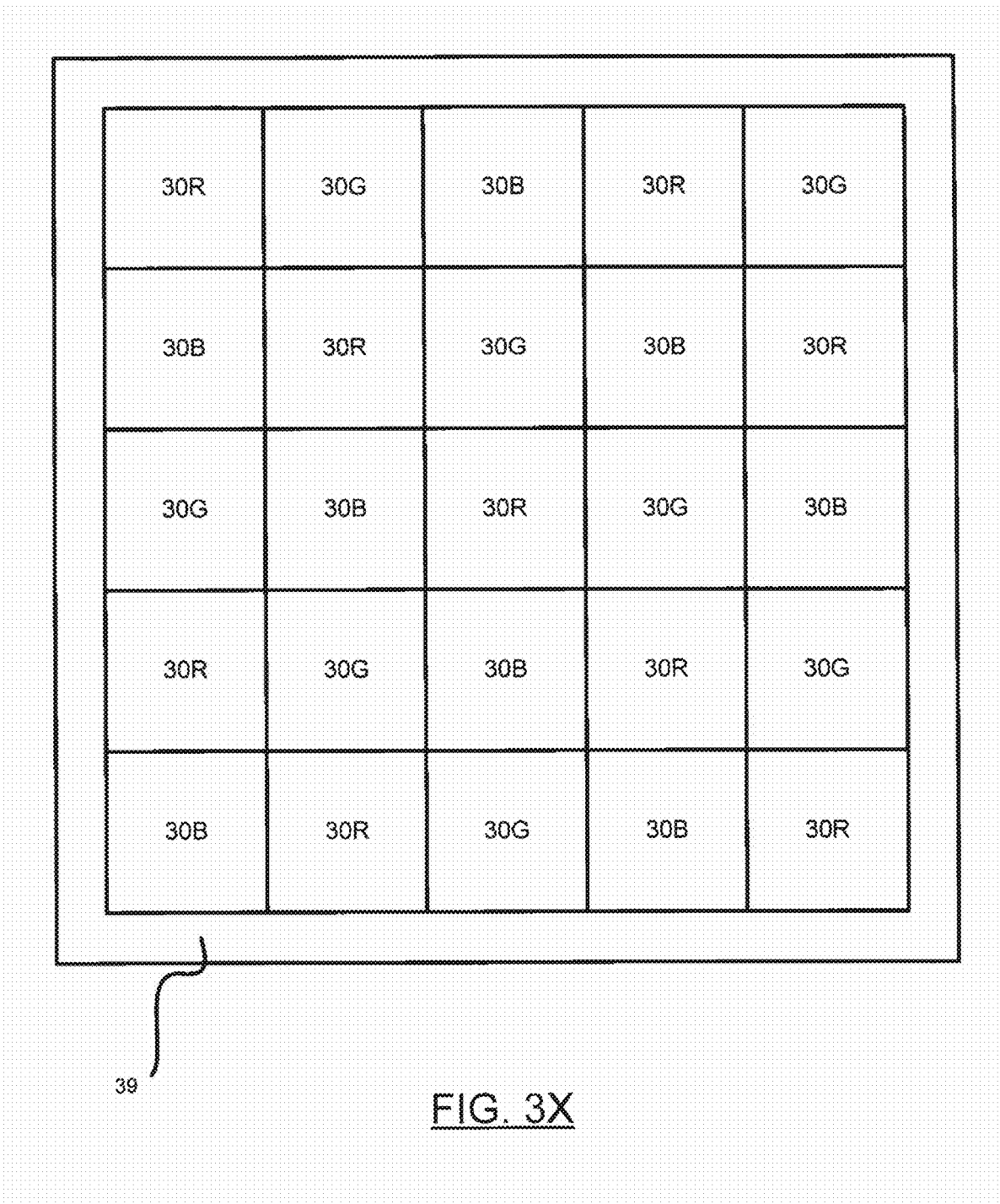
FIG. 3X is a schematic diagram depicting an array of light emitting semiconductor devices in a lighting system according to an embodiment of the present invention.

Referring now additionally to FIG. 3X, a non-limiting example will now be discussed that includes conversion materials to convert the source light 42 into converted light 46 of various colors. In the interest of clarity, only three conversion materials will be discussed in this example. However, a person of skill in the art will appreciate that any number of conversion materials may be included adjacent to the light emitting semiconductor devices to modify the wavelengths of light emitted or sensed by the lighting system 10.

In this example, the conversion materials 30G, 30R, and 30B are adjacently located to each of the light emitting semiconductor devices. These conversion materials may or may not be evenly distributed, as will be appreciated by a skilled artisan. In an array 39 with even distribution, the conversion material 30 may provide uniform emission or sensing of converted light 46, since the green conversion material 30G, blue conversion material 30B, and red conversion material 30R may occupy approximately the same proportionate ratio array of light emitting semiconductor devices. A person of skill in the art will appreciate that a non-uniform distribution of green conversion materials 30G, blue conversion materials 30B, and red conversion materials 30R are contemplated by embodiments of the present invention, as such a configuration may be demanded by the desired application of the lighting system 10.

A person of skill in the art, after having the benefit of this disclosure, will appreciate that conversion materials that produce light in a wavelength range other than green, blue, and red may be located adjacent to one or more light emitting semiconductor devices, and therefore would be included within the scope and spirit of embodiments of the present invention. A skilled artisan will additionally realize that any number of conversion materials capable of producing converted light 46 of various converted wavelength ranges and corresponding colors may be applied to the light emitting semiconductor devices and still be included within the scope of this disclosure.

The preceding example, depicting three discrete conversion materials, is not intended to be limiting in any way. Instead, the disclosure of the preceding example has been provided for illustrative purposes, solely as a non limiting example. A skilled artisan will appreciate that any wavelength range and, therefore, any corresponding color, may be produced by a conversion material 30 applied to a conversion material 30 located adjacent to the light emitting semiconductor device 40 to be included within the scope of embodiments of the present invention.

In an additional example of varying conversion material being located adjacent to light emitting semiconductor devices included in the array 39, an anti-Stokes conversion material may be included adjacent to one or more infrared light emitting semiconductor devices to emit light in a visible wavelength range. Additionally, an anti-Stokes conversion material may be included adjacent to, for example, a blue light emitting semiconductor device to sense an environmental light including wavelengths that are longer the wavelength emitted by the blue light emitting semiconductor device. Skilled artisans will appreciate that an anti-Stokes phosphor may be used with additional and differing light sources, including light emitting semiconductor devices 40, such as, for example, red or green LEDs.

A person of skill in the art, after having the benefit of this disclosure, will appreciate that conversion materials, which may be applied to the directly or located adjacent to light emitting semiconductor devices, which may be included in an array 39, may produce light in a wavelength range other than ultraviolet, blue, green, red, and infrared are intended to be included within the scope and spirit of embodiments of the present invention. A skill artisan will additionally realize that any number of conversion materials, which may be capable of producing converted light 46 of various converted wavelength ranges and corresponding colors, may be located adjacent to the light emitting semiconductor devices of the lighting system 10 according to embodiments of the present invention.

In an additional embodiment of the lighting system 10 of the present invention, source light 42 may be converted by the conversion material 30 into a converted light 46 with an organic wavelength range, or wavelength range that triggers psychological cues within the human brain. This wavelength range may include a selective portion of the source light 42. These organic wavelength ranges may include one or more wavelength ranges that trigger positive psychological responses. As a result, the brain may affect the production of neurological chemicals, such as, for example, by inducing or suppressing the production of melatonin. The psychological responses may be similar to those realized in response to natural light or sunlight.

A person of skill in the art will appreciate that the lighting system 10, according to an embodiment of the present invention, may receive a source light 42 that is monochromatic, bichromatic, or polychromatic. A monochromatic light is a light that may include one wavelength range. A bichromatic light is a light that includes two wavelength ranges that may be derived from one or two light sources. A polychromatic light is a light that may include a plurality of wavelength ranges, which may be derived from one or more light sources. Preferably, the lighting system 10, according to an embodiment of the present invention, may include a monochromatic light, but a person of skill in the art will appreciate bichromatic and polychromatic light sources 40 to be included within the scope and spirit of embodiments of the present invention.

The power available at the output of a light emitting semiconductor device 40 may be significantly lower than the power used to drive the same. Therefore, in order to acquire data while maintaining an acceptable signal-to-noise ratio, the sensing of environmental light to collect data, which may subsequently be processed by a controller 61, may be simplified by being performed while the light emitting semiconductor device is un-energized, or in other words, not emitting illuminating light 44.

Additionally, the high, impedance presented by the light emitting semiconductor device 40 acting as a source requires the data collection circuitry to present high impedance as well. This means that the light emitting semiconductor device 40 may effectively have to be removed from the driving circuitry while the data collection is taking place to prevent other circuitry from loading the output of the light emitting semiconductor device 40, thus reducing the effective impedance. The switching of the light emitting semiconductor device 40 between a driving circuit 53 and a sensing circuit 51 will be discussed in greater detail below.

The data collection window can be as short as several hundred nanoseconds, and as long as tens of microseconds depending on the characteristics of the LEDs used in the circuitry of the lighting system 10. A short period where the light emitting semiconductor device 40 is not energized may not be noticeable to the human eye, and is a common occurrence when driving light emitting semiconductor devices in lighting applications, as will be understood by ski/led artisans.

Data collection intervals may vary depending on the application and the resolution required by the particular application. Typical embodiments will have sampling windows at intervals ranging from once every few tens of microseconds up to once every few milliseconds. The number of samples with a sampling window can be as small as one (for cases where only intensity information is required), or of a plurality of samples when rise time information is needed. In the case where multiple samples are required, the sampling rate should be fast enough to provide an acceptable measurement of the rise time. Sampling rates within a sampling window will typically range in the 0.1 to 10 MS/s depending on the width of the sampling window and the expected rise time of the LED's output voltage.

The lighting system 10, according to an embodiment of the present invention, may include one or more sensors, such as, for example and without limitation, photodiodes. Photodiodes may be defined as electronic components that may create a current or voltage when exposed to light. This conversion of light into electrical power 49 may be known as the photoelectric effect, which will be described below.

As a photon, the elementary particle of light, may engage the photodiode 41, an electron may be excited by the engagement. The excited electron may thus flow in the forward direction of the diode, creating a hole at its original location. A hole will be understood by a person of skill in the art to be defined as the lack of an electron at a position where the electron could exist within an atomic lattice. Correspondingly, a new electron may be accepted to replace the excited, removed electron flowing in the forward direction of the diode, filling the hole. The new electrons may be continually accepted by the atomic lattice to fill the holes left by excited electrons, resulting in a flow of electrons.

As the flow of electrons may continue, electrons may collect at the cathode of the photodiode 41. Correspondingly, the holes may collect at the anode of the photodiode 41. Due to the movement of electrons, a photocurrent may be produced flowing from the anode to the cathode. Also, as the flow of photocurrent may be restricted, a voltage may build due to the photovoltaic effect. As these processes continue, the voltage may be measured to determine the quantity of light sensed by the photodiode 41. Additionally, when connected to a controller 61, which will be discussed in greater detail below, the values of light sensed by the photodiode 41 over time may be processed by the controller 61 to analyze the environment. The results of this analysis may be used to control the light emitting semiconductor devices included in the lighting system 10.

The lighting system 10 may additionally use the photodiodes to generate electrical power. The photodiodes may be adapted to generating electrical power from the radiation included in the environmental light 48. A photodiode 41 may be a light emitting semiconductor device 40. Skilled artisans will appreciate that power generated by the photodiodes would be proportional to the area of the photodiodes 41, the array 39 in which the photodiodes 41 may be included, and the intensity of the incident environmental light 48.

The photodiodes may optionally include an antireflective coating, such as silicon nitride, to increase the amount of light received by the photodiode 41. A person of skill in the art will appreciate that the use of photodiode 41 within this disclosure is not intended to limit the sensing of light in any way. Accordingly, the discussion of photodiodes is provided as an illustrative embodiment of the lighting device 10 of the present invention.

In the interest of clarity, the following discussion of using light emitting semiconductor devices as photodiodes will be focused on using a light emitting diode (LED) as the light emitting semiconductor device 40. A person of skill in the art will appreciate that the discussion of LEDs is not intended to impose any limitations on the scope of the light emitting semiconductor device 40. LEDs are typically diodes that are doped with materials that result in the emission of light. As will be appreciated by skilled artisans, the doping that occurs to create a LED is substantially similar to the doping required to create a photodiode 41. As a result, LEDs may be used to sense light when they replace a dedicated photodiode 41 in a light sensing circuit. However, some differences may exists, as will be appreciated by skilled artisans, such as the ration of voltage to current produced as the amount of sensed environmental light 48 may vary.

Typically, LEDs are capable of sensing light with shorter wavelengths than the light emitted by the LED. For example, a green LED would typically be sensitive to green, blue, and ultraviolet light. As an additional example, an infrared LED may be sensitive to a wavelength range including all visible light. To increase effective range of an LED configured to sense environmental light 48, an embodiment may include an infrared LED in the sensing circuit of the lighting system 10 of the present invention. However, some differences may exist, as will be appreciated by skilled artisans, such as the ratio of voltage to current produced as the amount of sensed environmental light may vary.

An illustrative embodiment wherein one or more light emitting semiconductor devices operate between an emitting operation and a sensing operation will now be discussed. In this embodiment, the light emitting semiconductor device 40 may be connected to a driving circuit 53 and a sensing circuit 51. A driving circuit 53 may include any circuit that may be appreciated by a skilled artisan to drive a light emitting semiconductor device 40. For a light emitting semiconductor device 40 to operate in the emitting operation, the light emitting semiconductor device 40 may be included in the driving circuit 53. A sensing circuit 51 may include any circuit appreciated by a skilled artisan that may use a photodiode 41 to sense the presence of light in an environment. For a light emitting semiconductor device 40 to operate in the sensing operation, the light emitting semiconductor device 40 may be included in the sensing circuit 51.

Figure 4:
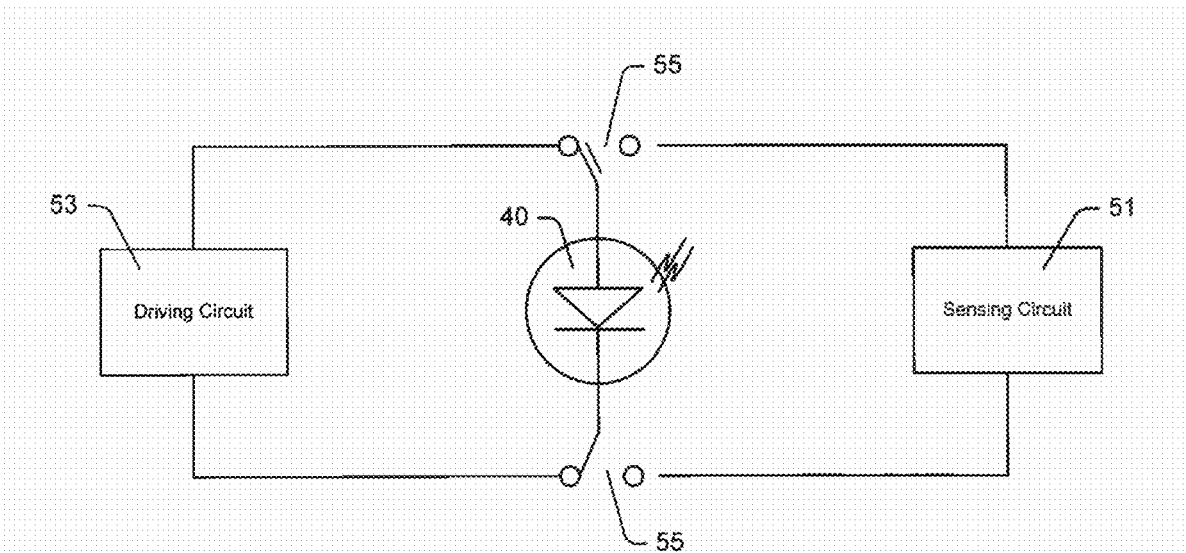
FIGS. 4 and 5 are schematic diagrams of embodiments of switching circuits of the lighting system according to an embodiment of the present invention.

The light emitting semiconductor device 40 may be configured such that operation may be switched between an emitting operation and a sensing operation. The operation of the light emitting semiconductor device 40 may be switched by a switching circuit. Referring now to FIG. 4, an illustrative embodiment of a switching circuit will now be discussed. In this embodiment, the light emitting semiconductor device 40 may be connected to a plurality of switches 55. The switches 55 may be controlled, for example, by a controller 61 (FIG. 6) to switch the light emitting semiconductor device 40 between the driving circuit 53 and the sensing circuit 51, which may correspond with the active and inactive portions of the duty cycle. The switches 55 used in the example illustrated in FIG. 4 may be any switch that would be known within the art.

Figure 5:
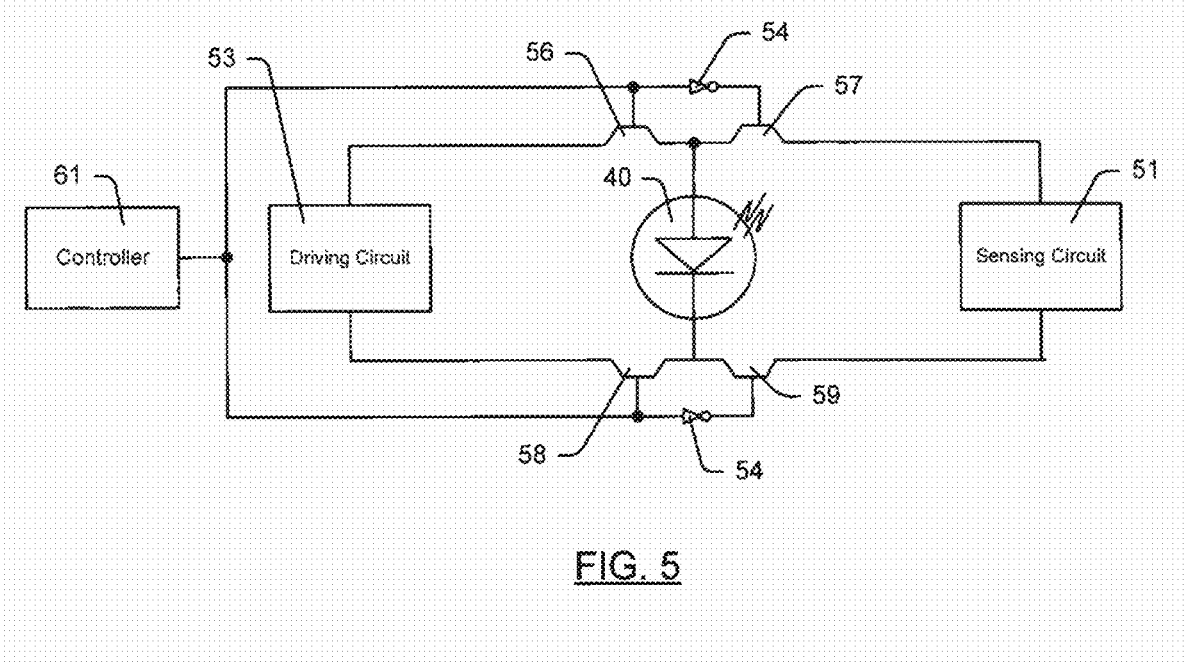

In an additional embodiment, as illustrated in FIG. 5, switching transistors 56-59 may be used to control the engagement of the light emitting semiconductor device 40 between the driving circuit 53 and the sensing circuit 51. The switching transistors 56-59 may be operatively connected to, and driven by, the controller 61 (FIG. 6). A person of skill in the art will appreciate a plurality of configurations in which switching transistors 56-59 may be included in the switching circuit to control the operation of the light emitting semiconductor device 40.

The embodiment of the switching circuit illustrated in FIG. 5 includes two anode switching transistors 56, 57 connected to the anode of the light emitting semiconductor device 40. The controller 61 may be connected to the first anode switching transistor 56 to control whether the anode of the light emitting semiconductor device 40 is connected to the driving circuit 53. The controller 61 may additionally be connected to the second anode switching transistor 57 to control whether the anode of the light emitting semiconductor device 40 is connected to the sensing circuit 51.

An inverter 54 may be connected to the first anode switching transistor 56 and the second anode switching transistor 57. The inverter 54 may invert the control signal supplied to the first anode switching transistor 56, causing the second anode switching transistor 57 to operate opposite to the first anode switching transistor 56. For example, when the first anode switching transistor 56 is closed, allowing current to flow across the transistor 56, the second anode switching transistor 57 may be opened to prohibit the flow of current.

The controller 61 may be additionally connected to the first cathode switching transistor 58 to control whether the cathode of the light emitting semiconductor device 40 is connected to the sensing circuit 51. The controller 61 may additionally be connected to the second cathode switching transistor 59 to control whether the cathode of the light emitting semiconductor device 40 is connected to the sensing circuit 51.

An inverter 54 may be connected to the first cathode switching transistor 58 and the second cathode switching transistor 59. The inverter 54 may invert the control signal supplied to the first cathode switching transistor 58, causing the second cathode switching transistor 59 to operate opposite the first cathode switching transistor 58. For example, when the first cathode switching transistor 58 is closed, allowing current to flow across the transistor 58, the second cathode switching transistor 59 may be opened to prohibit the flow of current.

By including a switching circuit in between the light emitting semiconductor device 40, the driving circuit 53, and the sensing circuit 51, the lighting system 10 may advantageously reduce or eliminate loading voltages that may otherwise interfere with the sensing operation performed by the light emitting semiconductor device 40. A person of skill in the art will appreciate additional embodiments that may include one or more dedicated photodiode 41 or light emitting semiconductor device 40 that persistently detects environmental light 48. Since the dedicated photodiode 41 or light emitting semiconductor device 40 may not emit light, it may not be required to be connected to a driving circuit 53. Additionally, a dedicated light sensing component may not need to be switched out of the circuit when not performing a sensing operation.

In the discussion of the following embodiments, a photodiode 41 will be understood by skilled artisans to include dedicated photodiodes and light emitting semiconductor devices operating to sense environmental light 48. A person of skill in the art will appreciate that the aforementioned definition of a photodiode 41, as it may apply to the present embodiment, is not intended to be limiting. In an embodiment of the present invention, a plurality of photodiodes may be configured in an array 39. The configuration of photodiodes may be similar to the configuration of light emitting semiconductor devices discussed above. Skilled artisans will appreciate that, wherein the photodiodes are light emitting semiconductor devices that also emit illuminating light 44, the array of photodiodes may be the same component as the array of light emitting semiconductor devices.

The photodiodes may detect environmental light 48 from an environment in which it is located. Since a plurality of photodiodes may be included in an array of photodiodes, environmental light 48 may be sensed from a plurality of points. Additionally, wherein multiple types of light emitting semiconductor devices are included in the array 39, the array 39 may emit, and therefore sense, differing wavelength ranges of light. Each wavelength range corresponding with a light emitting semiconductor device 40 may include a dominant wavelength range. Each photodiode 41 included in the array 39 may transmit the sensed level of environmental light 48 to a controller 61 to be analyzed.

As discussed above, one or more infrared light emitting semiconductor devices maybe included in the sensing circuit 51 to detect substantially the full wavelength range of visible light. Additionally, one or more light emitting semiconductor devices, for example and without limitation, a blue light emitting semiconductor device, which does not emit infrared light, and therefore may not typically detect substantially the full wavelength range of visible light, may be included in the sensing circuit 51. A plurality of light emitting semiconductor devices with sensitivity to differing wavelength ranges may be included in an array 39.

The blue light emitting semiconductor device may include an adjacently located conversion material 30 to convert the emitted blue illuminating light, which may be defined as the source light 42 within a blue source wavelength range in this example, into a converted light 46 defined within a converted wavelength range. The converted light 46 may appear as a different color. The conversion material 30 may additionally perform a color conversion operation to convert the environmental light 48 prior to being received by the photodiode 41, which may be an LED. To expand the wavelength range of light that may be sensed by the LED, the conversion material 30 may receive the environmental light 48 as the source light 42 included within the source wavelength range. The conversion material 30 may perform an anti-Stokes shift to the source light 42, emitting a converted light 46 within a converted wavelength range defined by wavelengths that are longer than the source wavelength range. By performing the aforementioned color conversion using the conversion material 30, the wavelength range of light that may be sense by an LED, which may be configured in a sensing circuit 51, may be effectively increased.

Referring now to FIG. 6, an embodiment of the lighting system 10 of the present invention may include a controller 61 to selectively control operation of the light emitting semiconductor devices. The controller 61 may include a processor or CPU 62, memory 64, and an I/O interface 66, which may be communicatively connected via a bus 68. The CPU 62 may be configured to receive a data signal from additional components of the lighting system 10, for example without limitation, via the I/O interface 66. The controller may optionally be connected to a power supply 65.

The CPU 62 may compute and perform calculations to data received by the additional components, such as the light emitting semiconductor devices, photodiodes, or other input devices. As a non-limiting example, the CPU 62 may receive a signal regarding the level of environmental light 48 sensed by a photodiode 41. The CPU 62 may then analyze the signal to determine what has been sensed by the photodiode 41. The CPU 62 may additionally control the duty cycle of the light emitting semiconductor device 40 to effectively control the operation of the lighting system 10. An illustrative example may include the controller 61 receiving a signal from the photodiode 41, or sensing light emitting semiconductor device, that the environment is dark. The controller 61 may then increase the active portion of the duty cycle, resulting in increased illumination being generated by the lighting system 10, according to an embodiment of the present invention.

The controller 61 may also include memory 64. The memory 64 may include volatile and non-volatile memory modules. Volatile memory modules may include random access memory, which may temporarily store data and code being accessed by the CPU 62. The non-volatile memory 64 may include flash based memory, which may store the computerized program that may be operated on the CPU 62. The memory 64 may also include a log of sensory data received by the lighting system 10, or a communicatively connected lighting system 10, according to an embodiment of the present invention.

Additionally, the memory 64 may include the computerized code used by the CPU 62 to control the operation of the lighting system 10. The memory 64 may also store feedback information related to the operation of additional components included in the lighting system 10. In an embodiment of the present invention, the memory 64 may include an operating system, which may additionally include applications that may be run within the operating system, which will be appreciated by a person of skill in the art.

The controller 61 may also include an I/O interface 66. The I/O interface 66 may control the receipt and transmission of data between the controller 61 and additional components. Provided as a non-limiting example, the I/O interface 66 may receive a lighting routine program from a user.

The controller 61 may additionally be connected to one or more light emitting semiconductor devices. The controller 61 may control the operation of the light emitting semiconductor device 40 between a plurality of operations, including, but not limited to, an emitting operation and a sensing operation. The controller 61 may optionally be connected to a dedicated photodiode 41, which may persistently remain in the sensing operation.

As previously discussed, the controller 61 may receive an input signal from the connected light emitting semiconductor device 40 and/or photodiode 41 including information regarding the sensed environmental light 48. The controller 61 may analyze the signal to control the operation of the lighting system 10. At times, the controller 61 may receive a signal that with less than optimal clarity. The controller 61 may perform one or more signal processing operations to clarify or modify the received input signal. Such signal processing operations may include, but should not be limited to, noise reduction, deconvolution, detecting the direction from which the light is received, or other signal processing operations that would be apparent to a skilled artisan. The signal processing operations may be performed by dedicated signal processing hardware and/or digital filters performed as software operation by the controller 61.

The sensitivity of a light emitting semiconductor device 40 to an incident light excitation, which may be caused by receiving the environmental light 48, exhibits a dependence on the wavelength of the incident light. Furthermore, the rise time of the output of a light emitting semiconductor device 40 may also vary with the wavelength of the incident light. Data collection can be implemented to include fast sampling of the output of the light emitting semiconductor device 40 such that rise times may be measured substantially accurately. The relationship between rise time and the stable signal can provide information about light intensity and predominant wavelengths of the source. For instance, one implementation could use a 10-90% rise time or a 20-80% rise time to estimate the wavelength of the sensed environmental light 48, while the remaining 80% or the 90% value may be used to estimate the intensity of the incident light.

Digital signal processing algorithms may be readily implemented in an existing processor 62, which may be included in the controller 61, within a lighting system 10, according to an embodiment of the present invention. These algorithms may be used to process the signals acquired by the data collection circuitry of the sensing circuit 51.

An embodiment may include computerized methods to remove noise such as, for example, but not meant to be limiting, background noise, from the sensed environmental light 48. Such background noise may include, but should not be limited to, 120 Hz flickering from external light sources. Illustrative computerized methods to remove the noise may include, but should not be limited to, digital narrow band filter tuned at 60 Hz, a digital comb filter at 60 Hz and harmonics, a digital matched filter with fixed characteristics, and/or a digital adaptive match filter for time-varying light conditions.

Additionally, computerized methods may be performed by the controller 61 to remove low-frequency varying light, such as sunlight and/or varying cloudiness. Such computerized methods may include, but should not be limited to, implementing a digital highpass filter and/or a digital bandpass filter. Furthermore, the controller 61 may process the sensed environmental light 48 to identify fast-varying light changes, such as changes caused by people walking by or lights turning on/off, as a non-limiting example.

The controller 61 may additionally be configured to calculate the rise time of the source of interest, with or without background noise removal. As a non-limiting example, the aforementioned rise time calculation may be performed on 10-90% or 20-80% rise times. Another signal processing operation performed by the controller 61 may include calculating the peak intensity of the signal of interest. Alternatively, the peak intensity may be calculated after one or more noise component has been removed.

Furthermore, the controller 61 may perform a signal processing operation to estimate the peak wavelength of the signal of interest. The aforementioned peak wavelength signal calculation may be based on the characteristics of the LEDs, the intensity of the incoming light, and/or the rise time. Additionally, cross-correlation techniques may be used to characterize waveshape of the environmental light 48 sensed by the lighting system 10. A person of skill in the art will appreciate additional conditions that may be used to calculate the peak wavelength of the sensed environmental light 48 to be included within the scope of the present invention.

In an embodiment of the present invention, the lighting system 10 of the present invention may include a network interface 87. A person of skill in the art will appreciate that the network interface 67 may be included within the controller 61 discussed above. Alternately, a skilled artisan will appreciate that the network interface 61 may be operatively connected to the controller 61, wherein it may operate as an interface device between the controller 61 and a connected network 69, such as for example, a home or corporate network.

The network interface 67 may provide a channel for the electronic communication of data between the lighting system 10 and a network connected device. Provided without the intent to be limiting, examples of network connected devices may include personal computers, tablets, smartphones, personal data assistants, or other electronic devices capable of connecting to a network 69.

The network interface 67 may connect to a network 69 via a proprietary or standard connection protocol. With respect to embodiments of the present invention that include a proprietary network connection, the network interface 67 may perform handshake operations and exchange data with network connected devices, as may be defined within the proprietary protocol. Alternately, the network interface 67 may connect to a network 69 via a standardized protocol. Examples of standardized protocols, provided without the intent to be limiting, may include IrDA, 802.3 Ethernet, 802.11 Wi-Fi, 802.15.1 Bluetooth, 802.15.4 low rate personal area network (PAN) environments, packet switching wide area networks (WAN), cellular relay WANs, ring networks, daisy chain networks, or additional standardized data transmission protocols.

As discussed above, according to an embodiment of the present invention, the lighting system 10 may be configured to communicate with additional devices. The lighting system 10 may include a radio logic board and an antenna to communicate with additional devices using radio frequencies. Alternately, the lighting system 10 may include one or more infrared lighting emitting semiconductors which may transmit and/or receive data using an infrared standard such as IrDA. In an additional embodiment, the lighting system 10 may communicate with additional devices by transmitting data to be included within visible light.

A lighting system 10 may communicate with one or more additional lighting systems over the network 69. In an embodiment, the lighting systems and additional devices may be connected over the network 69 by using a centralized hub or router. In an additional embodiment, each device on the network 69 may be included in a network of nodes, for example, and without limitation a neural network. Each node may operate as a master and a slave. Additionally, each node may act as a repeater to expand the range of the network 69.

Referring now to FIG. 7, an illustrative embodiment to a node-based neural network will now be discussed. In this embodiment a plurality of nodes may be positioned within communication range of additional nodes. As additional nodes are added to the neural network, the range of the network 69 may be expanded. In the neural network illustrated by FIG. 7, each node may communicate with its neighboring nodes by sending and receive data directly with one another. For example, Node 2A may transmit a direct data communication as a master to be received by Node 2B as a slave. This data communication may not require involving additional nodes. However, additional nodes may still receive the data communication, analyze any information included therein, and disregard any message to which the additional node is not an intended recipient.

In an additional embodiment, nodes may be configured to repeat messages that are addressed to another node. For example, Node 2A may intend to transmit a data communication as a master to Node 1C as a slave. Node 2A may broadcast the data transmission, even though Node 1C is out of range to receive the transmission. However, the data may be received by Node 2B as a slave, which may be in range of Node 2A. After analyzing the data transmission, Node 2A may determine that it is an unintended recipient. Node 2B may then retransmit the data communication as the master, which may now be received by Node 1C as the slave, since Node 1C may now be in range of the transmitting master node.

Additionally, the controller 61 at each node may include memory 64. The memory 64 of the node may maintain at least a partial log of data communication 80 that have been transmitted, received, and or rebroadcast by the node. In this embodiment, upon receipt of a data communication 80 (FIGS. 9-12), the controller 81 of a node may then access the memory 64 to compare the data included therein with the received data. The controller 61 of the node may then make a logic based decision as a result of the analysis. An example of such a logic based decision may include declining to rebroadcast a data communication 80 that has already been rebroadcast by the node. An additional example of a logic based decision may include broadcasting a confirmation signal to a transmitting master node, such as node 3B, indicating that the data transmission has been received from Node 3C. In this example, the Node 3C transmitting the data communication as a master node may receive the confirmation signal from Node 3B as a slave node. Node 3C may then analyze the confirmation signal to make a logic based decision to terminate further transmission of the original data communication 80.

Referring back to FIG. 1, and additionally to FIG. 8, an embodiment of the present invention wherein the lighting device may communicate with additional devices by sending and receiving light will now be discussed. More specifically, the present embodiment will be discussed with regard to transmitting data using visible light. However a person of skill in the art will appreciate that data could be transmitted over virtually any electromagnetic wavelength, as it may be included in the scope of the present invention.

Data light may be transmitted from a lighting device as modulated pulses of data light 45. The data light may include data encoded in the light through a modulation technique that would be apparent to skilled artisans, such as pulse width modulation (PWM). The controller 61 may integrate the data light 45 into illuminating light 44 to be transmitted from the lighting device to another device. Similarly, the controller 61 may detect data light 45 integrated into environmental light 48, which may be processed by the controller 61 to extract the data included therein. A person of skill in the art will appreciate additional protocols and operations to integrate the data light 45 with the illuminating light 44 emitted by a light emitting semiconductor device 40.

Additionally, in an embodiment of the present invention, the data included in the data light 45 may be secured using data encryption. Skilled artisans will appreciate a plethora of encryption methods that may be used to restrict access to the data.

Preferably, the data light 45 is modulated at a rate that is substantially faster than can be perceived by humans or other living organisms. The speed at which the data light 45 may be modulated is dependent on switching speed of the electronic components included in the lighting system 10, according to an embodiment of the present invention. In an embodiment wherein data is transmitted digitally using data light 45, each clock cycle may theoretically carry one bit of data. As the time to switch PWM modulation between a logical high and a logical low decreases, the data rate increases. This relationship may be calculated by applying the following formula: (FREQUENCY)=1/(SWITCHING TIME). For example, if the lighting system 10 requires five nanoseconds to switch between a logical high and a logical low, assuming one bit of data may be transmitted on every cycle, the maximum data throughput may be two megabits per second (200 Mbps).

The following examples illustrate a number of embodiments to include data light 45 within the illuminating light 44. A person of skill in the art will appreciate that the following examples are included in the interest of clarity, and are not intended to be limiting in any way. Skilled artisans will additionally appreciate that, although the examples are given assuming that data is transmitted by modulating the data light 45 using PWM, any additional protocol of transmitting data, many of which have been discussed within this disclosure, are to be included within the scope of the present invention.

Referring now to FIGS. 9-12, a number of embodiments illustrating the inclusion of a data communication 80 in data light 45 will now be discussed. The data communication may include various segments of data, which may include instructions for a receiving device to perform a specific action or information to be received and analyzed by a receiving device. As discussed above, the receiving device may be, for example, a slave node in a neural network. The data communication 80 may include initialization data 82, addressing data 83, data contents 84, error detection bit or parity data 85, or additional forms of data that would be appreciated by skilled artisans.

Initialization data 82 may alert additional devices included in the network 69 that data in data contents 84 are about to be transmitted. Addressing data 83 may specify one or more devices in the network 69 that are intended to receive the data communication 80. Data contents 84 may include the substantive data that is being transmitted in the data communication 80. The illustrated error detection bit, such as a parity 85, may include one or more bits, or other segments of data, to verify that the data communication 80 has been received correctly, as will be understood by skilled artisans. Additional forms of data may be included in the data communication 80, as will be appreciated by a person of skill in the art.

The following examples are by no means intended to omit the scope of the present invention to the organization of data communications described therein. Skilled artisans will appreciate a plethora of additional data communication 80 structures capable of transmitting data to a receiving device consistent with the scope and spirit of the present invention, to be included herein. Additionally, as will be appreciated by a person of skill in the art, digitally transferred data may be included as bits, nibbles, bytes, and other lengths of ones and zeros that may convey the data communication 80. In the interest of clarity, the number of bits included in each type of data has been shortened in the examples below. Additionally, example bits may be used to illustrate a model data transmission 80. These example bits are only provided for illustrative purposes, and would very likely be replaced with actual substantive bits upon the transmission of a data communication 80 from one device to another. Skilled artisans will not view this shortening of bits, or use of example bits, as limitations.

Figure 9:
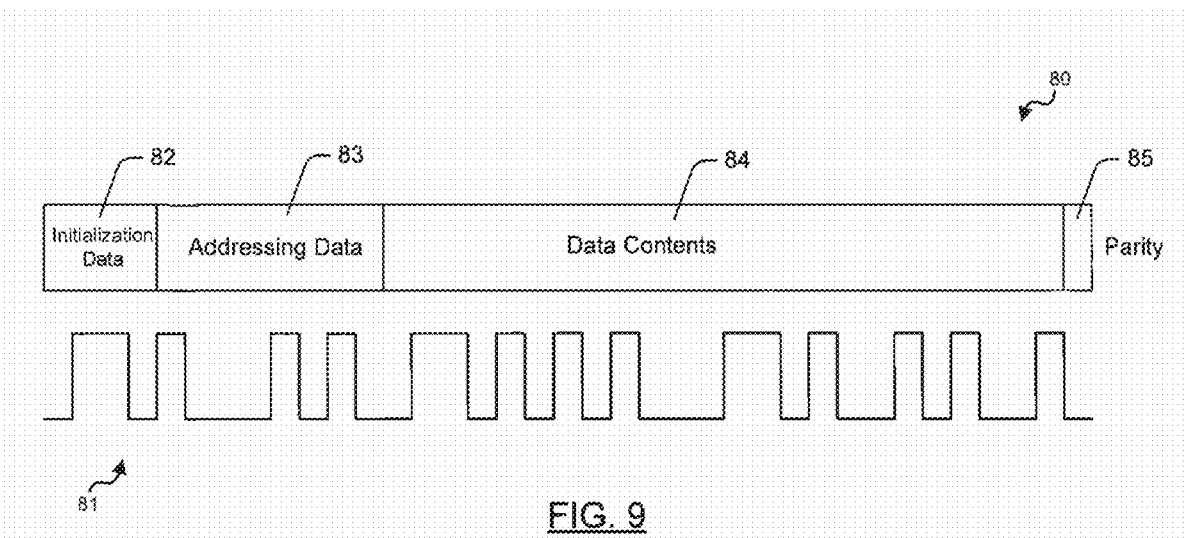
FIGS. 9-12 are schematic diagrams illustrating embodiments of data communication in the lighting system according to an embodiment of the present invention.

Referring first to the example data communication illustrated in FIG. 9, the data communication 80 may begin by transmitting initialization data 82. As shown by the PWM waveform 81, the initialization data 82 may be "0110." The example data communication 80 may next include addressing data 83, to signify the intended recipient of the transmitted data communication 80. As shown by the PWM waveform 81, the addressing data 83 may be "10001010." Next, the data contents 84 may be transmitted to provide the substantive of the data communication 80. As shown by the PWM waveform 81, the data contents 84 may be "0110101010001101 00101001." Finally, the example communication may include an error detection bit, such as, for example, a parity bit or checksum, to verify that the data has been properly transmitted. As shown by the PWM waveform 81, the parity bit may be set to "0."

Figure 10:
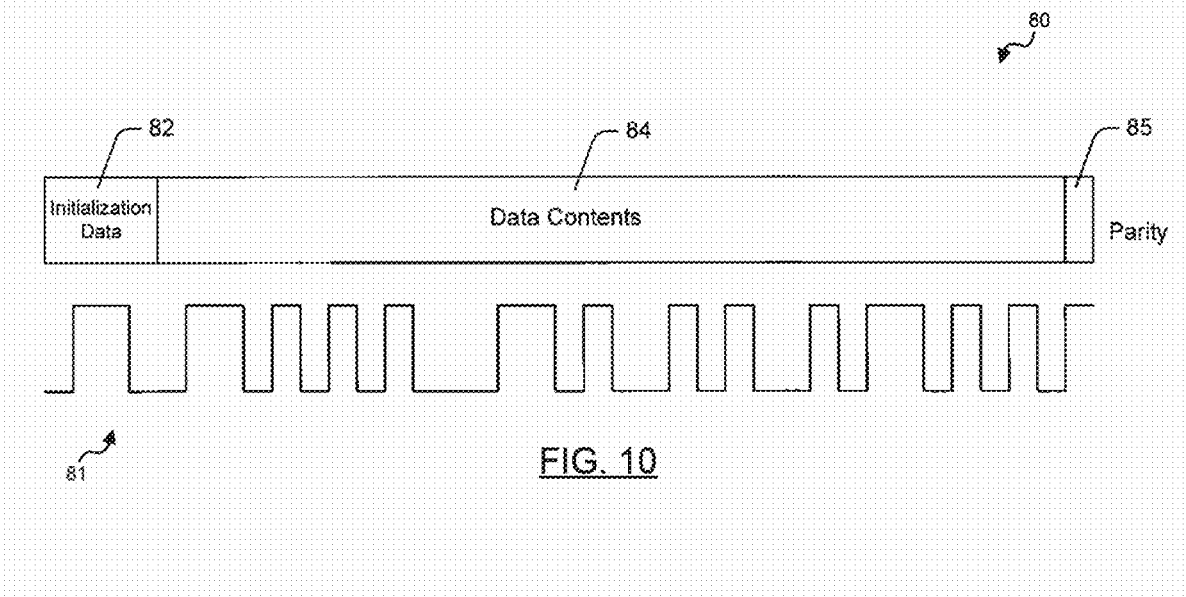

Referring next to the example data communication 80 illustrated in FIG. 10, the data communication 80 may begin by transmitting initialization data. As shown by the PWM waveform 81, the initialization data 82 may be "0110." The example data communication 80 illustrated in FIG. 10 may broadcast the data to all receiving devices within range, and thus not include addressing data 83 to signify an intended recipient of the transmitted data communication 80. The data contents 84 may be transmitted to provide the substantive of the data communication. As shown by the PWM waveform 81, the data contents 84 may be "0110101010001101000101001 01101010." Finally, the example communication may include an error detection bit, such as, for example, a parity bit or checksum, to verify that the data has been properly transmitted. As shown by the PWM waveform 81, the parity bit may be set to "1."

Figures 11, 12:
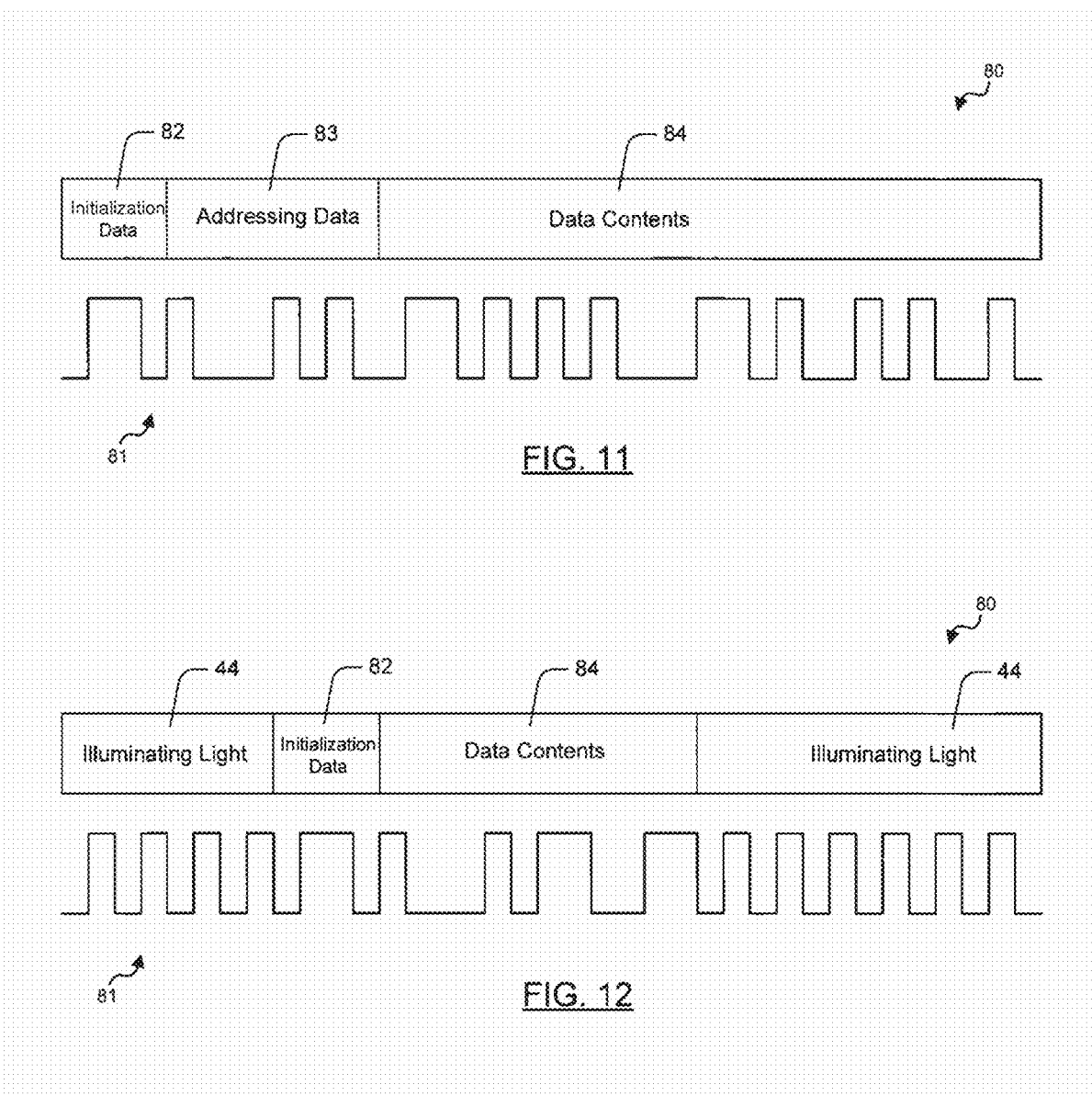

Referring additionally to the example data communication 80 illustrated in FIG. 11, the data communication 80 may begin by transmitting initialization data 82. As shown by the PWM waveform 81, the initialization data 82 may be "0110," The example data communication 80 may next include addressing data 83, to signify the intended recipient of the transmitted data communication 80. As shown by the PWM waveform 81, the addressing data 83 may be "10001010." Next, the data contents 84 may be transmitted to provide the substantive of the data communication 80. As shown by the PWM waveform 81, the data contents 84 may be "0110101010001101 00101001." However, the example communication may require or include an error detection bit.

Referring first to the example data communication 80 illustrated in FIG. 12, the data communication 80 may begin by emitting illuminating light 44 that does not include data light 45. In the present example, the illuminating light 44 may be represented by the PWM waveform 81 of alternating logical high and low values. To begin transmitting a data communication 80, the lighting system 10 may transmit initialization data 82. As shown by the PWM waveform 81, the initialization data 82 may be "0110." The example data communication 80 illustrated in FIG. 12 may broadcast the data to all receiving devices within range, and thus not include addressing data 83 to signify an intended recipient of the transmitted data communication 80. Next, the data contents 84 may be transmitted to provide the substantive of the data communication. As shown by the PWM waveform 81 the data contents 84 may be "100010110011." The present example is not shown to include an error detection bit. Finally, the example communication may resume emitting the illuminating light 44.

Figure 13:
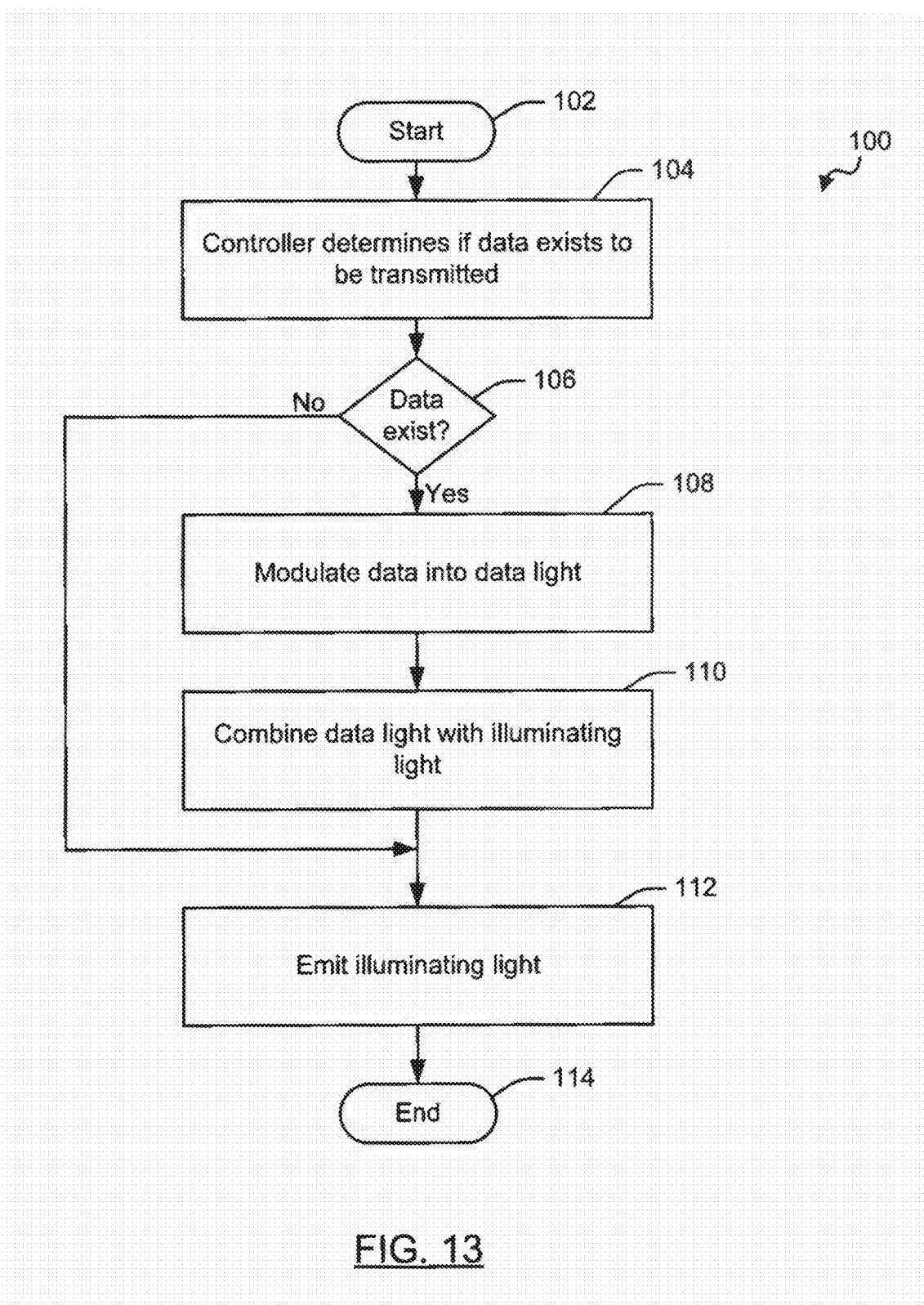
FIGS. 13-16 are flow charts illustrating method aspects of embodiments of the present invention.

Referring now to flowchart 100 of FIG. 13, an illustrative method for transmitting data using data light 45 will now be discussed. Starting at Block 102, the controller 16 may determine if data exists to be transmitted (Block 104). The controller 16 may access the memory 64, check a flag, or perform another operation to determine whether data should be transmitted. If it is determined that no data exists to be transferred at Block 106, the lighting system 10 may continue emitting illuminating light 44 (Block 112). If the controller 61 determines that data exists to be transferred at Block 106, the controller 61 may modulate the data into the data light 45 (Block 108. Next, the controller 16 may combine the data light 45 with the illumination light 44 (Block 110). The lighting system 10 may then emit the illuminating light 44 (Block 112). The operation may then terminate at Block 114.

Figure 14:
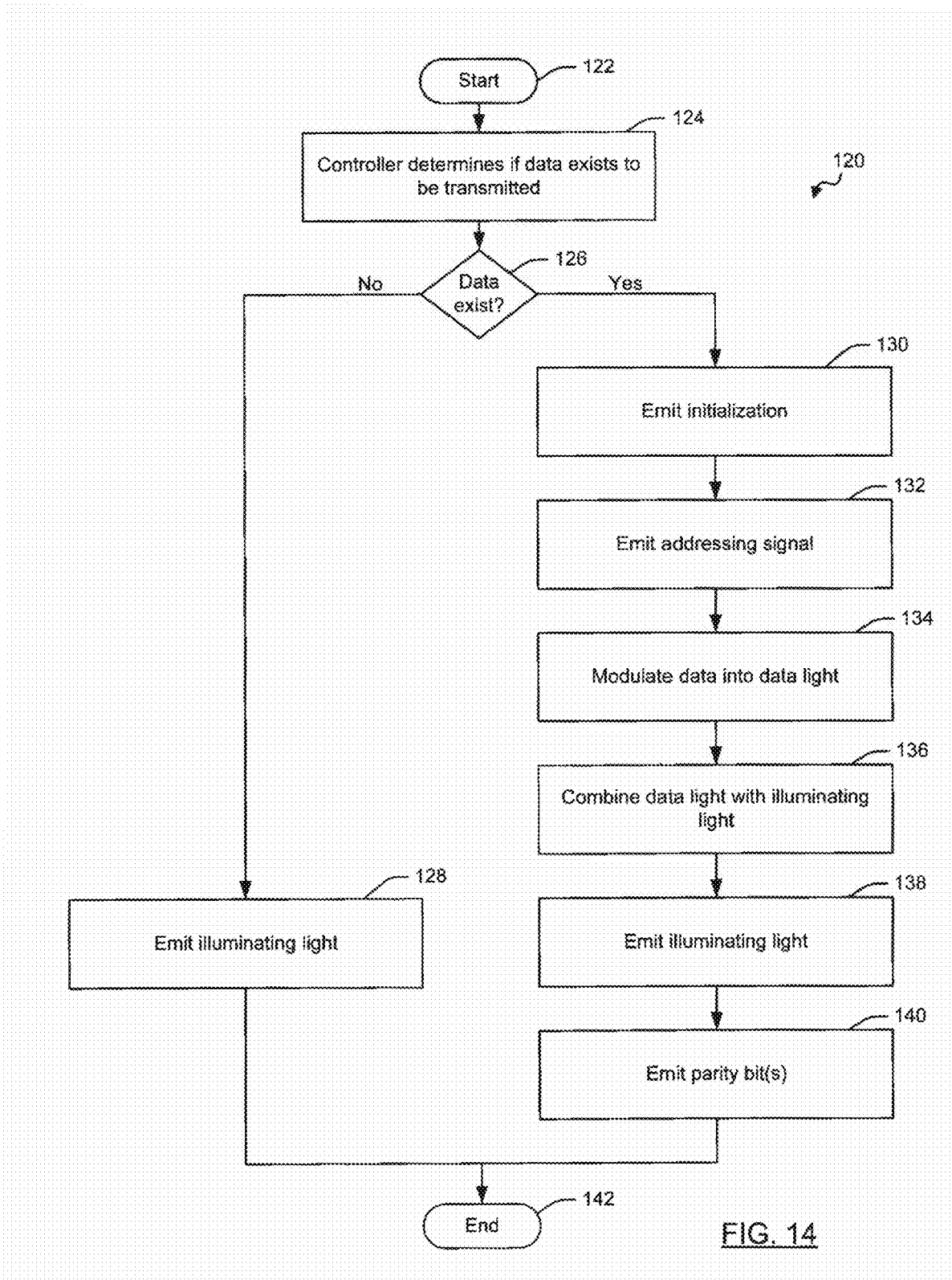

Referring now to flowchart 120 of FIG. 14, an additional illustrative method for transmitting data using data light 45 will now be discussed. Starting at Block 122, the controller 61 may determine if data exists to be transmitted (Block 124. The controller 61 may access the memory 64, check a flag, or perform another operation to determine whether data should be transmitted. If it is determined that no data exists to transfer at Block 126, the lighting system 10 may continue emitting illuminating light 44 (Block 128), after which the operation may terminate at Block 142.

If the controller 61 determines that data exists to be transferred at Block 126, the controller 61 may control the lighting system 10 to emit initialization data 82 (Block 130). The lighting system 10 may next emit addressing data 83 to indicate an intended recipient (Block 132). The controller 61 may next modulate the data communication 80 into data light 45 (Block 134). The data light 45 may then be combined with the illuminating light 44 (Block 136). The lighting system 10 may emit the illuminating light 44 at Block 138, which may include the data light 45. Once the data communication 80 has been transmitted, the lighting system 10 may emit one or more parity bit (Block 140). The operation may then terminate at Block 142.

Figure 15:
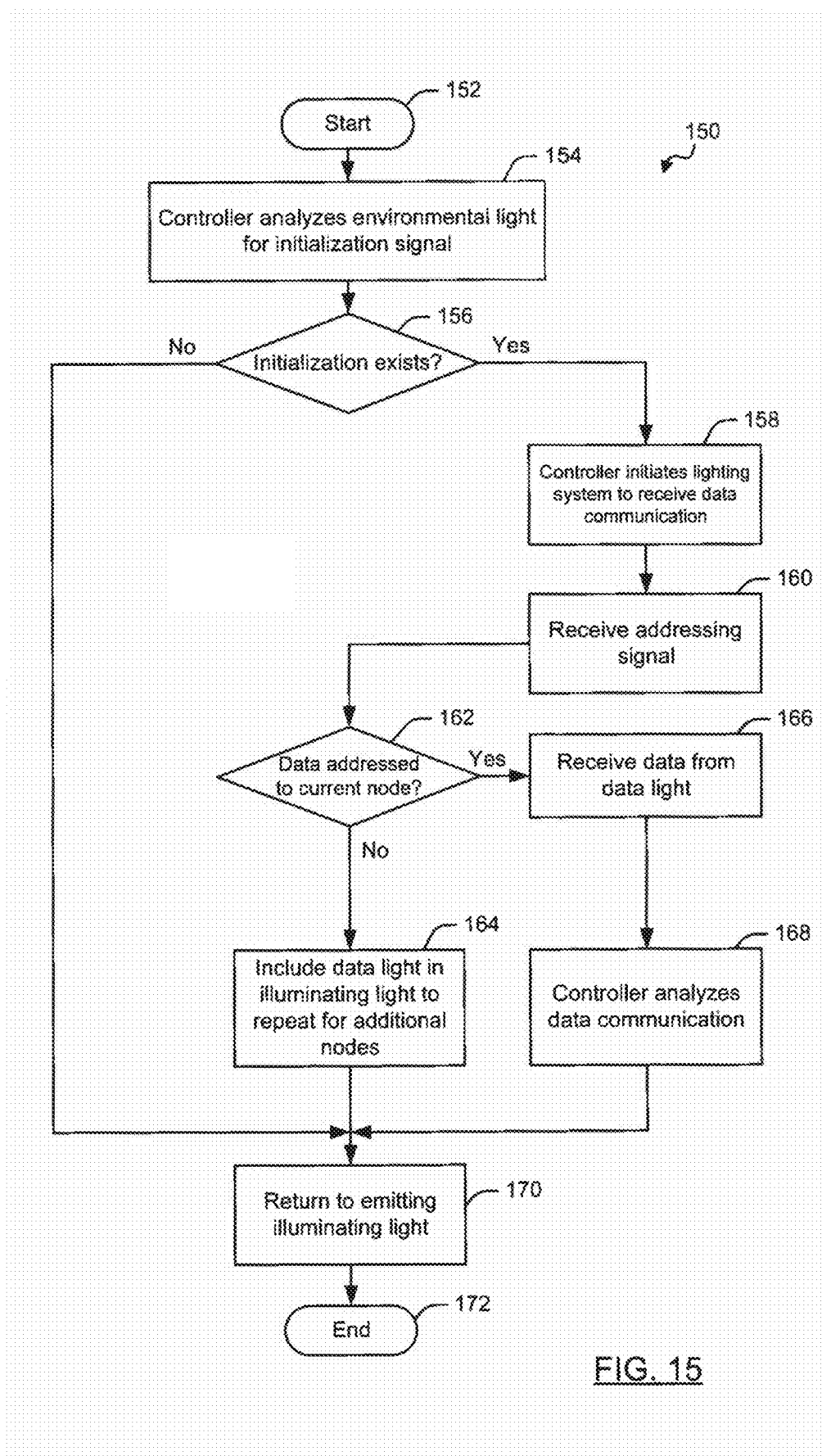

Referring now to flowchart 150 of FIG. 15, an illustrative operation for receiving a data communication 80 using data light 45 will now be discussed. Starting at Block 152, the controller 61 may analyze the environmental light 48 for initialization data 82 (Block 154). If it is determined at Block 156 that no initialization signal exists in the environmental light 48, the lighting system 10 may continue emitting illuminating light 44 (Block 170), after which the operation may terminate at Block 172.

If the controller 61 determines that initialization data 82 exists at Block 156, the controller 61 may initiate the lighting system 10 to receive a data communication 80 (Block 158). The initialization may include preparing registers, altering patterns of emitting illuminating light 44, or shifting the duty of emitting illuminating light 44 to additional light emitting semiconductor devices included in the light system 10. The lighting system 10 may next receive an addressing signal at Block 160. As discussed above, the addressing signal may indicate a device by which the data communication 80 is intended to be received.

The controller 61 may next determine whether the data communication 80 is addressed to the current node or device (Block 162). If the data communication 80 includes addressing data 83 that indicates a different device or node, the receiving node may include the data light 45 in subsequently emitted illuminating light 44 to repeat the data communication 60 for additional nodes (Block 164). By repeating the data communication 80, the receiving node, to which the data communication 80 may not have been intended, may rebroadcast the data communication 80 cover an extended area that may not have been accessible by the node from which the data communication 80 may have originated.

If it is determined that the addressing data 83 indicates the current node at Block 162, the lighting system 10 at that node may receive the data communication 80 from the data light 45 (Block 166). The controller 61 may then analyze the data communication 80 (Block 168). The controller 61 may additionally store at least part of the data communication 80 in the memory 64. After the data communication 80 has been processed, the lighting system 10 may return to emitting illuminating light 44 (Block 170). The operation may then terminate at Block 172.

Figure 16:
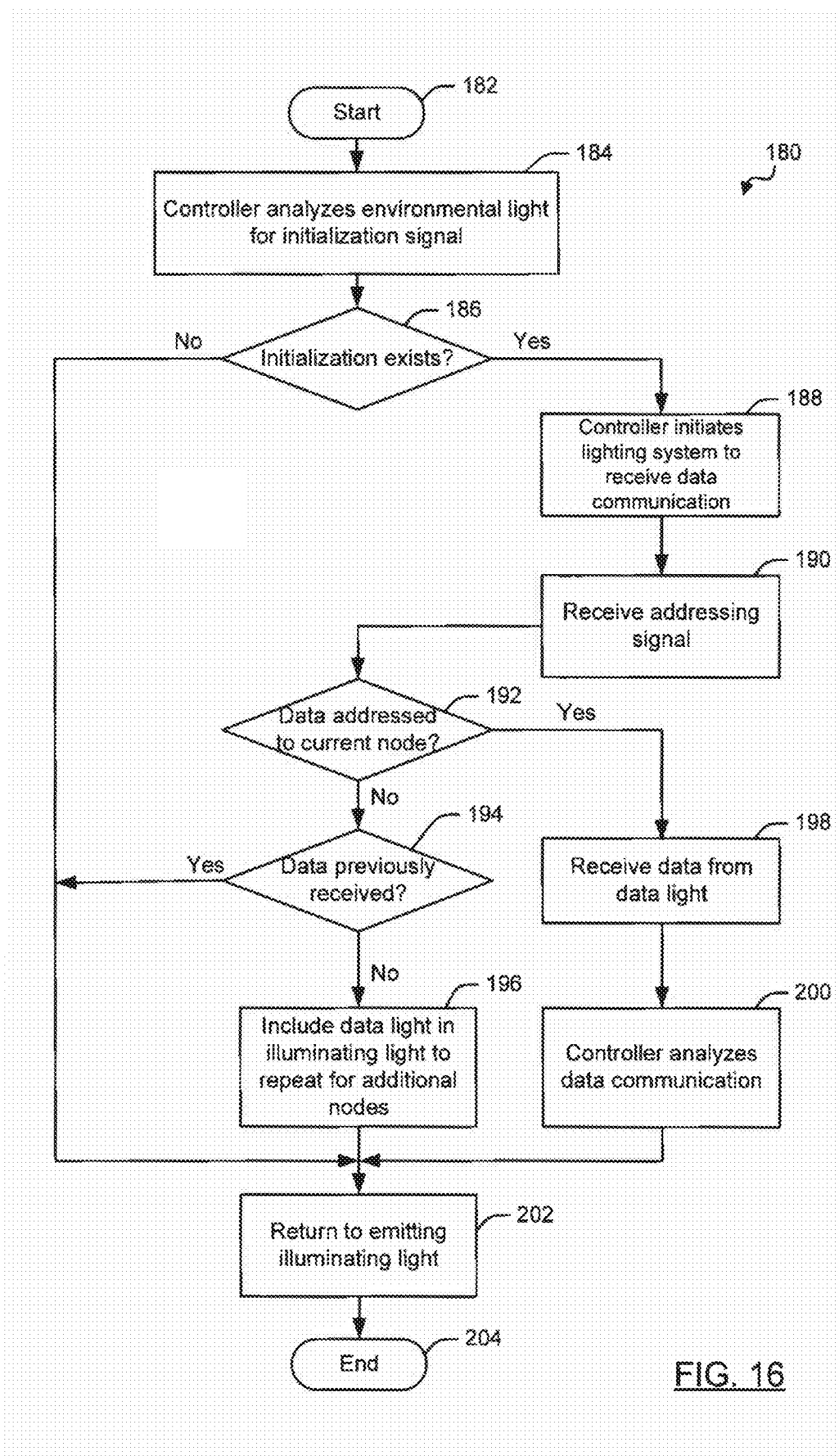

Referring now to flowchart 180 of FIG. 16, an illustrative operation for receiving and repeating a data communication 80 using data light 45 will now be discussed. Starting at Block 182, the controller 61 may analyze the environmental light 48 for initialization data 82 (Block 184). If it is determined at Block 186 that no initialization signal exists in the environmental light 48, the lighting system 10 may continue emitting illuminating light 44 (Block 202), after which the operation may terminate at Block 204.

If the controller 61 determines that initialization data 82 exists at Block 186, the controller 61 may initiate the lighting system 10 to receive a data communication 80 (Block 188). The initialization may include preparing registers, altering patterns of emitting illuminating light 44, or shifting the duty of emitting illuminating light 44 to additional light emitting semiconductor devices included in the lighting system 10. The lighting system 10 may next receive an addressing signal at Block 190. As discussed above, the addressing signal may indicate a device by which the data communication 80 is intended to be received.

The controller 61 may next determine whether the data communication 80 is addressed to the current node or device (Block 192). If the data communication 80 includes addressing data 83 that indicates a different device or node, the receiving node may next determine whether the data communication 80 has been previously received by the current node (Block 194). If the data communication 80 has been previously received, the lighting system 10 may abstain from retransmitting the data communication 80 by returning to emitting illuminating light 44 (Block 202). Alternatively, if the controller 61 determines that the data communication 80 has not been previously received at Block 194, the receiving node may include the data light 45 in subsequently emitted illuminating light 44 to repeat the data communication 80 for additional nodes (Block 196). By repeating the data communication 80, the receiving node, to which the data communication 80 may not have been intended, may rebroadcast the data communication 80 cover an extended area that may not have been accessible by the node from which the data communication 80 may have originated.

If it is determined that the addressing data 83 indicates the current node at Block 192, the lighting system 10 at that node may receive the data communication 80 from the data light 45 (Block 198). The controller 16 may then analyze the data communication 80 (Block 200). The controller 61 may additionally store at least part of the data communication 80 in the memory 64. After the data communication 80 has been processed, the lighting system 10 may return to emitting illuminating light 44 (Block 202). The operation may then terminate at Block 204.

The pattern recognition operations, as performed by an embodiment of the lighting system 61 of the present invention, will now be discussed. A person of skill in the art will appreciate that the following illustrative embodiments are provided as non-limiting examples of pattern recognition operations. Skilled artisans will additionally appreciate many additional pattern recognition operations that would be apparent after having the benefit of this disclosure.

The environmental conditions may be sensed by the lighting system 10, according to an embodiment of the present invention, by sensing the environmental light 48 by the light emitting semiconductor device 40 of the lighting system 10. The environmental condition may then be transmitted to the controller 61 as data to be analyzed. The controller 61 may analyze data received from a single light emitting semiconductor device 40 or from a plurality of light emitting semiconductor devices. The data may then be concatenated to allow further analysis of the information included in the collective data. As an example, the plurality of light emitting semiconductor devices may be included in an array. As an additional example, the plurality of light emitting semiconductor devices may be communicatively connected across a plurality of nodes, which may be included in a neural network.

For the following description, a neural network is defined to include one or more nodes, including one or more controllers and light emitting semiconductor devices, communicatively connected to distribute data sensing and processing operations across the network of nodes. A neural network may sense the occurrence of an event or condition in the network. A neural network may also be trained to recognize various objects. Moreover, the neural network may distinguish one or more objects from another object possessing similar, but not identical, characteristics.

The training method performed on the neural network to recognize objects and conditions may be done using various techniques. For example, one of the embodiments can include the use of back propagation of gradient-descent computed error corrections for weights and biases. Examples of operations to configure the controller 61 to perform error correction using machine learning may include feed forwarding of the input training pattern, computing the associated error between computed outputs and training vector outputs, back propagating the associated errors, and adjusting weights and biases. Skilled artisans will appreciate that the list of steps to train a neural network, or other component of the lighting system 61 that utilizes machine learning or similar process, is not intended to be exhaustive. Additional steps may be performed by the neural network consistent with the scope and spirit of the present invention, and are intended to be included within the disclosure of the same.

Figure 17:
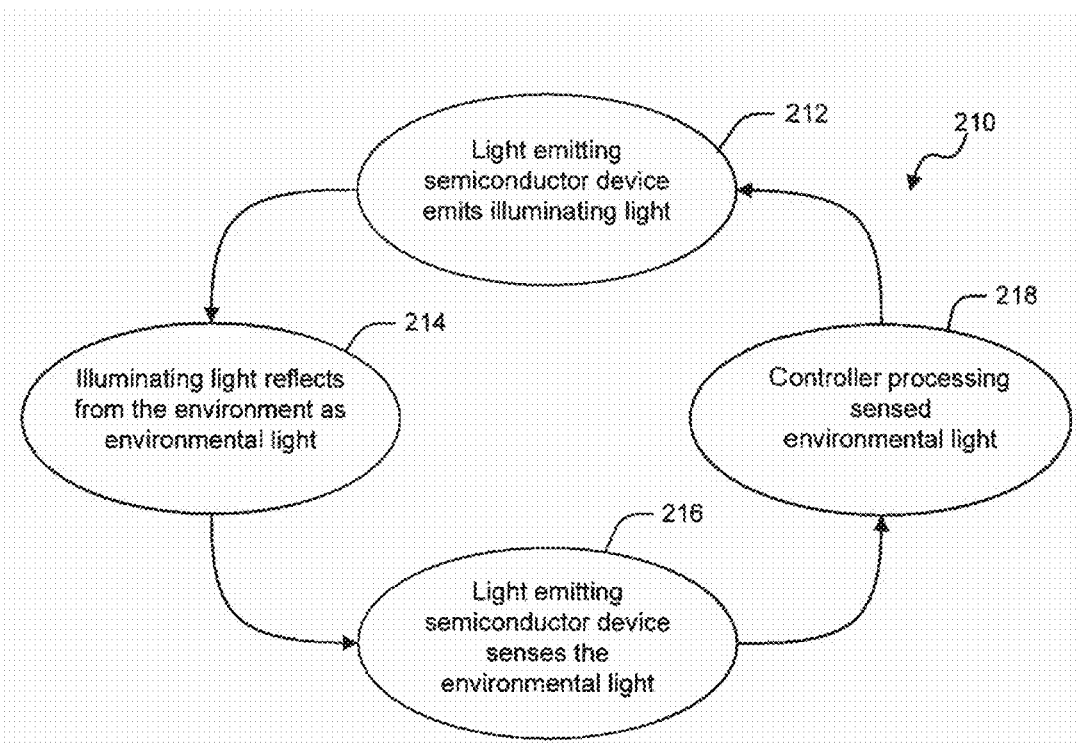
FIGS. 17-17B are state diagrams illustrating modulation cycles of a light emitting semiconductor device in the lighting system according to an embodiment of the present invention.
Figure 18:
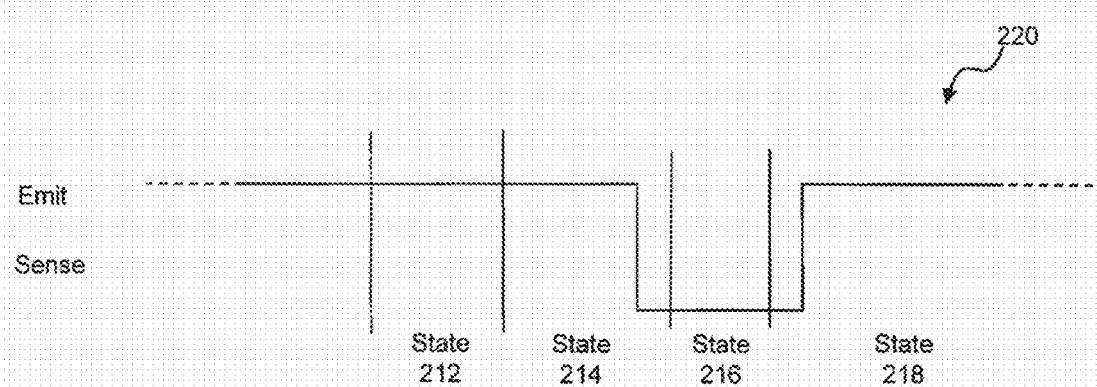
FIG. 18 is a timing diagram providing a graphical chart of switching the light emitting semiconductor device between the emitting operation and the sensing operation in the lighting system according to an embodiment of the present invention.

Referring now to the state diagram 210 of FIG. 17, an illustrative modulation cycle of a light emitting semiconductor device 40 will now be discussed. Additionally, referring to the timing diagram of 220 of FIG. 18, a graphical chart 220 of switching the light emitting semiconductor device 40 between the emitting operation and the sensing operation will now be discussed. In the interest of simplicity, the light emitting semiconductor device 40 may be discussed as emitting illuminating light 44 and sensing environmental light 48. However, it should be understood by a person of skill in the art that the lighting system 10 may additionally include a dedicated photodiode 41, which may additionally and/or exclusively sense environmental light 48.

The operation illustrated in the state diagram 210 may begin by the light emitting semiconductor device 40 emitting an illuminating light 44 into an environment (State 212), which is represented by the chart 220 as engaging in the emitting operation. The illuminating light 44 may then reflect from the environment as environmental light 48 (State 214), which is additionally represented by the chart 220 as engaging in the emitting operation. Skilled artisans will appreciate that additional light may be generated or reflected from the environment, which should be included within the definition of environmental light 48. Examples of additional light may include sunlight, artificial light, and light generated by additional devices intended to communicate with the lighting system 10, according to an embodiment of the present invention.

Looking to State 216, the lighting emitting semiconductor 40 may sense the environmental light 48 received from the environment. Referring additionally to the chart 220, prior to entering the operation described by State 216, the light emitting semiconductor device 40 may switch into a sensing operation. Similarly, after sensing the environmental light 48, as performed in State 216, the light emitting semiconductor device 40 may switch back into the emitting operation. The controller 61 of the lighting system 10 may then begin processing the environmental light 48 at State 218. Once the processing has been initiated, the light emitting semiconductor device 40 of the lighting device 10 may return to the operation of State 212, wherein it may again emit illuminating light 44.

Figure 17B:
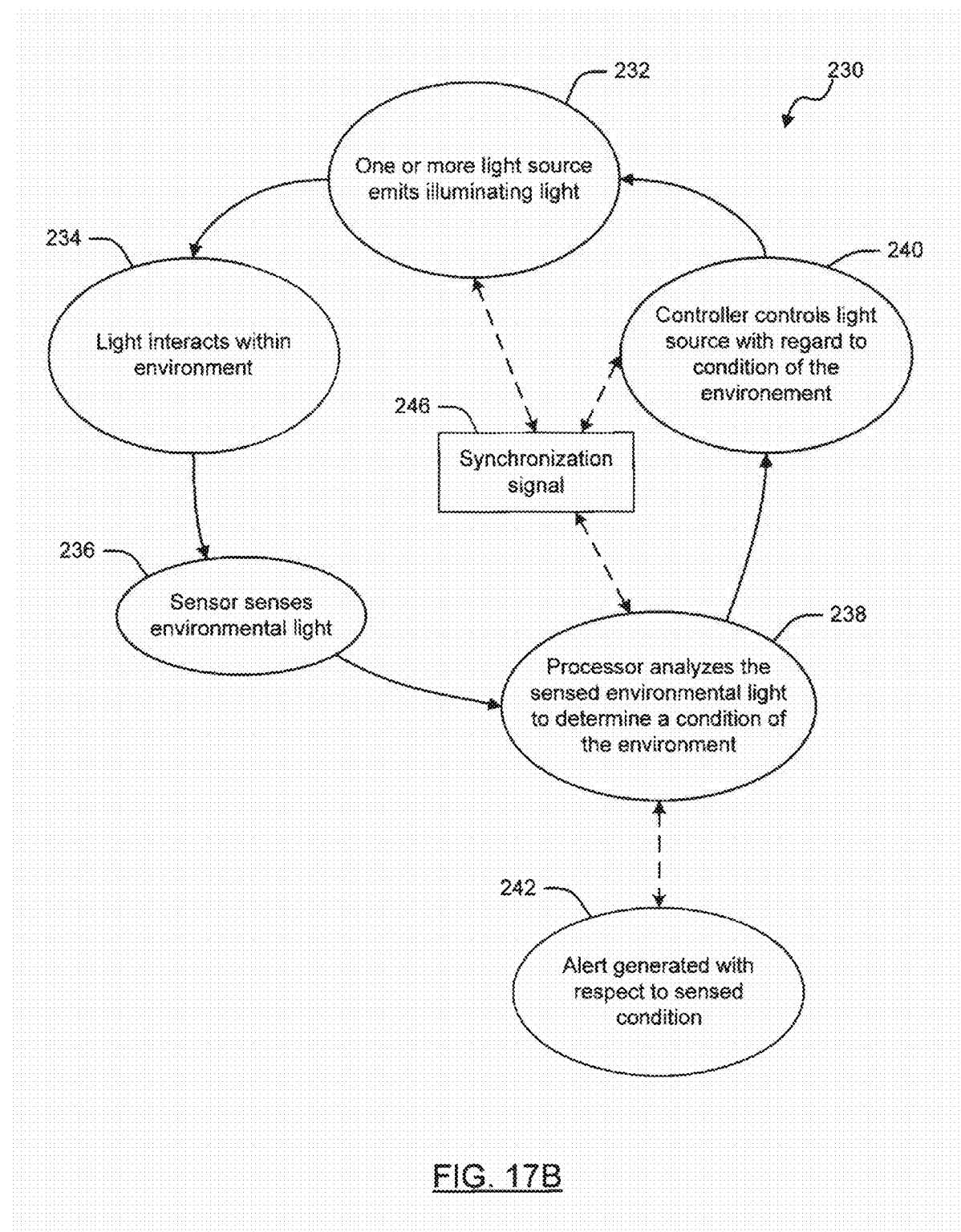

Referring now to the state diagram 230 of FIG. 17B, an additional illustrative embodiment of the aforementioned example will now be discussed. The example illustrated by state diagram 230 may sense environmental light 48, which may be analyzed by a controller 61 to control subsequent emission of illuminating light 44. Alternately, the example illustrated in state diagram 230 may sense environmental light 48, which may be analyzed by a controller 61 to generate an alert, with or without controlling the subsequent emission of illuminating light 44. A person of skill in the art will appreciate that the following illustrative operation is provided as an example only, and is not intended to limit the present invention.

Starting at State 232, one or more light source may emit illuminating light 44. The light source may be a light emitting semiconductor device 40. The illuminating light 44 may then interact with the environment, which interaction may include being reflected by the environment (State 234). The sensor may then sense the environmental light 48 (State 236). The sensor may be a light emitting semiconductor device 40.

The processor 62, which may be included in the controller 61, may analyze the sensed environmental light 48 to determine a condition of the environment (State 238). If a condition is determined, an alert may optionally be generated with respect to the sensed condition (State 242). The condition that may trigger an alert may be statically or dynamically defined. After the operation of State 238, the controller 61 may control the light source with regard to the condition of the environment (State 240). After performing the operation of State 240, the operation of state diagram 230 may return to State 232, which may restart the cycle of states. Optionally, a synchronization signal 246 may be used to synchronize operation of the States 232, 238, and 240.

A person of skill in the art will appreciate one or more of the preceding states may be performed substantially simultaneously with another state. For example, after sensing the environmental light 48 at State 216, the lighting system 10 may substantially simultaneously enter State 216 and 212, wherein the controller 61 may analyze the sensed environmental light 48 as the light emitting semiconductor device 40 switches to emitting an illumination light 44. As such, skilled artisans will not view the preceding example as imposing any limitation on the operative states of the lighting system 10, according to an embodiment of the present invention.

The controller 61 may include one or more threshold values, to which it may compare the sensed environmental light 48. As the controller 61 analyzes the environmental light 48, it may determine whether the level of environmental light 48 is above or below one or more threshold value. The controller 61 may then increase or decrease the amount of illuminating light 44 emitted by the light emitting semiconductor device 40 as a result of the aforementioned analysis. The level of light may be controlled, for example, by controlling the duty cycle of one or more light emitting semiconductor device 40.

Figure 19:
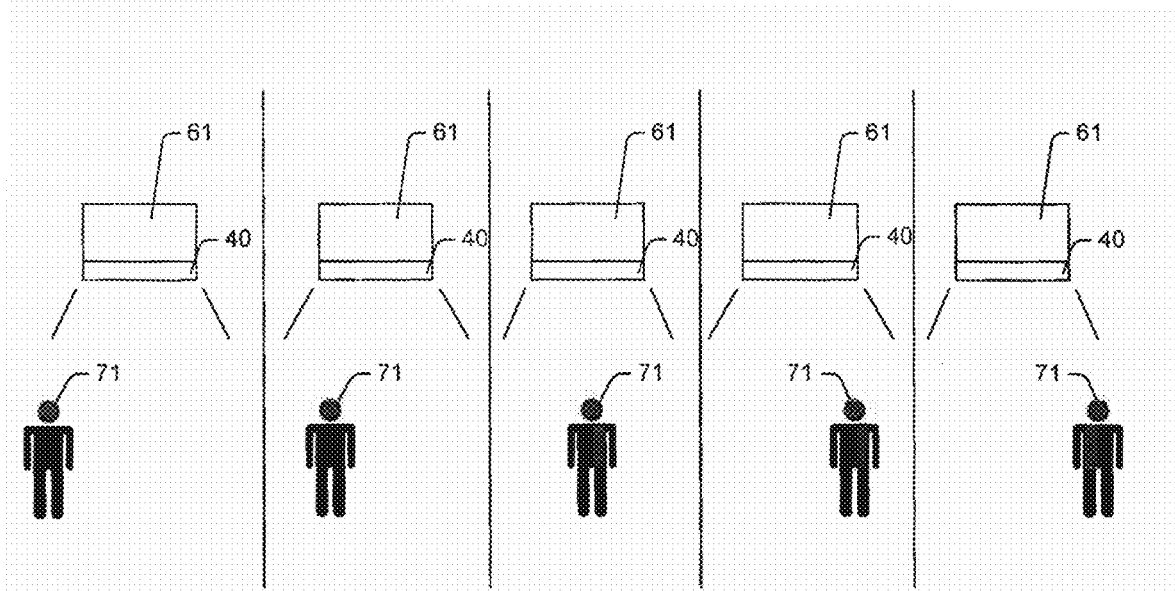
FIG. 19 is a chart illustrating a figure of events that may occur in an environment and sensed using the lighting system according to an embodiment of the present invention.
Figure 20:
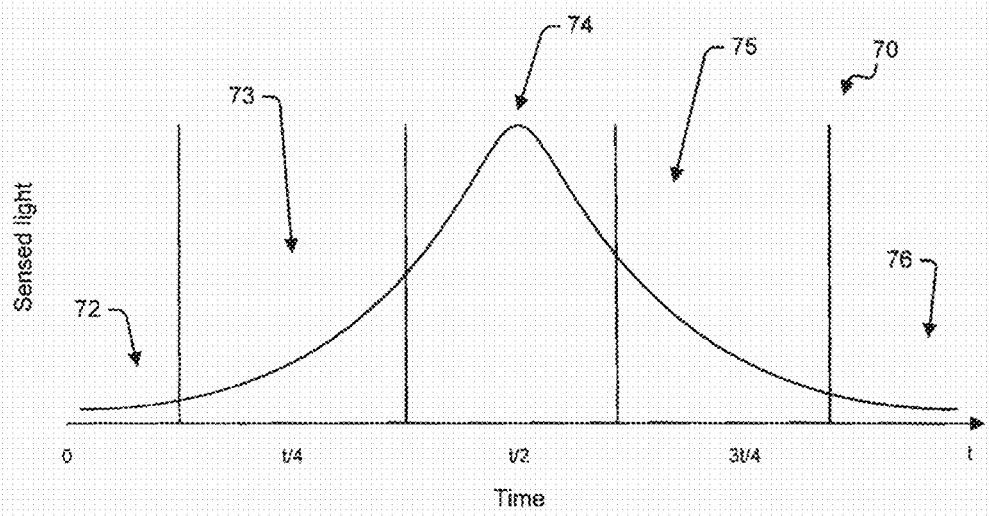
FIG. 20 is a chart illustrating relative intensity of environmental light sensed by the lighting system according to an embodiment of the present invention corresponding with time.

Referring now to FIGS. 19-20, a non-limiting example for sensing varying light intensities will now be discussed. By sensing the varying intensity of light, the lighting device 10 may approximate motion in the environment. FIG. 19 illustrates a series of events that may occur in an environment. The events illustrated in FIG. 19 may correlate with the relative intensity of environmental light 48 sensed by the lighting system 10. FIG. 20 provides a chart 70 that illustrates the relative intensity of environmental light 48 sensed by the lighting system 10 corresponding with time. The events of FIG. 19 are indicated on the light intensity curve of the chart 70 included in FIG. 20.

Starting at Event 72, an object 71 may be in the peripheral range of the lighting system 10, which may be represented by the relatively low intensity of light on the chart 70. As the object moves closer to the lighting system 10, such as may occur at Event 73, the intensity of environmental light 48 sensed by the lighting system 10 may begin to increase. The increase of sensed light may be caused by an increased amount of light being reflected from the object 71 in the environment.

As the object may move directly in line with the lighting system 10, as illustrated by Event 74, it may reflect a substantial amount of environmental light 48. The substantial amount of environmental light 48 may then be sensed by the light emitting semiconductor device 40 of the lighting system 10, as illustrated by the chart 70. The object may then move away from the lighting system 10, as illustrated by Event 75, resulting in a decreased amount of environmental light 48 being sensed by the lighting system 10. The object may then move to the peripheral range of the lighting system 10, as shown by Event 76 and which may be represented by the relatively low intensity of light on the chart 70.

Referring back to FIGS. 2-3, the lighting system 10, according to an embodiment of the present invention, may include a plurality of light emitting semiconductor devices configured in an array 39. The array of light emitting semiconductor devices may be operatively connected to a controller 61, which may control each light emitting semiconductor device 40 in the array 39 to emit illuminating light 44 and/or sense environmental light 48. The following examples are included to discuss simplified embodiments of the lighting system 10 of the present invention, in the interest of clarity. Skilled artisans will appreciate that the discussions provided below may be extended to a larger scale, which may provide additional functionality.

Referring now to FIG. 21-24, an illustrative switching operation will now be discussed. Starting with FIG. 21, an array 39 is presented with a plurality of light emitting semiconductor devices emitting illuminating light 44, as indicated by the symbol "E," and sensing environmental light 48, as indicated by the symbol "S." In this embodiment, the controller 61 may maintain the configuration of "E" and "S" light emitting semiconductor devices for a given period, such as, for example, a number of nanoseconds. After the duration of the period ends, the controller 61 may switch the operation of one or more light emitting semiconductor devices, as illustrated in FIGS. 22-23.

When viewed in series of one another, FIGS. 21-23 illustrate a pattern of light emission and sensing. This example pattern is provided for illustrative purposes only, and is not intended to impose any limitations on the lighting system 10 of the present invention. As each period ends, the light emitting semiconductor device 40 to the right may switch its operational state. This operation may repeat until the array cycles through substantially all light emitting semiconductor devices operating to both emit illuminating light 44 and sense environmental light 48.

As illustrated in FIG. 24, an additional embodiment may include staggering the light emitting semiconductor devices in a checkerboard style arrangement, wherein every other light emitting semiconductor device 40 may cycle through the emitting and sensing light. Skilled artisans will appreciate a nearly endless number of additional configurations of light emitting semiconductor devices that are configured to sense and emit light, including selecting the operation mode of the light emitting semiconductor devices, to be included within the scope of the present invention.

Referring now additionally to FIG. 25, an additional non-limiting example of light emitting semiconductor devices operating in the array 39 will now be discussed. In this example, the amount of illumination required by the lighting system 10 may be substantially greater than the sampling rate required for sensing the environmental light. In this example, all but one light emitting semiconductor device 40 is emitting illuminating light 44. Conversely, a single light emitting semiconductor device 40 may be sensing environmental light 48. The light emitting semiconductor device 40 of the array sensing light may be varied by the controller 61, such that substantially all light emitting semiconductor devices sense environmental light 48 at some period during the operation of the array 39.

Referring now additionally to FIG. 26, an additional non-limiting example of light emitting semiconductor devices operating in the array 39 will now be discussed. In this example, the controller 61 may randomly control the light emitting semiconductor devices between emitting illuminating light 44 and sensing environmental light 48. As the duration of each duty cycle may decrease, or as the number of light emitting semiconductor devices included in the array may increase, the ratio of between emitting and sensing light emitting semiconductor devices may become approximately evenly distributed.

Referring now to FIG. 27 an additional non-limiting example of light emitting semiconductor devices operating in the array 39 will now be discussed. In this example, the controller 61 may selectively enable all the light emitting semiconductor devices to emit illuminating light 44 at a given instant. This total emission operation may allow the lighting system 10 to emit illuminating light 44 with high luminosity. Additionally, this total emission operation may allow the lighting system 10 to transmit data light 45 at high bandwidth. The duration of this total emission operation may be as short as one switching cycle. After the total emission operation ends, the controller 61 may again enable at least one light emitting semiconductor device 40 to sense environmental light 48.

Referring now to FIG. 28 an additional non-limiting example of light emitting semiconductor devices operating in the array will now be discussed. In this example, the controller 61 may selectively enable all the light emitting semiconductor devices to sense environmental light 48 at a given instant. This total sensing operation may allow the lighting system 10 to sense environmental conditions with high precision. Additionally, this total sensing operation may allow the lighting system 10 to receive data light 45 at high bandwidth. The duration of this total sensing operation may be as short as one switching cycle. After the total emission operation ends, the controller 61 may again enable at least one light emitting semiconductor device 40 to emit illuminating light 44.

Light emitting semiconductor devices may be located proximately near one another in an array 39. As a result, light emitting semiconductor devices operating to sense environmental light 48 may consequentially sense at least a part of the illuminating light 44 emitted by its neighboring light emitting semiconductor devices. However, since the light emitting semiconductor devices may detect the change of light in an environment, the additional environmental light may add cumulatively to the illuminating light 44 emitted by the neighboring light emitting semiconductor devices. Through signal processing and filtering, the controller 61 may detect and isolate the illuminating light 44 from the combined light sensed by the light emitting semiconductor device 40 included in the array 39. The environmental light isolation may be performed, for example, buy sensing the changes of light in an environment, and disregarding the static level of light emitted by the neighboring light emitting semiconductor devices. A person of skill in the art will appreciate the application of the aforementioned environmental light isolation which may additionally occur between the various nodes in a neural network of lighting systems. In the neural network, the filtering of environmental light 48 from the illuminating light 44 emitted by additional nodes in the network 69 may be coordinated by transmitting and receiving data communications, as has been discussed above.

By alternating the operation of the light emitting semiconductor devices between emitting and sensing light, a wider area of environmental light 48 may be sensed. Additionally, alternating the light emitting semiconductor devices to emit light may allow for a significantly even distribution pattern of emitted illuminating light. As a wider area of the environment may be sensed, the amount of information that may be gathered from an environment may increase.

Figure 29:
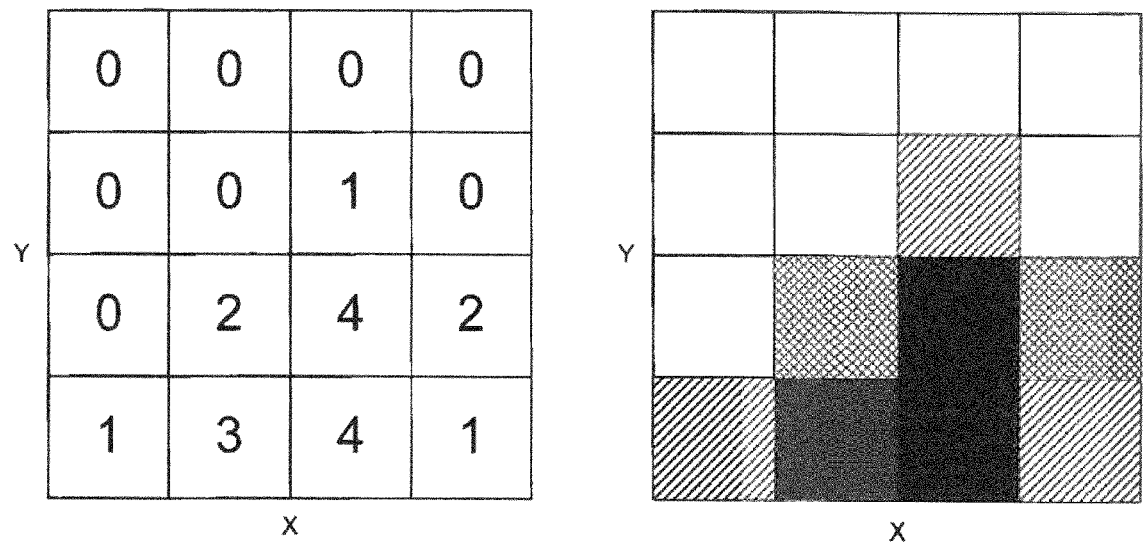
FIGS. 29-30 are schematic diagrams showing a correlation of data sensed in a data light using the lighting system according to an embodiment of the present invention to an image.
Figure 30:
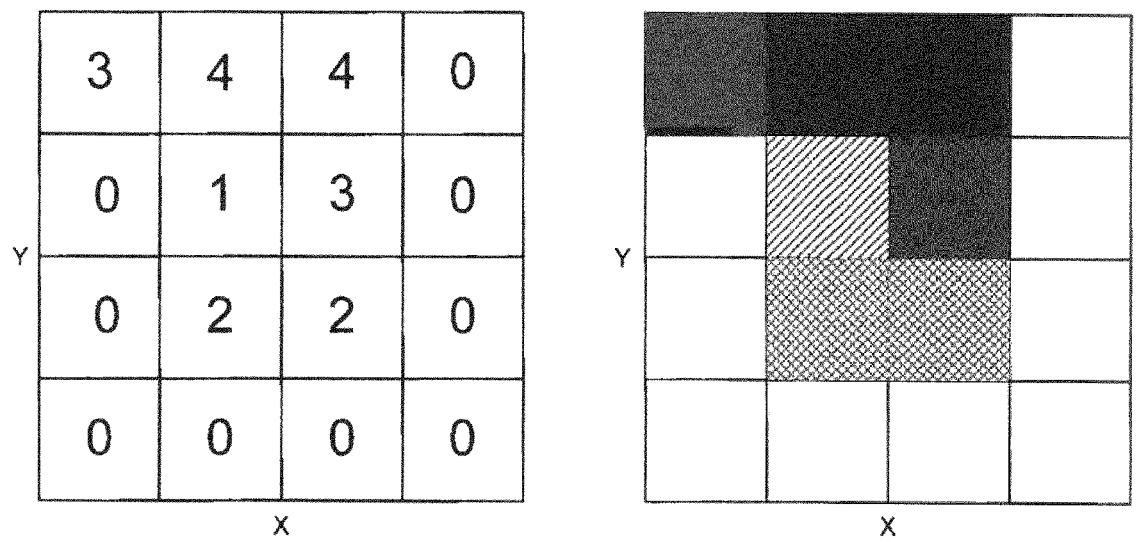

Referring now to FIGS. 29-30, an embodiment of the lighting system 10 of the present invention that may provide motion detection will now be discussed. In the following examples, the controller 61 may be able to distinguish between a plurality of light levels present in an environment. In the interest of clarity, the following examples describe five discrete light levels. However, a person of skill in the art will appreciate that any number of levels may be sensed by the light emitting semiconductor device 40 and analyzed by the controller 61, in accordance with the scope of various embodiments of the present invention.

Additionally, in the following examples, location of the light emitting semiconductor device 40 in the array 39 is indicated in a square grid array using (X, Y) coordinates. The various intensity of light sensed by the light emitting semiconductor device 40 is represented by a scale of zero (0), wherein the light sense may be negligible, to four (4), wherein the light emitting semiconductor device 40 may be saturated with environmental light 46. A person of skill in the art will appreciate that any configuration of arrays, including one-dimensional, two-dimensional, and three-dimensional arrays, may be configured with or without a uniform pattern, and is to be included within the scope of the present invention. In the interest of clarity, a non-limiting assumption will be made that the object is tallest approximately at its center. An additional non-limiting assumption will be made that the lighting system 10 is included in a ceiling mounted lighting fixture.

Referring first to FIG. 29, an object may be located approximately near the bottom center of the area to be sensed by the lighting system 10. Since the tallest point of the object may be located near the object's center, the amount of light reflected from the environment proximate to the object may be greater than other points wherein the object is not present. In the example illustrated by FIG. 29, the light emitting semiconductor device 40 may sense a saturating amount of environmental light 48 from locations (3, 1) and (3, 2), with varying levels of luminosity surrounding the saturated areas. The controller 61 may process the levels sensed by the light emitting semiconductor devices included in the array 39 to determine that an object is present in the field in which the lighting system 10 may sense. The controller 61 may then, for example, control the light emitting semiconductor device 40 to increase the emission of illuminating light 44 as a result of an object being present in the environment.

The lighting system 10 may continue to sample the environment by sensing the luminosity of environmental light 48 present in the environment. Referring now to FIG. 30, a subsequent sensing operation may sense an object located approximately near the top center of the area to be sensed by the lighting system 10. In this subsequent sensing operation, the light emitting semiconductor device 40 may sense a saturating amount of environmental light 48 from locations (2, 4) and (3, 4), with varying levels of luminosity surrounding the saturated areas. The controller 61 may process the levels sensed by the light emitting semiconductor devices included in the array 39 to determine that an object is present in the field in which the lighting system 10 may sense. The controller 61 may additionally determine that the object has substantially relocated since the last sampling period. The relocation of the object between sampling periods may indicate that motion has occurred. The controller 61 may then, for example, control the light emitting semiconductor device 40 to increase the emission of illuminating light 44 as a result of the detected motion in the environment.

A person of skill in the art will appreciate that as an array may include additional light emitting semiconductor devices, or as the array may include repositionable light emitting semiconductor devices, such as those located on a piezoelectric substrate, the number of sampling points from which the light emitting semiconductor device 40 may sense luminosity of light may be increased.

Additionally, as discussed above, nodes included in a network 69, such as a neural network, may collectively communicate with additional nodes. The nodes in a network 69 may share data between one another, or between the nodes and an additional device connected to, or interfacing with, the network 69. As the nodes intercommunicate, the data regarding the sensed light sensed by the light emitting semiconductor devices included in the nodes may be included therein. The data may then be concatenated into a coherent collection of data, allowing the controllers in the network 69 to analyze the data to determine the characteristics of the environment sensed by a substantial portion of the nodes included in the network 69.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A lighting system comprising:
    a light source to emit illuminating light;
    a sensor to sense environmental light from an environment;
    a controller operatively connected to the sensor to analyze the environmental light that is sensed and the light source to control emitting the illuminating light;
    wherein the controller analyzes the environmental light to detect or generate data relating to a condition of the environment, the data being transmittable in data light;
    wherein the controller receives the data included in the data light using the sensor;
    wherein the controller analyzes the data included in the data light;
    wherein the controller controls transmitting the data light from the light source;
    wherein the light source is included in an array to be selectively enabled and disabled by the controller;
    wherein the sensor is included in the array;
    wherein the array includes a plurality of light sources;
    wherein the plurality of light sources is selectively operable substantially simultaneously;
    wherein the plurality of light sources is selectively operable individually;
    wherein the plurality of light sources selectively emits the illuminating light in a plurality of directions;
    wherein the sensor receives the environmental light from the plurality of directions
    wherein the light source and the sensor are included as a light emitting semiconductor device; and
    wherein the light emitting semiconductor device is selectively operable between a sensing operation and an emitting operation, the sensing operation being defined by the light source sensing the environmental light, and the emitting operation being defined by the light source emitting the illuminating light.

2. The lighting system according to claim 1 wherein the array includes a plurality of light emitting semiconductor devices, wherein each of the plurality of light emitting semiconductor devices in the array is selectively operable between the sensing operation and the emitting operation.

3. The lighting system according to claim 1 wherein the controller selectively operates the light emitting semiconductor device between the sensing operation and the emitting operation.

4. The lighting system according to claim 1 further comprising a switching circuit to alternate the light emitting semiconductor device between the sensing operation and the emitting operation.

5. The lighting system according to claim 1 wherein the light source emits the illuminating light, and wherein the sensor receives the environmental light substantially simultaneously.

6. The lighting system according to claim 1 wherein the controller analyzes the environmental light by measuring a drive voltage of the light source, determining a difference between a measured voltage across the light source and the drive voltage, and performing time-domain matching of the measured voltage and the environmental light using cross-correlation.

7. The lighting system according to claim 1 wherein the light source includes a light emitting diode to emit the illuminating light; and wherein the sensor includes a photodiode to sense the environmental light.

8. The lighting system according to claim 1 wherein at least a portion of the plurality of light sources included in the array are sequentially enabled.

9. The lighting system according to claim 1 wherein at least a portion of the plurality of light sources included in the array are defined as monochromatic light emitting diodes (LED).

10. The lighting system according to claim 1 wherein at least a portion of the plurality of light sources included in the array are defined as white light emitting diodes (LED).

11. The lighting system according to claim 1 wherein at least a portion of the plurality of light sources included in the array are defined as infrared light (IR) emitting diodes (LED).

12. The lighting system according to claim 1 further comprising a network comprised of nodes, each node including the light source, the sensor and the controller; wherein the nodes intercommunicate by transmitting and receiving the data light.

13. The lighting system according to claim 12 wherein the data light includes at least one addressing bit to address the nodes intended to receive the data.

14. The lighting system according to claim 12 wherein the nodes are proximately aware of the additional nodes.

15. The lighting system according to claim 12 wherein the controller of the node included in the network of the nodes receives feedback regarding an analysis performed by the controller to be stored in memory; wherein the controller of the node controls transmitting the feedback from the analysis to the additional nodes; and wherein the controller included in the nodes of the network collectively use machine learning to analyze the feedback.

16. The lighting system according to claim 1 wherein the controller receives feedback regarding an analysis performed by the controller to be stored in memory; and wherein the controller analyzes the feedback from the analysis to improve an accuracy of a subsequent analysis over a previous analysis.

17. The lighting system according to claim 16 wherein the controller uses machine learning to analyze the feedback from the analysis.

18. The lighting system according to claim 16 wherein the controller uses a neural network to analyze the feedback from the analysis.

19. The lighting system according to claim 1 wherein the data included in the data light includes at least one error detection bit.

20. The lighting system according to claim 1 further comprising a wavelength conversion material between the light source and the environment to absorb at least part of a source light and emit a converted light having a converted wavelength range, the source light being received and absorbed by the wavelength conversion material, and the converted light being emitted by the wavelength conversion material.

21. The lighting system according to claim 20 wherein the converted wavelength range of the converted light varies depending on the condition in the environment.

22. The lighting system according to claim 20 wherein the wavelength conversion material is selected from a group consisting of a fluorescent material, a luminescent material, and a phosphorescent material.

23. The lighting system according to claim 20 wherein the illuminating light is received by the wavelength conversion material as the source light; wherein the wavelength conversion material converts the source light to the converted light; and wherein the converted light is emitted by the wavelength conversion material within the converted wavelength range.

24. The lighting system according to claim 20 wherein the environmental light is received by the wavelength conversion material as the source light; wherein the wavelength conversion material converts the source light to the converted light; and wherein the converted light is received by the light source within the converted wavelength range.

25. The lighting system according to claim 20 wherein the converted wavelength range includes shorter wavelengths than the source wavelength range; and wherein the wavelength conversion material converts the source light to the converted light by performing an anti-Stokes shift.

26. The lighting system according to claim 20 wherein the converted wavelength range includes longer wavelengths than the source wavelength range; and wherein the wavelength conversion material converts the source light to the converted light by performing a Stokes shift.

27. The lighting system according to claim 1 wherein the controller is operatively connected to a voltage sensor to sense an open circuit voltage across the light emitting semiconductor device sensing the environmental light.

28. The lighting system according to claim 1 wherein the data light transmits the data using an operation selected from a group consisting of pulse width modulation (PWM), pulse amplitude modulation (PAM), intensity modulation, color sequencing, and duty cycle variation.

29. The lighting system according to claim 1 wherein a sample rate at which data is transmitted in the data light is dynamically adjustable by the controller.

30. The lighting system according to claim 1 wherein the data is included in the data light digitally.

31. The lighting system according to claim 1 wherein the data included in the data light is encrypted.

32. The lighting system according to claim 1 further comprising a power supply to drive the light source.

33. The lighting system according to claim 1 wherein the light source is operable in a pulsed mode.

34. The lighting system according to claim 1 wherein the controller processes the environmental light to remove noise.

35. The lighting system according to claim 1 wherein the controller characterizes a luminosity of the environmental light.

36. The lighting system according to claim 1 wherein the controller characterizes a dominant wavelength included in the environmental light.

37. The lighting system according to claim 1 wherein the light source is included on a piezoelectric substrate.

38. The lighting system according to claim 1 wherein the controller comprises a lighting controller and an analysis processor; wherein the lighting controller controls operation of the light source; and wherein the analysis processor controls analysis of the sensed environmental light.

39. A lighting system comprising:
a network of nodes, each node comprising:
 a light source to emit illuminating light and sense environmental light from an environment;
 a wavelength conversion material between the light source and the environment to absorb at least part of a source light and emit a converted light having a conversion wavelength range, the source light being received and absorbed by the wavelength conversion material, and the converted light being emitted by the wavelength conversion material; and
 a controller operatively connected to the light source to analyze the environmental light that is sensed and to control emitting the illuminating light;

wherein each of the nodes in the network are aware of additional nodes in the network;

wherein the nodes intercommunicate by transmitting and receiving data light;

wherein the controller analyzes the environmental light to detect or generate data relating to a condition of the environment, the data being transmittable in the data light to the nodes included in the network;

wherein the controller receives the data included in the data light using the light source;

wherein the controller analyzes the data included in the data light;

wherein the controller controls transmitting the data light from the light source among the nodes; and wherein the light source is selectively operable between a sensing operation and an emitting operation, the sensing operation being defined by the light source sensing the environmental light, and the emitting operation being defined by the light source emitting the illuminating light.

40. The lighting system according to claim 39:

wherein the light source in each of the nodes is included in an array to be selectively enabled and disabled by the controller;

wherein the array includes a plurality of light sources;

wherein each light source included in the plurality of light sources is sensitive to at least one wavelength respective to the each light source;

wherein the plurality of light sources is selectively operable substantially simultaneously;

wherein the plurality of light sources is selectively operable individually;

wherein the plurality of light sources selectively emits the illuminating light in a plurality of directions and selectively receives the environmental light from the plurality of directions.

41. The lighting system according to claim 39 wherein the controller selectively operates the light source between the sensing operation and the emitting operation.

42. The lighting system according to claim 39 further comprising a switching circuit to alternate the light source between the sensing operation and the emitting operation.

43. The lighting system according to claim 39 wherein the light source emits the illuminating light and receives the environmental light substantially simultaneously.

44. The lighting system according to claim 39 wherein the controller analyzes the environmental light by measuring a drive voltage of the light source, determining a difference between a measured voltage across the light source and the drive voltage, and performing time-domain matching of the measured voltage and the environmental light using cross-correlation.

45. The lighting system according to claim 39 wherein the light source includes a light emitting diode to emit the illuminating light and a photodiode to sense the environmental light.

46. The lighting system according to claim 39 wherein at least a portion of the plurality of the light sources included in the array are sequentially enabled.

47. The lighting system according to claim 39 wherein the light source is defined as a monochromatic light emitting diode (LED).

48. The lighting system according to claim 39 wherein the light source is defined as a white light emitting diode (LED).

49. The lighting system according to claim 39 wherein the light source is defined as an infrared light (IR) emitting diode (LED).

50. The lighting system according to claim 39 wherein the data light includes at least one addressing bit to address the nodes intended to receive the data.

51. The lighting system according to claim 39 wherein the nodes are proximately aware of the additional nodes.

52. The lighting system according to claim 39 wherein the controller of the node included in the network of the nodes receives feedback regarding an analysis performed by the controller to be stored in memory; wherein the controller of the node controls transmitting the feedback from the analysis to the additional nodes; and wherein the controller included in the nodes of the network collectively use machine learning to analyze the feedback.

53. The lighting system according to claim 39 wherein the controller receives feedback regarding the analysis performed by the controller to be stored in memory, wherein the controller uses machine learning to analyze the feedback from the analysis.

54. The lighting system according to claim 39 wherein the data included in the data light includes at least one error detection bit.

55. The lighting system according to claim 39 wherein the wavelength conversion material is selected from a group consisting of a fluorescent material, a luminescent material, and a phosphorescent material.

56. The lighting system according to claim 39 wherein the converted wavelength range of the converted light varies depending on the condition in the environment.

57. The lighting system according to claim 39 wherein the illuminating light is received by the wavelength conversion material as the source light; wherein the wavelength conversion material converts the source light to the converted light; and wherein the converted light is emitted by the wavelength conversion material within the converted wavelength range.

58. The lighting system according to claim 39 wherein the environmental light is received by the wavelength conversion material as the source light; wherein the wavelength conversion material converts the source light to the converted light; and wherein the converted light is received by the light source within the converted wavelength range.

59. The lighting system according to claim 39 wherein the converted wavelength range includes shorter wavelengths than the source wavelength range; and wherein the wavelength conversion material converts the source light to the converted light by performing an anti-Stokes shift.

60. The lighting system according to claim 39 wherein the converted wavelength range includes longer wavelengths than the source wavelength range; and wherein the wavelength conversion material converts the source light to the converted light by performing a Stokes shift.

61. The lighting system according to claim 39 wherein the controller is operatively connected to a voltage sensor to sense an open circuit voltage across the light source sensing the environmental light.

62. The lighting system according to claim 39 wherein the data light transmits the data by using an operation selected from a group consisting of pulse width modulation (PWM), pulse amplitude modulation (PAM), intensity modulation, color sequencing, and duty cycle variation.

63. The lighting system according to claim 39 wherein a sample rate at which data is transmitted in the data light is dynamically adjustable by the controller.

64. The lighting system according to claim 39 wherein the data is included in the data light digitally.

65. The lighting system according to claim 39 wherein the data included in the data light is encrypted.

66. The lighting system according to claim 39 further comprising a power supply to drive the light source.

67. The lighting system according to claim 39 wherein the light source is operable in a pulsed mode.

68. The lighting system according to claim 39 wherein the controller processes the environmental light to remove noise.

69. The lighting system according to claim 39 wherein the controller characterizes a luminosity of the environmental light.

70. The lighting system according to claim 39 wherein the controller characterizes a dominant wavelength included in the environmental light.

71. The lighting system according to claim 39 wherein the light source is included on a piezoelectric substrate.

72. The lighting system according to claim 39 wherein the light source is a light emitting semiconductor device.

73. The lighting system according to claim 39 wherein the controller comprises a lighting controller and an analysis processor; wherein the lighting controller controls operation of the light source; and wherein the analysis processor controls analysis of the sensed environmental light.

74. A method for using a lighting system that comprises a light source to emit illuminating light and sense environmental light from an environment, a wavelength conversion material between the light source and the environment to absorb at least part of a source light and emit a converted light having a converted wavelength range, the source light being received and absorbed by the wavelength conversion material, and the converted light being emitted by the wavelength conversion material, and a controller operatively connected to the light source to analyze the environmental light that is sensed and to control emitting the illuminating light, the method comprising:
analyzing the environmental light to detect or generate data relating to a condition of the environment, the data being transmittable in data light;
receiving the data included in the data light;
analyzing the data included in the data light;
controlling transmitting the data light;
wherein the light source is included in an array to be selectively enabled and disabled by the controller;
wherein the array includes a plurality of light sources;
wherein each light source included in the plurality of light sources is sensitive to at least one wavelength respective to the each light source;
selectively operating the plurality of light sources substantially simultaneously;
selectively operating the plurality of light sources individually;
selectively emitting the illuminating light in a plurality of directions and selectively receiving the environmental light from the plurality of directions; and
selectively operating each of the plurality of light sources in the array between a sensing operation and an emitting operation, the sensing operation being defined by the light source sensing the environmental light, and the emitting operation being defined by the light source emitting the illuminating light.

75. The method according to claim 74 wherein the controller selectively operates the light source between the sensing operation and the emitting operation.

76. The method according to claim 74 further comprising alternating the light source between the sensing operation and the emitting operation using a switching circuit.

77. The method according to claim 74 wherein the light source emits the illuminating light and receives the environmental light substantially simultaneously.

78. The method according to claim 74 wherein the controller analyzes the environmental light by measuring a drive voltage of the light source, determining a difference between a measured voltage across the light source and the drive voltage, and performing time-domain matching of the measured voltage and the environmental light using cross-correlation.

79. The method according to claim 74 wherein the light source includes a light emitting diode to emit the illuminating light and a photodiode to sense the environmental light.

80. The method according to claim 74 wherein at least a portion of the plurality of light sources included in the array are sequentially enabled.

81. The method according to claim 74 wherein at least a portion of the plurality of light sources included in the array are defined as monochromatic light emitting diodes (LED).

82. The method according to claim 74 wherein at least a portion of the plurality of light sources included in the array are defined as white light emitting diodes (LED).

83. The method according to claim 74 wherein at least a portion of the plurality of light sources included in the array are defined as infrared light (IR) emitting diodes (LED).

84. The method according to claim 74 wherein the lighting system further comprises a network comprised of nodes, each node including the light source and the controller; wherein the nodes intercommunicate by transmitting and receiving the data light.

85. The method according to claim 84 wherein the data light includes at least one addressing bit to address the nodes intended to receive the data.

86. The method according to claim 84 wherein the nodes are proximately aware of the additional nodes.

87. The method according to claim 84 wherein the controller of the node included in the network of the nodes receives feedback regarding an analysis performed by the controller to be stored in memory; wherein the controller of the node controls transmitting the feedback from the analysis to the additional nodes; and wherein the controller included in the nodes of the network collectively use machine learning to analyze the feedback.

88. The method according to claim 74 wherein the controller receives feedback regarding an analysis performed by the controller to be stored in memory; and wherein the controller uses machine learning to analyze the feedback from the analysis.

89. The method according to claim 74 wherein the data included in the data light includes at least one error detection bit.

90. The method according to claim 74 wherein the wavelength conversion material is selected from a group consisting of a fluorescent material, a luminescent material, and a phosphorescent material.

91. The method according to claim 74 wherein the converted wavelength range of the converted light varies depending on the condition in the environment.

92. The method according to claim 74 wherein the illuminating light is received by the wavelength conversion material as the source light; wherein the wavelength conversion material converts the source light to the converted light; and wherein the converted light is emitted by the wavelength conversion material within the converted wavelength range.

93. The method according to claim 74 wherein the environmental light is received by the wavelength conversion material as the source light; wherein the wavelength conversion material converts the source light to the converted light; and wherein the converted light is received by the light source within the converted wavelength range.

94. The method according to claim 74 wherein the converted wavelength range includes shorter wavelengths than the source wavelength range; and wherein the wavelength conversion material converts the source light to the converted light by performing an anti-Stokes shift.

95. The method according to claim 74 wherein the converted wavelength range includes longer wavelengths than the source wavelength range; and wherein the wavelength conversion material converts the source light to the converted light by performing a Stokes shift.

96. The method according to claim 74 wherein the controller is operatively connected to a voltage sensor to sense an open circuit voltage across the light source sensing the environmental light.

97. The method according to claim 74 wherein the data light transmits the data using an operation selected from a group consisting of pulse width modulation (PWM), pulse amplitude modulation (PAM), intensity modulation, color sequencing, and duty cycle variation.

98. The method according to claim 74 wherein a sample rate at which data is transmitted in the data light is dynamically adjustable by the controller.

99. The method according to claim 74 wherein the data is included in the data light digitally.

100. The method according to claim 74 wherein the data included in the data light is encrypted.

101. The method according to claim 74 wherein the lighting system further includes a power supply to drive the light source.

102. The method according to claim 74 further comprising operating the light source in a pulsed mode.

103. The method according to claim 74 further comprising processing the environmental light to remove noise.

104. The method according to claim 74 wherein the controller characterizes a luminosity of the environmental light.

105. The method according to claim 74 wherein the controller characterizes a dominant wavelength included in the environmental light.

106. The method according to claim 74 wherein the light source is included on a piezoelectric substrate.

107. The method according to claim 74 wherein the light source is a light emitting semiconductor device.

108. The method according to claim 74 wherein the controller comprises a lighting controller and an analysis processor; wherein the lighting controller controls operation of the light source; and wherein the analysis processor controls analysis of the sensed environmental light.

109. A method of using a lighting system that comprises a network of nodes, wherein each node comprises a light source to emit illuminating light and sense environmental light from an environment, a wavelength conversion material between the light source and the environment to absorb at least part of a source light and emit a converted light having a converted wavelength range, the source light being received and absorbed by the wavelength conversion material, and the converted light being emitted by the wavelength conversion material, and a controller operatively connected to the light source to analyze the environmental light that is sensed and to control emitting the illuminating light, wherein each of the nodes in the network are aware of additional nodes in the network, the method comprising:
the nodes intercommunicating among one another by transmitting and receiving data light;
analyzing the environmental light to detect or generate data relating to a condition of the environment, the data being transmittable in the data light to the nodes included in the network;
receiving and analyzing the data included in the data light;
controlling transmitting the data light from the light source among the nodes; and
selectively operating the light source between a sensing operation and an emitting operation, the sensing operation being defined by the light source sensing the environmental light, and the emitting operation being defined by the light source emitting the illuminating light.

110. The method according to claim 109:
wherein the light source in each of the nodes is included in an array to be selectively enabled and disabled by the controller;
wherein the array includes a plurality of light sources;
wherein each light source included in the plurality of light sources is sensitive to at least one wavelength respective to the each light source;
selectively operating the plurality of light sources substantially simultaneously;
selectively operating the plurality of light sources individually; and
selectively emitting the illuminating light in a plurality of directions and selectively receiving the environmental light from the plurality of directions.

111. The method according to claim 109 wherein the controller selectively operates the light source between the sensing operation and the emitting operation.

112. The method according to claim 109 further comprising alternating the light source between the sensing operation and the emitting operation using a switching circuit.

113. The method according to claim 109 wherein the light source emits the illuminating light and receives the environmental light substantially simultaneously.

114. The method according to claim 109 wherein the controller analyzes the environmental light by measuring a drive voltage of the light source, determining a difference between a measured voltage across the light source and the drive voltage, and performing time-domain matching of the measured voltage and the environmental light using cross-correlation.

115. The method according to claim 109 wherein the light source includes a light emitting diode to emit the illuminating light and a photodiode to sense the environmental light.

116. The method according to claim 109 wherein at least a portion of the plurality of the light sources included in the array are sequentially enabled.

117. The method according to claim 109 wherein the light source is defined as a monochromatic light emitting diode (LED).

118. The method according to claim 109 wherein the light source is defined as a white light emitting diode (LED).

119. The method according to claim 109 wherein the light source is defined as an infrared light (IR) emitting diode (LED).

120. The method according to claim 109 wherein the data light includes at least one addressing bit to address the nodes intended to receive the data.

121. The method according to claim 109 wherein the nodes are proximately aware of the additional nodes.

122. The method according to claim 109 wherein the controller of the node included in the network of the nodes receives feedback regarding an analysis performed by the controller to be stored in memory; wherein the controller of the node controls transmitting the feedback from the analysis to the additional nodes; and wherein the controller included in the nodes of the network collectively use machine learning to analyze the feedback.

123. The method according to claim 109 wherein the controller receives feedback regarding the analysis performed by the controller to be stored in memory, wherein the controller uses machine learning to analyze the feedback from the analysis.

124. The method according to claim 109 wherein the data included in the data light includes at least one error detection bit.

125. The method according to claim 109 wherein the wavelength conversion material is selected from a group consisting of a fluorescent material, a luminescent material, and a phosphorescent material.

126. The method according to claim 109 wherein the converted wavelength range of the converted light varies depending on the condition in the environment.

127. The method according to claim 109 wherein the illuminating light is received by the wavelength conversion material as the source light; wherein the wavelength conversion material converts the source light to the converted light; and wherein the converted light is emitted by the wavelength conversion material within the converted wavelength range.

128. The method according to claim 109 wherein the environmental light is received by the wavelength conversion material as the source light; wherein the wavelength conversion material converts the source light to the converted light; and wherein the converted light is received by the light source within the converted wavelength range.

129. The method according to claim 109 wherein the converted wavelength range includes shorter wavelengths than the source wavelength range; and wherein the wavelength conversion material converts the source light to the converted light by performing an anti-Stokes shift.

130. The method according to claim 109 wherein the converted wavelength range includes longer wavelengths than the source wavelength range; and wherein the wavelength conversion material converts the source light to the converted light by performing a Stokes shift.

131. The method according to claim 109 wherein the controller is operatively connected to a voltage sensor to sense an open circuit voltage across the light source sensing the environmental light.

132. The method according to claim 109 wherein the data light transmits the data by using an operation selected from a group consisting of pulse width modulation (PWM), pulse amplitude modulation (PAM), intensity modulation, color sequencing, and duty cycle variation.

133. The method according to claim 109 wherein a sample rate at which data is transmitted in the data light is dynamically adjustable by the controller.

134. The method according to claim 109 wherein the data is included in the data light digitally.

135. The method according to claim 109 wherein the data included in the data light is encrypted.

136. The method according to claim 109 wherein the lighting system further comprises a power supply to drive the light source.

137. The method according to claim 109 further comprising selectively operating the light source in a pulsed mode.

138. The method according to claim 109 further comprising processing the environmental light to remove noise.

139. The method according to claim 109 wherein the controller characterizes a luminosity of the environmental light.

140. The method according to claim 109 wherein the controller characterizes a dominant wavelength included in the environmental light.

141. The method according to claim 109 wherein the light source is included on a piezoelectric substrate.

142. The method according to claim 109 wherein the light source is a light emitting semiconductor device.

143. The method according to claim 109 wherein the controller comprises a lighting controller and an analysis processor; wherein the lighting controller controls operation of the light source; and wherein the analysis processor controls analysis of the sensed environmental light.

144. A lighting system comprising:
a light source to emit illuminating light and sense environmental light from an environment;
a lighting controller operatively connected to the light source to control emitting the illuminating light; and
an analysis processor operatively connected to the light source to analyze the environmental light that is sensed;
wherein the analysis processor analyzes the environmental light to detect or generate data relating to a condition of the environment, the data being transmittable in data light;
wherein the lighting controller selectively operates the light source;
wherein the light source is a light emitting semiconductor device; and
wherein the light emitting semiconductor device is selectively operable between a sensing operation and an emitting operation, the sensing operation being defined by the light source sensing the environmental light, and the emitting operation being defined by the light source emitting the illuminating light.

145. The lighting system according to claim 144, further comprising:
a controller including the lighting controller and the analysis processor to selectively operate the light-emitting semiconductor device to sense the environmental light and to emit illuminating light;
wherein the controller receives the data included in the data light using the light emitting semiconductor device;
wherein the controller analyzes the data included in the data light;
wherein the controller controls transmitting the data light from the light emitting semiconductor device;
wherein the light emitting semiconductor device is included in an array to be selectively enabled and disabled by the controller;
wherein the array includes a plurality of light emitting semiconductor devices;
wherein each light emitting semiconductor device included in the plurality of light emitting semiconductor devices is sensitive to at least one wavelength respective to the each light emitting semiconductor device;
wherein the plurality of light emitting semiconductor devices is selectively operable substantially simultaneously;
wherein the plurality of light emitting semiconductor devices is selectively operable individually;
wherein the plurality of light emitting semiconductor devices selectively emits the illuminating light in a plurality of directions and selectively receives the environmental light from the plurality of directions;
wherein each of the plurality of light emitting semiconductor devices in the array is selectively operable between a sensing operation and an emitting operation, the sensing operation being defined by the light emitting semiconductor device sensing the environmental light, and the emitting operation being defined by the light emitting semiconductor device emitting the illuminating light.

146. The lighting system according to claim 144 further comprising a switching circuit to alternate the light emitting semiconductor device between the sensing operation and the emitting operation.

147. The lighting system according to claim 144 wherein the analysis processor analyzes the environmental light by measuring a drive voltage of the light emitting semiconductor device, determining a difference between a measured voltage across the light emitting semiconductor device and the drive voltage, and performing time-domain matching of the measured voltage and the environmental light using cross-correlation.

148. The lighting system according to claim 144 wherein at least a portion of the plurality of light emitting semiconductor devices included in the array are sequentially enabled; and wherein at least a portion of the plurality of light emitting semiconductor devices included in the array are selected from a group consisting of monochromatic light emitting diodes (LED), white light emitting diodes (LED), and infrared light (IR) emitting diodes (LED).

149. The lighting system according to claim 144 further comprising a network comprised of nodes, each node including the light emitting semiconductor device and the controller; wherein the nodes intercommunicate by transmitting and receiving the data light; wherein the nodes are proximately aware of the additional nodes; and wherein the data light includes at least one addressing bit to address the nodes intended to receive the data.

150. The lighting system according to claim 149 wherein the controller of a node included in the network of the nodes receives feedback regarding an analysis performed by the controller to be stored in memory; wherein the controller of the node transmits the feedback from the analysis to the additional nodes; and wherein the controller included in the nodes of the network collectively use machine learning to analyze the feedback.

151. The lighting system according to claim 144 wherein the controller receives feedback regarding an analysis performed by the controller to be stored in memory; and wherein the controller uses machine learning to analyze the feedback from the analysis.

152. The lighting system according to claim 144 wherein the data included in the data light includes at least one error detection bit.

153. The lighting system according to claim 144 further comprising a wavelength conversion material between the light emitting semiconductor device and the environment to absorb at least part of a source light and emit a converted light having a converted wavelength range, the source light being received and absorbed by the wavelength conversion material, and the converted light being emitted by the wavelength conversion material; and wherein the wavelength conversion material absorbs a wavelength that cannot be sensed by the light emitting semiconductor device and converts it to a wavelength that can be sensed by the light emitting semiconductor device.

154. The lighting system according to claim 153 wherein the wavelength conversion material is selected from a group consisting of a fluorescent material, a luminescent material, and a phosphorescent material; and wherein the converted wavelength range of the converted light varies depending on the condition in the environment.

155. The lighting system according to claim 153 wherein the illuminating light is received by the wavelength conversion material as the source light; wherein the wavelength conversion material converts the source light to the converted light; and wherein the converted light is emitted by the wavelength conversion material within the converted wavelength range.

156. The lighting system according to claim 153 wherein the environmental light is received by the wavelength conversion material as the source light; wherein the wavelength conversion material converts the source light to the converted light; and wherein the converted light is received by the light emitting semiconductor device within the converted wavelength range.

157. The lighting system according to claim 153 wherein the converted wavelength range includes shorter wavelengths than the source wavelength range; and wherein the wavelength conversion material converts the source light to the converted light by performing an anti-Stokes shift.

158. The lighting system according to claim 153 wherein the converted wavelength range includes longer wavelengths than the source wavelength range; and wherein the wavelength conversion material converts the source light to the converted light by performing a Stokes shift.

159. The lighting system according to claim 153 wherein the analysis processor is operatively connected to a voltage sensor to sense an open circuit voltage across the light emitting diode sensing the environmental light.

160. The lighting system according to claim 144 wherein the data light transmits the data using an operation selected from a group consisting of pulse width modulation (PWM), pulse amplitude modulation (PAM), intensity modulation, color sequencing, and duty cycle variation.

161. The lighting system according to claim 144 wherein a sample rate at which data is transmitted in the data light is dynamically adjustable by the lighting controller.

162. The lighting system according to claim 144 wherein the data is included in the data light digitally.

163. The lighting system according to claim 144 wherein the data included in the data light is encrypted.

164. The lighting system according to claim 144 further comprising a power supply to drive the light source.

165. The lighting system according to claim 144 wherein the light source is operable in a pulsed mode.

166. The lighting system according to claim 144 wherein the analysis processor processes the environmental light to remove noise.

167. The lighting system according to claim 144 wherein the analysis processor characterizes a luminosity of the environmental light.

168. The lighting system according to claim 144 wherein the analysis processor characterizes a dominant wavelength included in the environmental light.

169. The lighting system according to claim 144 wherein the light source is included on a piezoelectric substrate.

\* \* \* \* \*